(12) United States Patent
Radecker et al.

(10) Patent No.: US 11,588,395 B2
(45) Date of Patent: Feb. 21, 2023

(54) VOLTAGE CONVERTER ARRANGEMENT COMPRISING AN INPUT REGULATING ELEMENT, AND METHOD OF OPERATING A VOLTAGE CONVERTER ARRANGEMENT

(71) Applicant: Fraunhofer-Gesellschaft zur Förderung der angewandten Forschung e.V., Munich (DE)

(72) Inventors: Matthias Radecker, Dresden (DE); Ricardo Nunes Marchesan, Dresden (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/905,756

(22) Filed: Jun. 18, 2020

(65) Prior Publication Data

US 2020/0321867 A1 Oct. 8, 2020

Related U.S. Application Data

(63) Continuation of application No. PCT/EP2018/086798, filed on Dec. 21, 2018.

(30) Foreign Application Priority Data

Dec. 22, 2017 (EP) .................................... 17210522

(51) Int. Cl.
*H02M 1/15* (2006.01)
*H02M 3/00* (2006.01)
(Continued)

(52) U.S. Cl.
CPC .............. *H02M 1/15* (2013.01); *H02M 3/005* (2013.01); *H02M 3/158* (2013.01); *H02M 1/0045* (2021.05); *H02M 3/1557* (2021.05)

(58) Field of Classification Search
CPC .......... H02M 1/15; H02M 1/0045; H02J 1/02; G05F 1/656; G05F 1/44; G05F 1/618
See application file for complete search history.

(56) References Cited

U.S. PATENT DOCUMENTS 4,355,352 A 10/1982 Bloom et al.
9,112,413 B2 8/2015 Barth et al.
(Continued)

FOREIGN PATENT DOCUMENTS

FR 2984619 A1 * 6/2013 .............. H02M 1/15
WO 2013182813 A1 12/2013

OTHER PUBLICATIONS

H. Ertl, et al.,, Basic Considerations and Topologies of Switched-Mode Assisted Linear Power Amplifiers, 0-7803-3044-7196 IEEE, 1996.

(Continued)

*Primary Examiner* — Harry R Behm
(74) *Attorney, Agent, or Firm* — Perkins Coie LLP; Michael A. Glenn

(57) ABSTRACT

A voltage converter arrangement includes a clocked voltage converter capable of generating an output voltage on the basis of an input voltage. The voltage converter arrangement further includes a first input regulating element connected between a first input voltage node and a second input voltage node, the second input voltage node having a reference potential. The first input regulating element is configured to allow a current flow so as to counteract fluctuations in the input current of the voltage converter arrangement.

A corresponding method is also described.

29 Claims, 21 Drawing Sheets inventive implementation - transformer-coupled Cuk converter combined with four linear regulators

(51) Int. Cl.
*H02M 3/158* (2006.01)
*H02M 1/00* (2006.01)
*H02M 3/155* (2006.01)

(56) References Cited

U.S. PATENT DOCUMENTS

| | | | |
|---|---|---|---|
| 9,256,238 B1 | 2/2016 | Kotikalapoodi | |
| 2006/0066366 A1* | 3/2006 | Oliver, Jr. | H02M 1/15 327/111 |
| 2011/0279183 A1 | 11/2011 | Froidevaux et al. | |
| 2011/0292699 A1* | 12/2011 | Goerke | H02M 1/15 363/84 |
| 2013/0182813 A1 | 7/2013 | Bingham | |
| 2014/0167710 A1* | 6/2014 | Ingino, Jr. | G05F 1/565 323/223 |

OTHER PUBLICATIONS

Jeff Falin: Designing DC/DC converters based on ZETA topology, Application Note "High-Performance Analog Products" www.ti.com/aaj, 2010, Analog Applications Journal, Texas Instruments 2010, 2010.

ON Semiconductor, Application Note AND8481/D: A High-Efficiency, 300 W Bridgeless PFC Stage, Semiconductor Components Industries, LLC, 2014, 2014.

H. Martinez-Garcia: Capacitorless DC-DC Regulator as a Candidate Topology for Photovoltaic Solar Facilities, Barcelona College of Industrial Engineering (EUETIB), ICREPQ'14, La Coruña, Spain., Apr. 2015.

H. Martinez-Garcia, Alireza Saberkari: Four-Quadrant Linear-Assisted DC/DC Voltage Regulator, Mixed Signal Letter, Analog Integrated Circuits & Signal Processing, vol. 88, No. 1., Apr. 23, 2016, 151-160.

Cosp-Vilella Jordi et al, "Design of an on-chip linear-assisted DC-DC voltage regulator", 2013 IEEE 20th International Conference on Electronics, Circuits, and Systems (ICECS), IEEE, pp. 353-356, Dec. 8, 2013.

Jae-Won Yang and Hyun-Lark Do, Bridgeless SEPIC Converter With a Ripple-Free Input Current, IEEE Transactions on Power Electronics, vol. 28, No. 7, Jul. 2013, Jul. 2013.

A Linear Assisted DC/DC Converter tor Envelope Tracking and Envelope Elimination and Restoration Applications., Pablo F. Miaja, et al, IEEE Transactions on Power Electronics, vol. 27, No. 7, Jul. 7, 2012.

Martinez H et al. "Linear-assisted DC-DC converter based on CMOS technology", Power Electronics Specialists Conference, 2008. PESC 2008. IEEE, Piscataway, NJ, USA, pp. 3735-3740, XP031300540, Jun. 18, 2008.

NXP Semiconductors: Totem-Pole Bridgeless PFC Design Using MC56F82748, Design Reference Manual, Document No. DRM174, Rev. 0, Nov. 2016.

Application Note AN3180: A 200 W ripple-free input current PFC pre-regulator with the L6563S, ST Microelectronics 2010, Doc ID 17273 Rev 1, Sep. 5, 2010.

Y. Jang et al_Bridgeless Buck PFC Rectifier, IEEE, 2010.

H. Martinez-Garcia et al_Linear-Assisted DC-DC Converters with Variable Frequency-on their Complex Control Strategies, IEEE, 2014.

H. Martinez-Garcia_Modified Current-Mode One-Cycle Control for Linear-Assisted DC-DC Regulator, IEEE, 2014.

S. Subasree et al_Zeta Converter with Coupled Inductor for AC Applications, International Journal of Technology and Engineering System (IJTES), vol. 6. No. 2, Jan.-Mar. 2014 pp. 151-156, 2014.

* cited by examiner conventional solution - linear-support step-down converter conventional solution - implementation of a buck converter combined with two linear regulators conventional solution – regulating function of a buck converter combined with two linear regulators conventional solution – curve profiles of the regulating function of a converter combined with linear regulators

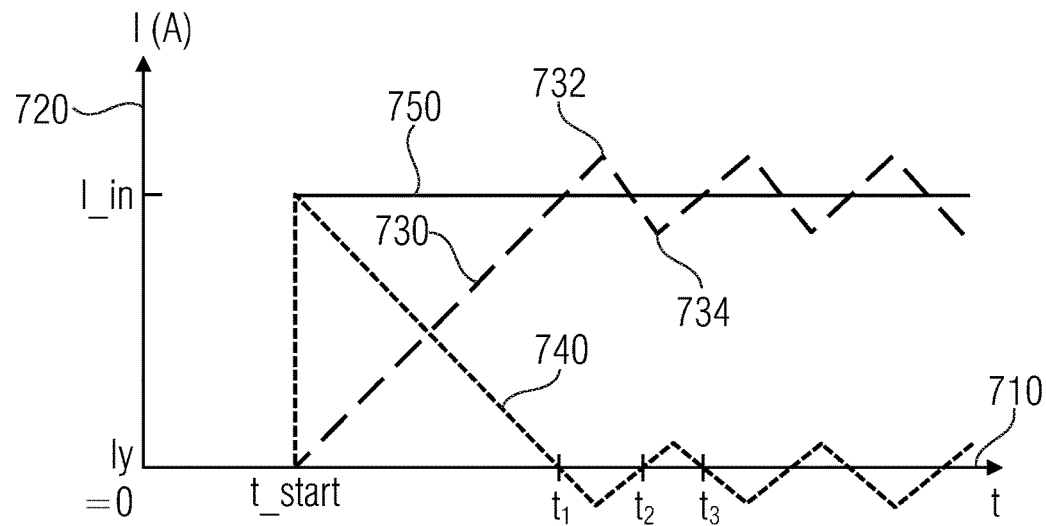

ripple current compensation of the PWM converter by linear regulators LR3 and LR4 (case 4 of table 3 and table 4) (blue — — —: input current of the clocked voltage converter; red --------: current flowing through LR3 and LR4)

Fig. 7

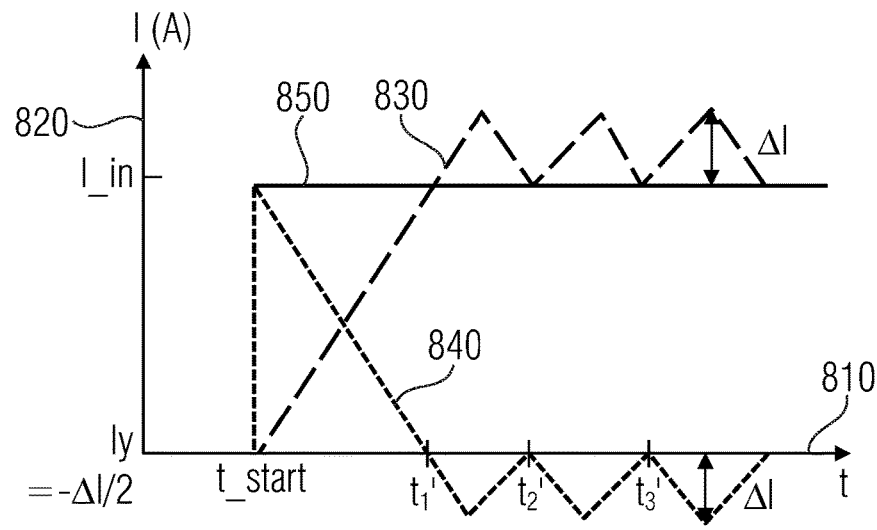

ripple current compensation of the PWM converter by linear regulator LR3 (case 1 of table 3 and table 4) (blue — — —: input current of the clocked voltage converter; red -------- : current flowing through LR3)

Fig. 8 ripple current compensation of the PWM converter by linear regulators LR4 and/or LR1 (case 2, 3, and 5 of table 3 and table 4) (blue — — —: input current of the clocked voltage converter; red -------: current flowing through LR4 and/or LR1)

inventive implementation – transformer-coupled Cuk converter combined with four linear regulators conventional PFC boost converter conventional PFC SEPIC converter conventional bridgeless PFC SEPIC converter conventional bridgeless PFC boost converter inventive implementation (embodiment) - linear-support step-up converter combined with two linear regulators inventive implementation (embodiment) – linear-support boost converter combined with two linear regulators inventive implementation (embodiment) – linear-support boost converter of Fig. 13a, combined with two linear regulators, and implementation of an inventive regulating function of the linear-support step-up converter for ripple current suppression at the input

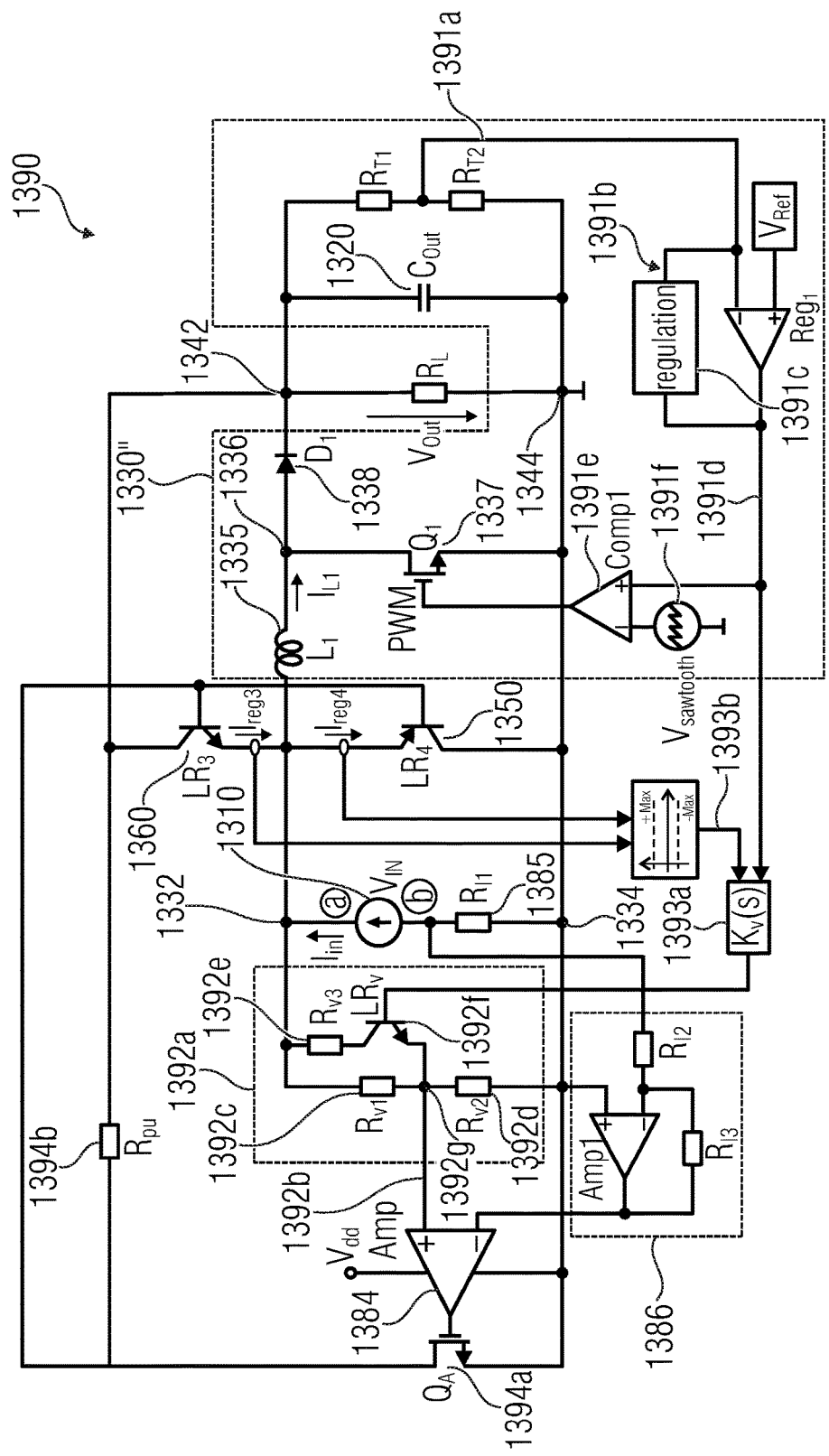

Fig. 13c inventive implementation (embodiment) – linear-support boost converter of Fig. 13a, combined with two linear regulators, and implementation of an inventive regulating function of the linear-support step-up converter for ripple current suppression at the input and voltage-controlled power factor correction with variable voltage reference via function $K_v(s)$

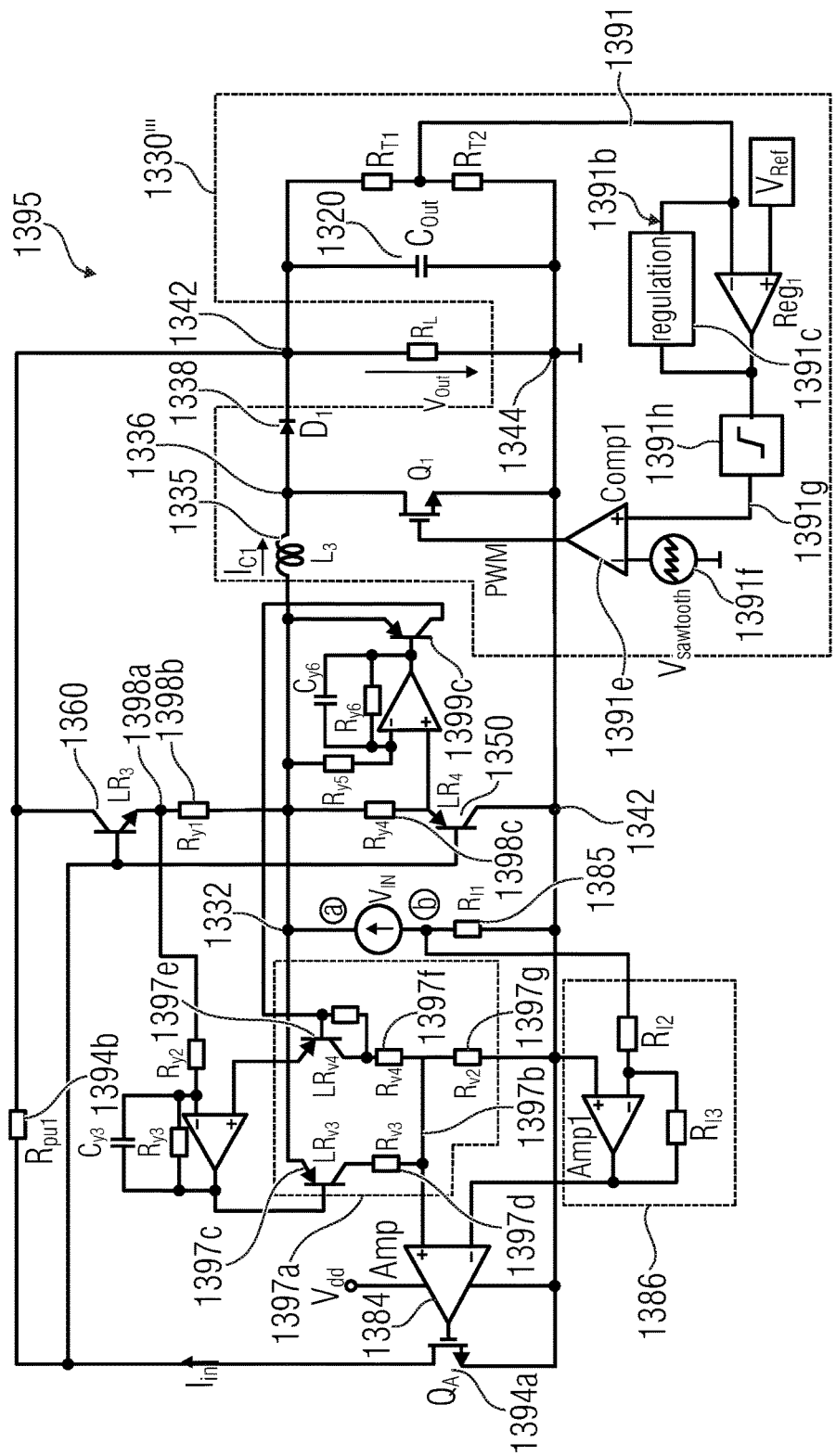

Fig. 13d inventive implementation (embodiment) – linear-support boost converter of Fig. 13a, combined with two linear regulators, and implementation of an inventive regulating function of the linear-support step-up converter for ripple current suppression at the input and voltage-controlled power factor correction with variable voltage reference via function of two inverting amplifiers with a time delay (low-pass filters Ry2, Ry3, Cy3 and Ry5, Ry6, Cy6)

inventive implementation (embodiment) – linear-support step-up/step-down converter combined with three linear regulators

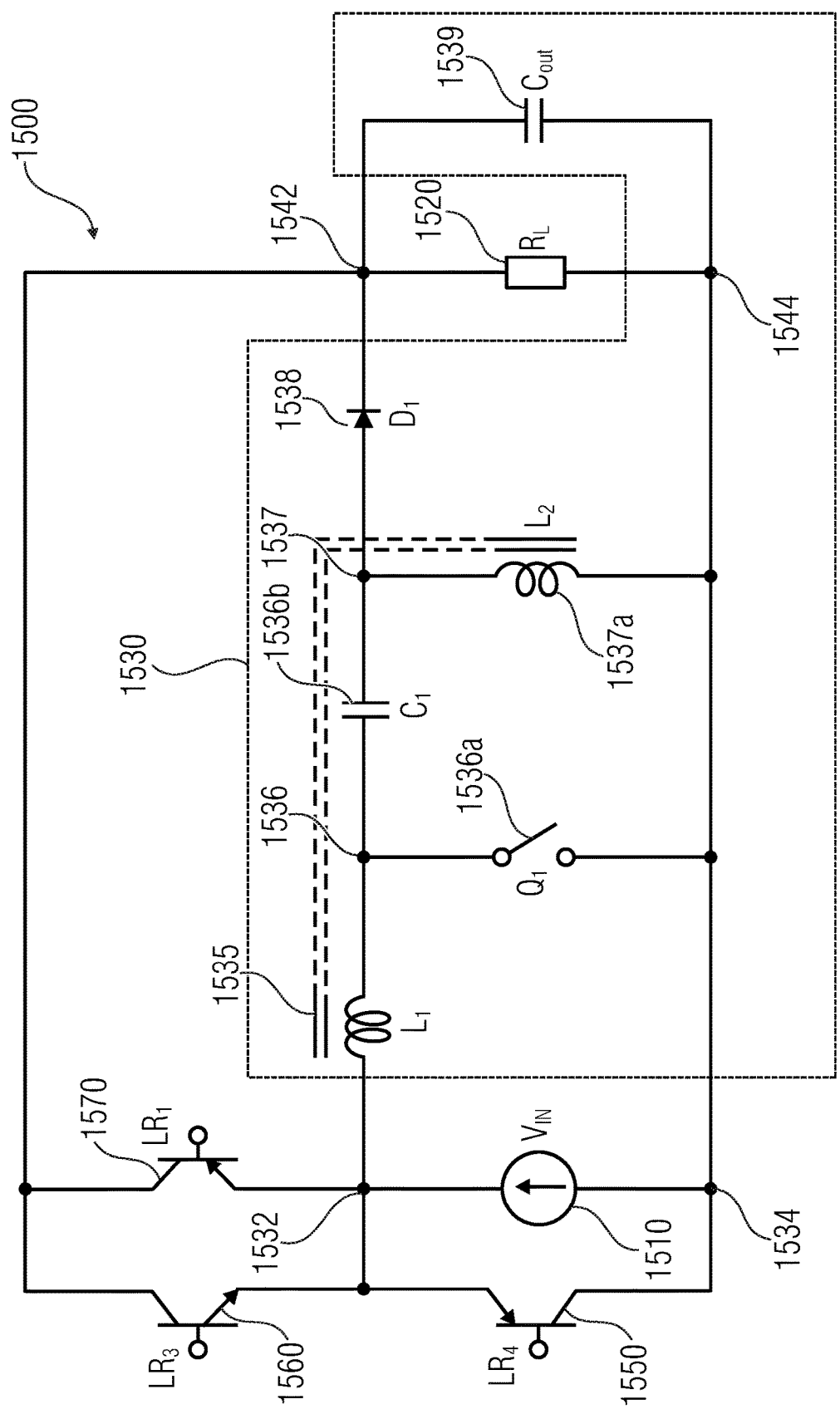
Fig. 15a  inventive implementation (embodiment) – SEPIC converter combined with three linear regulators

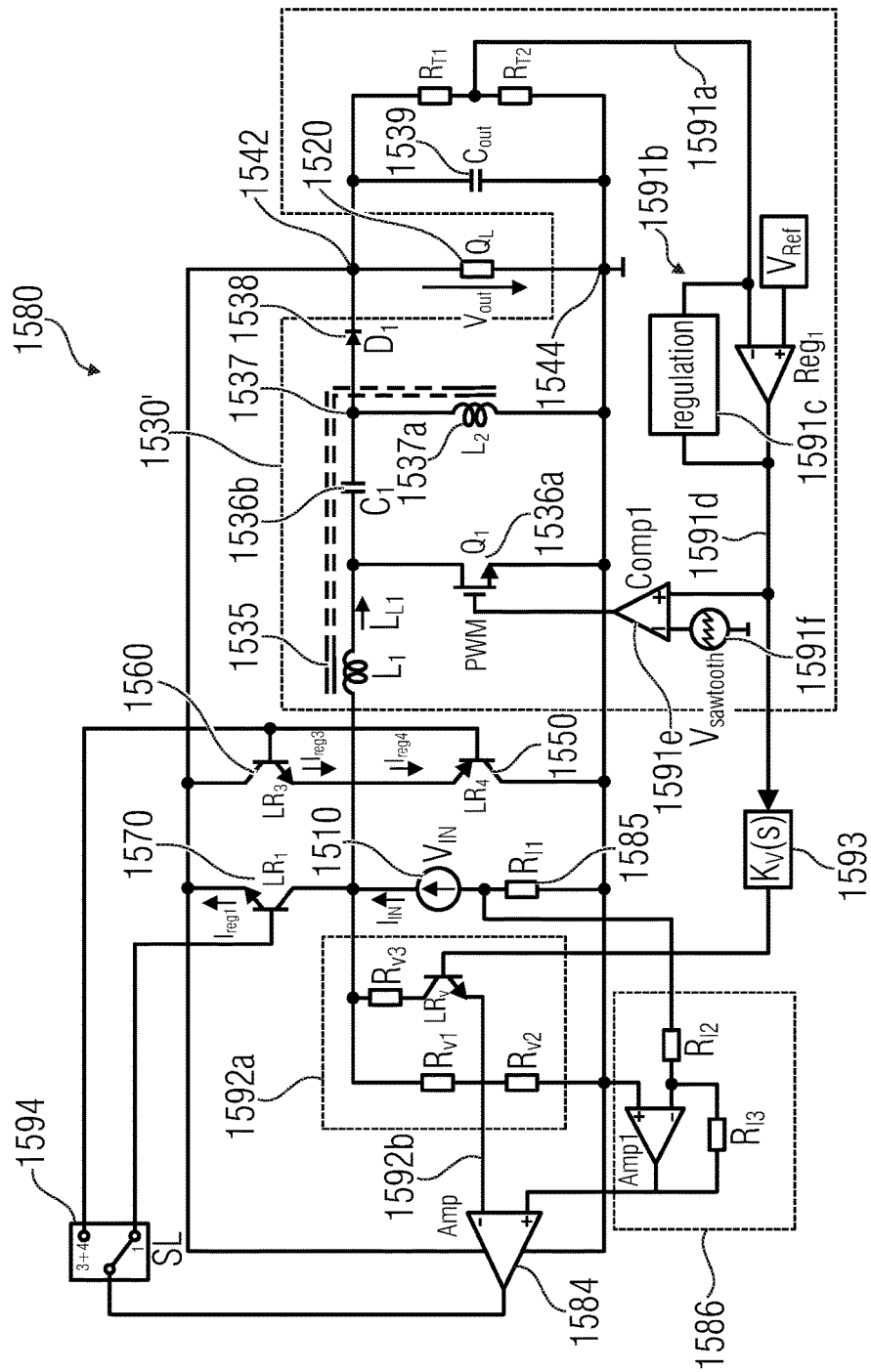

Fig. 15b inventive implementation (embodiment) – linear-support SEPIC converter of Fig. 15a, combined with tree linear regulators, and implementation of an inventive regulating function of the linear-support step-up/step-down converter for ripple current suppression at the input and voltage-controlled power factor correction with variable voltage reference via function $K_V(s)$

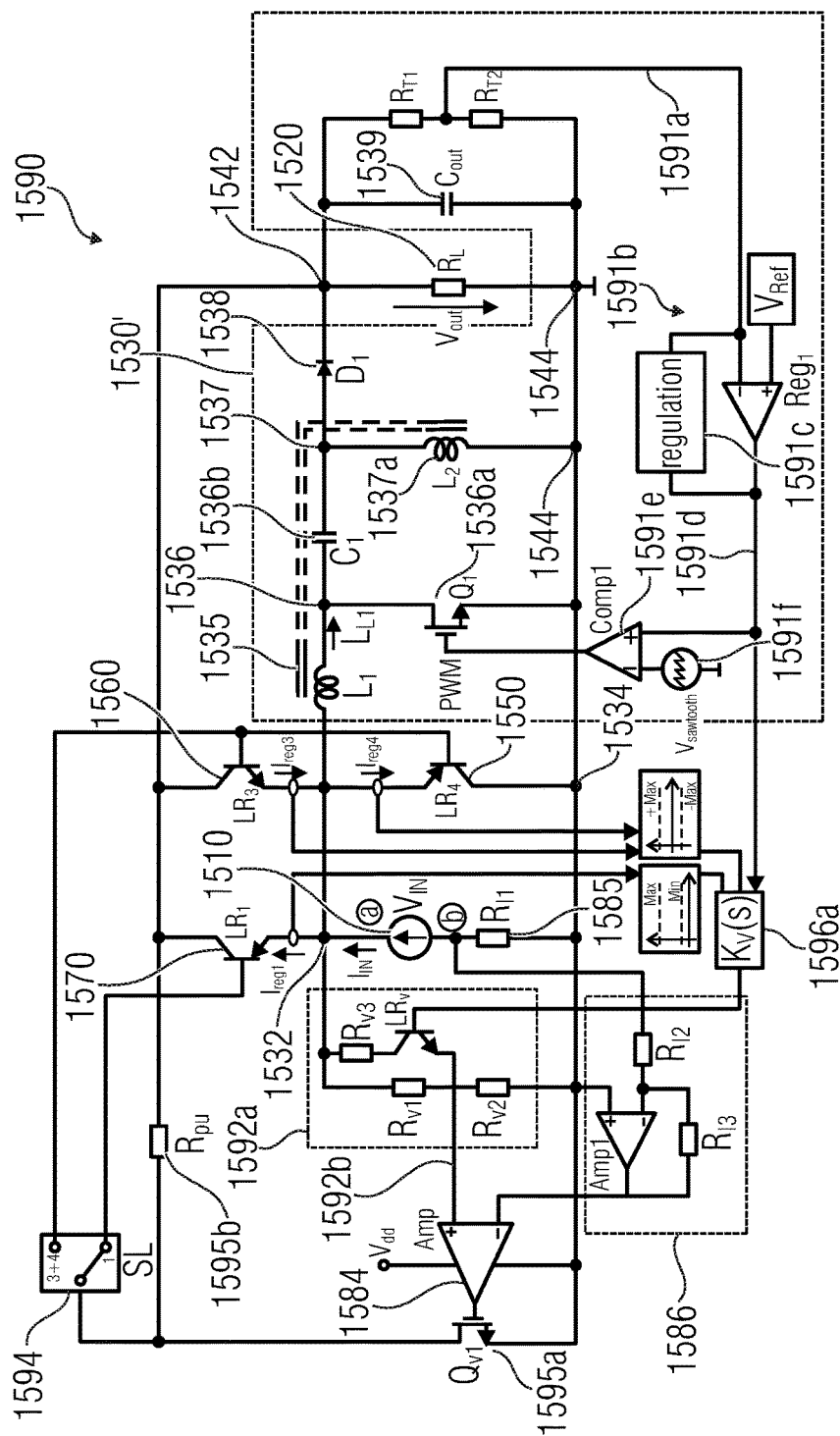

Fig. 15c inventive implementation (embodiment) – linear-support SEPIC converter of Fig. 15a, combined with tree linear regulators, and implementation of an inventive regulating function of the linear-support boost/buck converter for ripple current suppression at the input and voltage-controlled power factor correction with variable voltage reference via function $K_V(s)$ and the correction function of the voltage reference Vuref by sensing the currents $I_{reg1}$, $I_{reg3}$ and $I_{reg4}$ in the linear regulators inventive implementation of an input voltage source $V_{in}$ by a unidirectional alternating voltage with a full-bridge rectifier compensation for the current ripple of the input current $i_{Vin(t)}$ for a unidirectional sinusoidal input voltage Vin by the currents in the linear regulators LR3 and LR4 in accordance with case 4 in table 4 (example)

Table 2: Activation function of the linear regulators for the implementation of Fig. 10

| Ripple current compensation | Conditions | | Activated linear regulators |
|---|---|---|---|
| only for L2 at RL | Case 1: | Vout < (Vin-Vout) and Vin > Vout | LR2 |
| | Case 2: | Vin ≈ Vout | LR2 |
| | Case 3: | Vout > (Vin-Vout) and Vin > Vout | LR1 |
| | Case 4: | Vout ≈ (Vin-Vout) and Vin > Vout | LR1 and LR2 |
| | Case 5: | Vin < Vout | LR3 |
| only for L1 at Vin | Case 6: | Vin < (Vout-Vin) and Vout > Vin | LR4 |
| | Case 7: | Vin ≈ Vout | LR4 |
| | Case 8: | Vin > (Vout-Vin) and Vout > Vin | LR3 |
| | Case 9: | Vin ≈ (Vout-Vin) and Vout > Vin | LR3 and LR4 |
| | Case 10: | Vout < Vin | LR1 |
| for L1 at Vin and L2 at RL | Case 11: | Vout < (Vin-Vout) and Vin > Vout | LR2 and LR1 |
| | Case 12: | Vin ≈ Vout | LR2 and LR4 |
| | Case 13: | Vout > (Vin-Vout) and Vin > Vout | LR2 and LR1 or LR2 and LR4 |
| | Case 14: | Vout ≈ (Vin-Vout) and Vin > Vout | LR2 and LR1 or LR2 and LR4 |
| | Case 15: | Vin < (Vout-Vin) and Vout > Vin | LR3 and LR4 |
| | Case 16: | Vin > (Vout-Vin) and Vout > Vin | LR3 and LR4 or LR2 and LR4 |
| | Case 17: | Vin ≈ (Vout-Vin) and Vout > Vin | LR3 and LR4 or LR2 and LR4 |

Fig. 17

Table 3: Activation function of the linear regulators for the implementation of Figs. 12 and 13

| Conditions | Activated linear regulators |
|---|---|
| Case 1: Vin > (Vout-Vin) | LR3 |
| Case 2: Vin ≈ Vout | LR4 |
| Case 3: Vin < (Vout-Vin) | LR4 |
| Case 4: Vin ≈ Vout/2 | LR3 and LR4 |

Fig. 18

Table 4: Activation function of the linear regulators for the implementation of Figs. 14 and 15

| Conditions | Activated linear regulators |
|---|---|
| Case 1: Vin > (Vout-Vin) and Vout>Vin | LR3 |
| Case 2: Vin ≈ Vout | LR4 |
| Case 3: Vin < (Vout-Vin) and Vout>Vin | LR4 |
| Case 4: Vin ≈ (Vout-Vin) and Vout>Vin | LR3 and LR4 |
| Case 5: Vin > Vout | LR1 |

Fig. 19

VOLTAGE CONVERTER ARRANGEMENT COMPRISING AN INPUT REGULATING ELEMENT, AND METHOD OF OPERATING A VOLTAGE CONVERTER ARRANGEMENT

CROSS-REFERENCES TO RELATED APPLICATIONS

This application is a continuation of copending International Application No. PCT/EP2018/086798, filed Dec. 21, 2018, which is incorporated herein by reference in its entirety, and additionally claims priority from European Application No. EP 17210522.3, filed Dec. 22, 2017, which is incorporated herein by reference in its entirety.

Embodiments in accordance with the present invention refer to a voltage converter arrangement.

Further embodiments in accordance with the present invention refer to a method of operating a voltage converter arrangement.

Further embodiments according to the invention refer to an up-down converter with a bidirectionally parallel linear regulator.

BACKGROUND OF THE INVENTION

In the following, a technical problem underlying the invention will be explained.

Switching regulators, usually pulse-width modulated converters (PWM converters) are widely used in DC-DC converters or AC-DC converters, in which a direct voltage or a direct current, which is free of ripple as far as possible, is to be generated at the output or input. The efficiency of such switching regulators is mostly very high since adiabatic switching is achieved via energy storage devices.

A disadvantage, however, is that such converters involve smoothing capacitances and further filter elements such as double-compensated current chokes at the input and filter capacitors or additional filter chokes at the output in order to largely suppress the ripple. Smoothing capacitors are voluminous and mostly limit service life, and in many cases they are also unsuitable for temperatures above 100° C., so that smoothing capacitors, in particular, should be avoided.

One way to avoid the capacitors at the input or output is to use ideally coupled inductances, which minimizes current fluctuation of a switched inductance. This measure, however, is very much dependent on operating parameters and usually leads to complete current smoothing at the output or the input only in one operating point or within a limited operating range, while current and voltage ripples occur within other operating ranges.

A further disadvantage is the limited dynamics (regulating speed) of a switching regulator since it is limited at least by the period duration of the switching frequency with which the switching regulator operates.

It has been found that a major technical problem is the mains feedback effect (German: Netzrückwirkung) of PWM switching regulators (pulse-width modulated switching regulators) through the current ripple, which is taken by an input-side smoothing capacitance by the converter and thus leads to complex mains filters (mains filters for the high-frequency harmonics (interference voltage) at the mains input. It is estimated that mains filters account for between 20% and 30% of the volume and cost of a power supply. Input stages of such mains appliances are usually boost converters (boost converters) or SEPIC converters, which perform power factor correction (PFC) to generate a sinusoidal input current in phase with the mains voltage and thus to suppress low-frequency harmonics towards the mains.

In the following, some previous solutions to the technical problem will be listed.

One previous solution of overcome these disadvantages is a linear-support buck converter consisting of a PWM buck converter and a parallel linear regulator LR1 according to FIG. 1. The buck converter converts the input voltage Vin to the output voltage Vout and supplies current to the load RL, while at the same time a linear regulator LR1 supplies a current from the input to the output and another linear regulator LR2 derives a current from the output of the buck converter over the load.

A circuit typical of this principle is shown in FIG. 2. The switching regulator consists of a buck topology with a switch Q1, a smoothing inductance L1 and a passive switch D1 in the form of a diode. The linear regulators LR1 and LR2 are designed as fast bipolar transistors, for example.

In FIG. 3 and FIG. 4 the advantageous function of the linear-support buck converter is shown in order to eliminate the mentioned disadvantages. Both linear regulators LR1 and LR2 are controlled by an amplifier so that they keep the output voltage Vout across the load constant. The output voltage is compared with a reference voltage vref, which is to be regulated as target value. If the output voltage is lower than the target value because the current supplied to the load by L1 is too small, the regulator LR1 will be activated, and a current from the input voltage will be additionally supplied to the load. If, on the other hand, the output voltage is too high because the current through L1 is too high to bring the output voltage across the load to the target value, the regulator LR2 will be activated, and the excess current over the load will be dissipated. The current, which is either supplied to the load (LR1) or discharged therefrom (LR2) by one of the linear regulators in each case is additionally measured and forwarded to a comparator with hysteresis in order to be compared to a current reference value ly and thus to achieve the pulse-width modulation of the buck converter at the active switch Q1. If the reference value ly is set to a positive value, as shown in FIG. 3b, only the linear regulator LR1 will be active since the current flows to the load in a positive direction. This mode of operation is useful if the difference between the input voltage and the output voltage is smaller than the output voltage itself, since the power dissipation in the linear regulators should be kept as low as possible. On the other hand, the power dissipation of the linear regulator would be reduced to a minimum if the output voltage is smaller than the difference between the input voltage and the output voltage and if, therefore, only LR2 were active so as to dissipate the excess current over the load.

It has been found that an optimum implementation to reduce the losses and achieve maximum efficiency is to compensate for the so-called ripple current of the buck converter from the choke L1 either by LR1 or by LR2, depending on whether the voltage difference between the input and the output is smaller or larger than the output voltage itself. The losses in the linear regulators are thus formed only by the ripple current multiplied by the smallest voltage difference between either the input and the output or the output voltage itself, so that the overall efficiency of this arrangement is almost as high as that of the buck converter without linear-regulator assistance.

In FIG. 4 it can be seen that in dynamic regulating processes, the output current is immediately supplied to the load as a constant direct current by switching on the linear regulator and the switching regulator at the time t_start. With all dynamic load changes or input voltage changes, one of the linear regulators will thus completely compensate for the slower reaction of the switching regulator, which is delayed via the time constant from the storage element L1 and the load RL itself.

Despite the simple implementation of such an arrangement, one of the disadvantages cannot be eliminated since the input voltage that may be used is larger than the output voltage. Therefore, this implementation is not suitable for applications that involve an input voltage that is lower than the output voltage, and the disadvantage of compensating for current ripple at the input of a switching regulator is not eliminated either.

Further possibilities of completely eliminating the disadvantages are not known, or the eliminate only a part of the disadvantages and thus limit the fields of application (e.g. additional circuits with capacitances to achieve a ripple-free output current [4]).

The topologies shown in FIG. 11a and FIG. 11b are known as conventional solutions for the boost converter or the SEPIC converter as the input stage of a mains appliance with sinusoidal mains voltage; suppression of the high-frequency current ripple is effected via a mains filter which involves a large amount of technical expenditure and is also entails-thermals losses, even though they are small.

Furthermore, there are so-called bridgeless boost converters [7], [8] or boost/buck converters [9], or bridgeless buck converters [10], which are suitable for an AC input Vin_AC and are used for power factor correction in that the rectifier bridge, which is connected upstream from a boost or SEPIC converter for the purpose of power factor correction, may be dispensed with to some extent. FIGS. 11c and 11d show such topologies.

These topologies have an input-side smoothing inductance which, however, cannot completely suppress the switching ripple of the current, even when working in continuous operation. Therefore, additional filter capacitors and possibly double current compensated chokes may be connected between the Vin_AC mains input and the input chokes so as to suppress high frequency interference.

In view of conventional technology, there is a need for a voltage converter concept that provides an improved compromise between efficiency, implementation expenditure and ripple.

SUMMARY

According to an embodiment, a voltage converter arrangement may have: a clocked voltage converter capable of generating an output voltage on the basis of an input voltage; and a first input regulating element connected between a first input voltage node and a second input voltage node, the second input voltage node having a reference potential, wherein the first input regulating element is configured to allow a current flow in order to counteract fluctuations in an input current of the voltage converter arrangement.

Another embodiment may have a method of operating a voltage converter arrangement, which may have: a clocked voltage converter, and a first input regulating element connected between a first input voltage node and a second input voltage node, the second input voltage node having a reference potential, which method may have the step of: counteracting fluctuations in an input current of the voltage converter by at least temporarily activating a current flow through the input regulating element.

According to another embodiment, a voltage converter arrangement may have: a clocked voltage converter capable of generating an output voltage on the basis of an input voltage; and a first input regulating element connected between a first input voltage node and a second input voltage node, the second input voltage node having a reference potential, wherein the first input regulating element is configured to allow a current flow in order to counteract fluctuations in an input current of the voltage converter arrangement; the voltage converter arrangement being configured to control or regulate a current flowing through the first input regulating element such that a sum of a current flowing through the first input regulating element and an input current of the clocked voltage converter is at least approximately constant.

According to another embodiment, a voltage converter arrangement may have: a clocked voltage converter capable of generating an output voltage on the basis of an input voltage; and a first input regulating element connected between a first input voltage node and a second input voltage node, the second input voltage node having a reference potential, wherein the first input regulating element is configured to allow a current flow in order to counteract fluctuations in an input current of the voltage converter arrangement; the voltage converter arrangement being configured to allow to allow a current flow via a second input regulating element in order to counteract fluctuations in the input current of the voltage converter arrangement and to supplement the action of the first input regulating element; the voltage converter arrangement including the second input regulating element, and the second input regulating element being connected between the first input voltage node and a first output voltage node, the first output voltage node having a potential different from the reference potential, and wherein the second input regulating element is configured to at least temporarily allow a current flow between the first output voltage node and the first input voltage node; wherein the second input regulating element is configured to allow a current flow between the first input voltage node and the first output voltage node so as to counteract variations in the input current of the voltage converter arrangement.

An embodiment according to the present invention provides a voltage converter arrangement. The voltage converter arrangement includes a clocked voltage converter capable of generating (or configured to generate) an output voltage on the basis of an input voltage. The voltage converter arrangement further comprises a first input regulating element connected between a first input voltage node and a second input voltage node, the second input voltage node having a reference potential (and can be regarded as a reference potential node, for example). The first input regulating element is configured to allow a current flow so as to counteract fluctuations in an input current of the voltage converter arrangement (which is, for example, the sum of the current flowing through the regulating element and of the input current of the clocked voltage converter), for example such that fluctuations in an input current of the voltage converter are at least partially compensated for.

The corresponding voltage converter arrangement is based on the consideration that an input ripple (e.g. fluctuations in an input current of the voltage converter arrangement) can be reduced in an efficient manner by the first input regulating element enabling a current flow which varies with time and which, for example, counteracts fluctuations in the input current of the voltage converter arrangement. For example, the current flowing through the first input regulating element may increase when the input current of the clocked voltage converter becomes less than a maximum value (for example, a floating maximum value) (for example, of the input current of the clocked voltage converter). For example, the current flowing through the first input regulating element can be controlled or regulated such that a sum of the current flowing through the first input regulating element and the input current of the clocked voltage converter is at least approximately constant, whereby, consequently, the input current of the voltage converter arrangement (which is typically the sum of the current flowing through the first input regulating element and of the input current of the clocked voltage converter) remains approximately constant.

Although the corresponding input regulating element typically entails a certain amount of power dissipation, it also typically contributes to a significant reduction of the input ripple (for example, the ripple of the input current of the voltage converter arrangement), so that, for example, input filter components involving a large amount of space and high cost such as capacitors and/or choke coils may be dimensioned to be smaller or may even be completely dispensed with. Thus, a good overall compromise between efficiency, implementation expenditure, reliability and electromagnetic compatibility (e.g. with regard to the input ripple) can be achieved.

In an advantageous embodiment, the voltage converter arrangement is configured to compensate for voltage fluctuations between the first input voltage node and the second input voltage node. For example, the clocked voltage converter may be capable of providing a constant output voltage even if there are significant voltage variations between the first input voltage node and the second input voltage node (where voltage variations between the first input voltage node and the second input voltage node may be compensated for by the clocked voltage converter at a ratio of at least 2 to 1).

In an advantageous embodiment, the clocked voltage converter is a non-inverting voltage converter. One has shown that the input regulating element explained above can be highly advantageously in such a non-inverting voltage converter so as to counteract fluctuations in the input current.

In an advantageous embodiment, the voltage converter arrangement is configured to allow a current flow through a second input regulating element to counteract fluctuations in the input current of the voltage converter arrangement. The second input regulating element can thus supplement the effect of the first input regulating element, wherein one may decide, for example, depending on the voltage ratios, by means of a controller which of the input regulating elements should take over how much current. The first input regulating element and the second input regulating element can also become alternately effective so that, for example, the first input regulating element takes over a current flow during a first part of a period duration (for example, of an input voltage or a switching period of the clocked voltage converter) and so that, for example, the second input regulating element takes over a current flow during a second part of the period duration. In this manner the losses may be further reduced in some embodiments.

In an advantageous embodiment, the voltage converter arrangement has a second input regulating element, the second input regulating element being connected between the first input voltage node and a first output voltage node. The first output voltage node advantageously has a potential that is different from the reference potential. The second input regulating element in this case advantageously is configured to at least temporarily allow a current flow between the first output voltage node and the first input voltage node (for example from the first output voltage node to the first input voltage node).

In this manner, it can be achieved, for example, that during a first part of a period, the first input regulating element leads a current flow away from the first input voltage node and that during a second part of the period duration, the second input regulating element leads a current flow towards the first input voltage node. Alternatively, depending on the respective operating state, either only the first input regulating element or only the second input regulating element may be active.

By using the two input regulating elements described above, losses can be reduced, for example, in that that one of the input regulating elements which results in the lowest losses in the respective operating state becomes active (conducts a current). Depending on the voltage ratios, a controller which drives the input regulating elements and which advantageously also drives the clocked voltage converter can thus determine a minimum current or a maximum current or an average current of the clocked voltage converter, for example such that the current flowing through one of the input regulating elements or the current flowing (in a advantageously alternate manner) through both input regulating elements causes minimal losses.

In an advantageous embodiment, the second input regulating element is configured to allow current flow between the first input voltage node and the first output voltage node to counteract fluctuations in the input current of the voltage converter arrangement. For example, a current may flow from the first input voltage node to the first output voltage node via the second input regulating element, or a current may flow from the first output voltage node to the first input voltage node through the second input regulating element. For example, the current flow through the second input regulating element may flow towards the first input voltage node while the current flow through the first input regulating element may flow away from the first input voltage node (or vice versa). This means that by suitably combining or driving of the two input regulating elements, one may achieve that fluctuations (for example ripple-like fluctuations) in the input current of the clocked voltage converter with respect to a desired input current of the voltage converter arrangement are at least partially compensated for by a current flowing from the first output voltage node via the second input regulating element to the first input voltage node, and/or in that an input current of the clocked voltage converter, which is smaller than a desired input current of the voltage converter arrangement, is compensated for by a current flow from the first input voltage node to the second input voltage node via the first input regulating element. Thus, for example, an approximately constant input current of the voltage converter arrangement can be achieved, regardless of whether a current (instantaneous) input current of the clocked voltage converter is larger or smaller than a desired (e.g., current or instantaneous) input current of the voltage converter arrangement.

In an advantageous embodiment, the voltage converter arrangement is configured to provide the output voltage on the basis of the input current, where an amount of the output voltage is larger than an amount of the input voltage. In such an example, the presence of the first input regulating element is particularly useful because it is often not possible to efficiently counteract the fluctuations in the input current of the voltage converter arrangement by a regulation element connected between the first input voltage node and the first output voltage node.

In an advantageous embodiment, the voltage converter arrangement is configured such that an input current of the clocked voltage converter, apart from current fluctuations that are at most 10% of a current amplitude of the input current of the clocked voltage converter, is not exceeded within a time period (e.g. within a period of the input voltage) is proportional to an input voltage, wherein a frequency of the input voltage is lower (or significantly lower, for example at least by a factor of 10) than a switching frequency of the clocked voltage converter (which for example has a sinusoidal characteristic or a characteristic in the form of a sinusoidal half-wave). The voltage converter arrangement is advantageously configured to adapt (e.g. control or regulate) a current flow through the first input regulating element (for example in a time-variable manner), in that the current flow through the first input regulating element at least temporarily (or also during the entire sinusoidal half-wave) counteracts the current fluctuations in the input current of the clocked voltage converter (for example deviations from an ideal sinusoidal characteristic) (for example in order to thus keep current fluctuations in an input current of the voltage converter arrangement lower than current fluctuations in the clocked voltage converter, or in order to approximate an input current of the voltage converter arrangement to a sinusoidal characteristic).

By designing the voltage converter arrangement accordingly, harmonics, for example, are kept comparatively low. The input regulating element has the effect, for example, that fluctuations in the input current of the clocked voltage converter (which result, for example, from the clocked operation of the clocked voltage converter) may not fully affect the input current of the voltage converter arrangement, but may affect them to a lesser extent only. In that the current flow through the first input regulating element counteracts the current fluctuations in the clocked voltage converter (which, for example, have a significantly shorter period duration than the input voltage), one may achieve reducing a ripple on the input current of the voltage converter arrangement. Thus one can achieve that the input current of the voltage converter arrangement is at least approximately proportional to the input voltage of the voltage converter arrangement, whereby an electromagnetic compatibility of this voltage converter arrangement can be improved even without any complex input filters. This results in a good compromise between costs and undesired mains feedback effects.

In an advantageous embodiment, the voltage converter arrangement has a third input regulating element, the third input regulating element being connected between the first input voltage node and the first output voltage node, the first output voltage node having a potential different from the reference potential. For example, the third input regulating element may be parallel to the above-mentioned second input regulating element but allow a current flow in the opposite direction to that of the second input regulating element. For example, the third input regulating element is configured to allow, at least temporarily, a current flow between the first input voltage node and the first output voltage node, which is opposite a current flow through the second input regulating element, for example.

With a corresponding voltage converter arrangement, which may, for example, have three input regulating elements, it can be flexibly decided by a controller, depending on the respective operating state, for example depending on the relation between an input voltage and an output voltage, through which of the input regulating element(s) a current is to flow. By using (or by the presence of) both the second input regulating element and the third input regulating element, it can be achieved, for example, that a current can flow both from the first input voltage node to the first output voltage node and from the first output voltage node to the first input voltage node. In addition, a current flow from the first input voltage node to the second input voltage node (or vice versa) may also take place through the first input regulating element. Thus, one may flexibly select (for example by controlling the voltage converter arrangement) through which of the input regulating elements a current is to flow in order to keep the input current of the voltage converter arrangement at least approximately constant, even if the input current of the clocked voltage converter varies.

In an advantageous embodiment, the voltage converter arrangement has a second input regulating element, the second input regulating element being connected between the first input voltage node and the first output voltage node. The voltage converter arrangement also has a third input regulating element, the third input regulating element being connected between the first input voltage node and the first output voltage node. The voltage converter arrangement is configured to allow (e.g. selectively) a current to flow via the second input regulating element when the input voltage (or an amount of the input voltage) of the voltage converter arrangement is larger than a difference between the output voltage of the voltage converter arrangement and the input voltage (or than an amount of the potential difference between the first input voltage node and the first output voltage node). The voltage converter arrangement is further configured to allow (e.g. selectively) a current to flow via the first input regulating element when the input voltage deviates from the output voltage by at most 10% (or by at most +/−1V, or by at most +/−2V, or by at most +/−5V). The voltage converter arrangement is further configured to allow (e.g. selectively) a current to flow via the first input regulating element when the input voltage (or an amount of the input voltage) is less than the difference between the output voltage and the input voltage (or than an amount of the potential difference between the first input voltage node and the first output voltage node). The voltage converter arrangement is further configured to allow (e.g. selectively) a current to flow via the second input regulating element and/or the first input regulating element when the input voltage deviates from half the output voltage by at most 10% (or by at most +/−1V, or by at most +/−2V, or by at most +/−5V). The voltage converter arrangement is further configured to allow (e.g. selectively) a current to flow via the third input regulating element when the input voltage (or an amount of the input voltage) is larger than the output voltage.

An appropriate mechanism is provided to enable fluctuations in the input current of the clocked voltage converter in different operating states (or even during different phases of a period of the input voltage), each with good efficiency.

In an advantageous embodiment, the clocked voltage converter is a boost converter (step-up converter) and/or a SEPIC converter and/or a Cuk converter. One has found that the concept described herein can be employed particularly well with such converter types.

In an advantageous embodiment, the second input regulating element and/or the third input regulating element and/or the first input regulating element is implemented by using a bipolar transistor. One has found that bipolar transistors are particularly well suited for corresponding regulation.

In an advantageous embodiment, the voltage converter arrangement has a second input regulating element connected between the first input voltage node and a first output voltage node different from a reference potential node (the first output voltage node having, for example, a potential different from the reference potential). The clocked voltage converter is advantageously configured—in an operating state in which an amount of the input voltage is equal to (or, deviates, e.g., by a maximum of 10%, or by a maximum of +/−1V, or by a maximum of +/−2V, or by a maximum of +/−5V from) the amount of a potential difference between the first input voltage node and the first output voltage node and in which the amount of the input voltage is less than an amount of the output voltage (hereinafter also described as "case 4")—to have a pulsating input current (the maximum amount value of which is, for example, larger than a current value, that may be used or is desired, of the voltage converter arrangement, and the minimum amount value of which is, for example, less than the input current value, that may be used or is desired, of the voltage converter arrangement). For example, the first input regulating element and the second input regulating element are configured, in that operating state in which the amount of the input voltage corresponds to the amount of the potential difference between the first input voltage node and the first output voltage node and in which the amount of the input voltage is smaller than the amount of the output voltage, to at least partially compensate for fluctuations in the input current of the clocked voltage converter by the first input regulating element enabling a temporally pulsating current flow between the first input voltage node and the reference potential node and by the second input regulating element enabling a temporally pulsating current flow between the first output voltage node and the first input voltage node. For example, the pulsating current flow through the second input regulating element and the pulsating current flow through the first input regulating element alternate in time (i.e. they do not occur simultaneously). For example, a current flow through the second input regulating element occurs if an instantaneous current of the input current is less than a current value that may be used (or a desired current value) of the voltage converter arrangement. For example, if an instantaneous current of the input current of the clocked voltage converter arrangement is less than a current value that may be used (or a desired current value) of the voltage converter arrangement, current will flow through the first input regulating element. The current flow takes place, for example, such that the input current of the voltage converter arrangement is temporarily smaller than the input current of the clocked voltage converter and that the input current of the voltage converter arrangement is temporarily larger than an input current of the clocked voltage converter, or that a time curve of the input current of the voltage converter arrangement is a time-smoothed version of the time curve of the input current of the clocked voltage converter. By means of the aforementioned driving, it can be achieved, for example, that the voltage converter arrangement compensates for fluctuations in the input current of the clocked voltage converter in completely different operating states, wherein losses are kept low.

In an advantageous embodiment, the voltage converter arrangement has a second input regulating element connected between the first input voltage node and a first output voltage node different from a reference potential node. For example, the first output voltage node has a potential different from the reference potential. For example, the clocked voltage converter is configured (or is driven) to have a pulsating input current whose minimum value is at least as large as an input current value, that may be used or is desired, of the voltage converter arrangement in an operating state in which an amount of the input voltage is larger than an amount of the potential difference between the first input voltage node and the first output voltage node, and in which the amount of the input voltage is less than an amount of the output voltage (herein also described as "case 1"). The second input regulating element is configured, for example, to at least partially compensate for fluctuations in the input current of the clocked voltage converter in that operating state in which the amount of the input voltage is larger than the amount of the potential difference between the first input voltage node and the first output voltage node, and in which the amount of the input voltage is less than the amount of the output voltage, by enabling the second input regulating element to enable a temporally pulsating current flow between the first output voltage node and the first input voltage node. In the operating state mentioned (in which the amount of the input voltage is larger than the amount of the potential difference between the first input voltage node and the first output voltage node), fluctuations in the input current of the clocked voltage converter can be efficiently counteracted by configuring the voltage converter arrangement appropriately. For example, in the above-mentioned case, a power dissipation that occurs in the second input regulating element is smaller than a power dissipation that would occur in the first input regulating element if the first input regulating element were used. The second input regulating element thus supplements the first input regulating element to the effect that a controller can decide whether compensation for fluctuations in the input current of the clocked voltage converter is more efficient when it is effected by the first input regulating element or by the second input regulating element.

In an advantageous embodiment, the clocked voltage converter is configured (or driven) to have a pulsating input current in an operating state in which an amount of the input voltage corresponds to an amount of the output voltage (e.g., deviates from the amount of the output voltage by at most 10%, or by at most +/−1V, or by at most +/−2V, or by at most +/−5V) (this is also referred to herein as "case 2"). For example, a maximum value of the pulsating input current of the clocked voltage converter is at most as large as an input current value, that may be used or is desired, of the voltage converter arrangement. The first input regulating element is configured to at least partially compensate for fluctuations in the input current of the clocked voltage converter in that operating state in which the amount of the input voltage corresponds to the amount of the output voltage, by the first input regulating element enabling a temporally pulsating current flow between the first input voltage node and the reference potential node. Thus the input current of the voltage converter arrangement is larger than or equal to the input current of the clocked voltage converter.

The presence of the first input regulating element in the operating state mentioned is advantageous because, due to the comparatively small difference between the input voltage and the output voltage, current flow from the first input voltage node to a first output voltage node and current flow from a first output voltage node (first output terminal) to the first input voltage node (first input terminal) is possible only to a limited extent. The first input regulating element is thus, e.g. in the operating state mentioned, the means of choice for counteracting fluctuations in the input current of the voltage converter arrangement (or at for least partially compensating for fluctuations in the input current of the clocked voltage converter).

In an advantageous embodiment, the clocked voltage converter is configured (or is driven) to have a pulsating input current (the maximum value of which, for example, is at most as large as an input current value, that may be used or is desired, of the voltage converter arrangement) in an operating state in which an amount of the input voltage is smaller than an amount of the potential difference between the first input voltage node and the first output voltage node, and in which the amount of the input voltage is smaller than an amount of the output voltage (hereinafter also referred to as "case 3"). The first input regulating element is configured to compensate at least partially for fluctuations in the input current of the clocked voltage converter in this operating state in which the amount of the input voltage is smaller than the amount of the potential difference between the first input voltage node and the first output voltage node and in which the amount of the input voltage is smaller than the amount of the output voltage, by the first input regulating element enabling a temporally pulsating current flow between the first input voltage node and the second input voltage node (which may be a reference potential node).

By means of the above-mentioned configuration of the voltage converter arrangement or by driving the first input regulating element accordingly, one achieves that in the operating state mentioned, the compensation for fluctuations in the input current of the clocked voltage converter takes place with minimum losses. Since in the operating state mentioned, the amount of the input voltage is smaller than the amount of the potential difference between the first input voltage node and the first output voltage node, power dissipation in the first input regulating element is typically smaller than in any possible further input regulating elements which may be connected between the first input voltage node and the first output voltage node. Thus, the first input regulating element can fully exploit its advantages in this operating state.

In an advantageous embodiment, the voltage converter arrangement has a third input regulating element, the third input regulating element being connected between the first input voltage node and the first output voltage node. For example, the third input regulating element is connected in parallel with the above-mentioned second input regulating element, but is designed for an opposite direction of current flow as compared to the second input regulating element. The first output voltage node, incidentally, advantageously has a potential that is different from the reference potential.

The clocked voltage converter is configured to have a pulsating input current in an operating state in which an amount of the input voltage is larger than an amount of the output voltage (wherein a maximum value of the pulsating input current of the clocked voltage converter is, for example, at most as large as an input current value, that may be used or is desired, of the voltage converter arrangement). The third input regulating element is configured to compensate for fluctuations in the input current of the clocked voltage converter in that operating state in which the amount of the input voltage is larger than the amount of the output voltage, by the third input regulating element enabling a temporally pulsating current flow between the first input voltage node and the first output voltage node.

By designing the voltage converter arrangement accordingly or by driving the third input regulating element accordingly one can achieve that fluctuations in the input current of the clocked voltage converter will be compensated for in an energy-efficient manner. Specifically, in the aforementioned operating state, the third input regulating element typically has a lower power dissipation than, for example, the first input regulating element since the amount of the voltage difference between the first input voltage node and the first output voltage node is typically smaller than the amount of the input voltage between the first input voltage node and the second input voltage node. Thus, the presence or appropriate driving of the third input regulating element enables low-loss operation (or a low-loss reduction of fluctuations in the input current of the voltage converter arrangement) in the operating state mentioned.

In an advantageous embodiment, the voltage converter arrangement is configured to take up an input current so that a time curve of the input current at least over a period of time (for example during a period duration of the input voltage) is approximately proportional to an input voltage (for example with a maximum deviation of at most 10%, on the basis of an amplitude of the input voltage or, alternatively, of the input current). A frequency of the input voltage is advantageously smaller (or significantly smaller, for example by at least a factor of 10) than a switching frequency of the clocked voltage converter. The input voltage has, for example, a curve of a sinusoidal half-wave. The voltage converter arrangement is configured such that a (e.g. pulsating) curve of an input current of the voltage converter arrangement within a first time range which corresponds to a zero value (e.g. a zero crossing) of the sinusoidal half-wave, and which extends over a plurality of periods of the input current of the clocked voltage converter, is larger in amount than the input current of the clocked voltage converter (so that the pulsation of the input current of the voltage converter near the zero crossing can be compensated for by LR4 or only by LR4, LR4 being driven accordingly by the voltage converter arrangement).

Appropriate design of the voltage converter arrangement can ensure that only low harmonics are generated. By driving the clocked voltage converter such that its input current is smaller in terms of amount than the (desired) input current of the voltage converter arrangement, one can achieve that fluctuations in the input current of the clocked voltage converter are compensated for by the first input regulating element. This is particularly advantageous because the first input regulating element operates with particularly low losses within the first time range adjacent to a zero value of the sinusoidal half-wave, since the voltage drop across the first input regulating element is comparatively small in this case.

In another advantageous embodiment, the voltage converter arrangement is configured to at least partially compensate for fluctuations in an input current of the clocked voltage converter by means of a time-varying current flow through the first input regulating element when an amount of the input voltage is smaller than an amount of a difference between the input voltage and the output voltage and when the amount of the input voltage is smaller than the amount of the output voltage (or when the input voltage is smaller than the difference between the output voltage and the input voltage and when the output voltage is larger than the input voltage). A (selective) compensation for fluctuations in an input current of the clocked voltage converter by means of a time-varying current flow through the first input regulating element can be carried out in a particularly low-loss manner in the operating state mentioned. For example, in the operating state mentioned, a power dissipation of the first input regulating element is less than a power dissipation of a possible additional input regulating element connected, for example, between the first input voltage terminal and the second input voltage terminal. Thus, by (selectively) using the first input regulating element in the operating state mentioned while, for example, using a further input regulating element connected between the first input voltage node and the first output voltage node in other operating states, losses caused by the input regulating elements can be kept low.

In another advantageous embodiment, the voltage converter arrangement is configured to at least partially compensate for fluctuations in an input current of the clocked voltage converter by means of a time-varying current flow through a second input regulating element when an amount of the input voltage is larger than an amount of a difference between the input voltage and the output voltage and when the amount of the input voltage is less than the amount of the output voltage (or when the input voltage is larger than the difference between the output voltage and the input voltage and when the output voltage is larger than the input voltage). The second input regulating element is connected between the first input voltage node and a first output voltage node, the first output voltage node having a potential different from the reference potential.

It has been recognized that in the operating state mentioned, the second input regulating element can compensate for the fluctuations in the input current of the clocked voltage converter with less loss than can the first input regulating element, for example. Thus, for example, the first input regulating element and the second input regulating element can complement each other in order to compensate for fluctuations in the input current of the clocked voltage converter with low losses in various operating states. A controller can decide, for example, on the basis of the voltage relation(s) (for example on the basis of a relation between the input voltage and the output voltage) which of the input regulating elements (e.g. the first input regulating element or the second input regulating element or a possibly existing third input regulating element) takes over compensation for the fluctuations in the input current of the clocked voltage converter.

In an advantageous embodiment, the voltage converter arrangement is configured to at least partially compensate for fluctuations in an input current of the clocked voltage converter by a time-varying, alternating current flow through the first input regulating element and through a second input regulating element, when an amount of the input voltage is about 50% of an amount of the output voltage (for example with a tolerance of +/−10%, or with a tolerance of +/−1V or +/−2V or +/−5) and when an amount of the input voltage is less than an amount of the output voltage, or when an amount of the input voltage is between 40% and 60% of an amount of the output voltage and when the amount of the input voltage is less than the amount of the output voltage. The second input regulating element is connected between the first input voltage node and a first output voltage node, the first output voltage node having a potential different from the reference potential.

This embodiment is based on the finding that in a situation where an amount of the input voltage is approximately half of an amount of the output voltage, a particularly energy-saving compensation for fluctuations in the input current of the clocked voltage converter can be performed by a current flowing (for example within a period of the clocked voltage converter) through both the first input regulating element and the second input regulating element. For example, the first input regulating element subtracts a current from the first input voltage node if an input current of the clocked voltage converter is less than a (current) target input current of the voltage converter arrangement. On the other hand, the second input regulating element can, for example, feed a current into the first input voltage node if, for example, an input current of the clocked voltage converter is larger than a (current) target input current of the voltage converter arrangement. The clocked voltage converter can thus be operated, for example, such that its input current (during a period of the clocked voltage converter) is temporarily larger and temporarily smaller than the (current) target input current of the voltage converter arrangement. In this manner, energy-efficient operation is made possible since the maximum current flowing through the input regulating elements is smaller than a maximum current that would flow through the corresponding input regulating element if only one input regulating element were used. This reduces power dissipation.

In an advantageous embodiment, the voltage converter arrangement is configured to at least partially compensate for fluctuations in an input current of the clocked voltage converter by means of a time-varying current flow through a third input regulating element when an amount of the input voltage is larger than an amount of the output voltage (or when the input voltage is larger than the output voltage). The third input regulating element is connected between the first input voltage node and a first output voltage node, the first output voltage node having a potential which is different from the reference potential (e.g. allows a current flow in the direction opposite to that of the second input regulating element LR3).

By using the third input regulating element, low-loss compensation for the fluctuations in the clocked voltage converter can thus also take place in the operating condition mentioned, while in the operating state mentioned, losses in the first input regulating element would be larger than losses in the third input regulating element. Due to the presence of two or three input regulating elements, for example the first input regulating element and the third input regulating element (or, optionally, also the above-mentioned second input regulating element), it can thus be achieved that the losses at various operating points of the voltage converter arrangement are kept low.

In an advantageous embodiment, the voltage converter arrangement is configured such that within a second time range, during which the input voltage of the voltage converter arrangement is smaller than the output voltage of the voltage converter arrangement and which is closer in time to a maximum of the sinusoidal half-wave than is the first time range, a pulsating characteristic of an input current of the clocked voltage converter is larger in amount than the input current of the voltage converter arrangement (so that the pulsation of the input current of the clocked voltage converter within the second time range can be compensated for by LR3 or only LR3, LR3 being driven accordingly by the voltage converter arrangement). An appropriate design of the voltage converter arrangement ensures that operation with comparatively low losses can take place within the second time range. By designing the voltage converter arrangement such that the amount of the pulsating characteristic of the input current of the clocked voltage converter is larger than the input current of the voltage converter arrangement, it is thus made possible for a current to flow through the second input regulating element to the first input voltage node (for example from the first output voltage node) in order to compensate for fluctuations in the input current of the clocked voltage converter arrangement. This allows losses to be kept lower at suitable voltage ratios (for example, when the current input voltage is less than the current output voltage) because the voltage drop across the second input regulating element will then be less than the voltage drop across the first input regulating element.

In an advantageous embodiment, the voltage converter arrangement is configured such that within a third time range, during which the input voltage of the voltage converter arrangement is smaller than the output voltage of the voltage converter arrangement (e.g. half the output voltage) and which is closer in time to a maximum of the sinusoidal half-wave than is the first time range, a pulsating characteristic of an input current of the clocked voltage converter within a period of the pulsating characteristic is temporarily smaller in amount than the input current of the voltage converter arrangement and is temporarily larger in amount than the input current of the voltage converter arrangement. Thus, for example, the pulsation of the input current of the clocked voltage converter can be (alternately) compensated for by LR3 and LR4 together within the third time range, LR3 and LR4 being driven accordingly by the voltage converter arrangement. Thus, for example, the implementation mentioned achieves that a current flowing through the first input regulating element is temporarily drawn from the first input voltage node and that a current flowing through the second input regulating element (e.g. LR3) is temporarily supplied to the first input voltage node. This makes the losses particularly low, since the maximum current flowing through the first input regulating element or through the second input regulating element is kept comparatively small (for example, smaller than in a case in which only one of the input regulating elements would be active).

In summary, it may be stated that because the characteristic of the input current of the clocked voltage converter (in some operating states) is less in amount than that of the desired input current of the voltage converter arrangement, fluctuations in the input current of the clocked voltage converter are compensated for by diverting a current flowing through the respective regulating elements from the first input voltage node. Because the characteristic of the input current of the clocked voltage converter (in some operating states) is larger in amount than the desired input current of the voltage converter arrangement, fluctuations in the input current of the clocked voltage converter can be compensated for by directing a current flowing through the corresponding regulating element to the first input voltage node (for example, from the first output voltage node). By driving the clocked voltage converter accordingly, the latter can thus be set to compensate for its input current ripple in the most energy-efficient manner possible.

In an advantageous embodiment, the voltage converter arrangement is configured such that within a fourth time range, during which the input voltage of the voltage converter arrangement is larger than the output voltage of the voltage converter arrangement and which is closer in time to a maximum of the sinusoidal half-wave than is the first time range, a pulsating characteristic of an input current of the clocked voltage converter is smaller in amount than the (desired) input current of the voltage converter arrangement (so that, for example, the pulsation of the input current of the clocked voltage converter by LR1 or can only be compensated for by LR1, LR1 being driven accordingly by the voltage converter arrangement). For example, in that a current is derived by LR1 from the first input voltage node toward the first output voltage node, one achieves that fluctuations in the input current of the clocked voltage converter can be compensated for with low loss.

In an advantageous embodiment, a regulating frequency (or regulating speed) of a linear regulator formed while using the first input regulating element is larger (or faster) than a clock frequency (or period duration) of the clocked voltage converter. Alternatively or additionally, a regulating frequency (or regulating speed) of a linear regulator formed while using the second input regulating element is larger (or faster) than a clock frequency (or period duration) of the clocked voltage converter. Alternatively or additionally, a regulating frequency (or regulating speed) of a linear regulator formed while using the third input regulating element is larger (or faster) than a clock frequency (or period duration) of the clocked voltage converter. In this manner, the linear regulators are made to operate "fast" as compared to the input current ripple of the clocked voltage converter, whereby the linear regulator(s) can substantially compensate for fluctuations in the input current of the clocked voltage converter.

In an advantageous embodiment, the voltage converter arrangement has a second input regulating element, the second input regulating element being connected between the first input voltage node and a first output voltage node, the first output voltage node having a potential different from the reference potential. The second input regulating element is configured to allow, at least temporarily, a current flow between the first output voltage node and the first input voltage node (for example, from the first output voltage node to the first input voltage node). The voltage converter arrangement further comprises a regulating circuit configured to regulate a current flow through the first input regulating element and the second input regulating element so as to work, as a regulating target, towards achieving a fixedly predetermined or variably adjustable ratio between an input voltage of the voltage converter arrangement (e.g. between the first input voltage node and the second input voltage node) and an input current of the voltage converter arrangement. In this manner, the current regulation performed while using the first input regulating element and the second input regulating element can cause the input current and the input voltage of the voltage converter arrangement to be at least approximately proportional to each other, which results in a substantially resistive behavior of the voltage converter arrangement and additionally keeps undesirable mains feedback effects low.

In an advantageous embodiment, the voltage converter arrangement comprises a first amplifier circuit configured to scale a voltage which drops across a current measuring resistor and is proportional to the input current of the voltage converter arrangement so as to obtain a first scaled voltage value proportional to the input current of the voltage converter arrangement. The voltage converter arrangement further comprises a fixed or variable voltage divider configured to produce a second scaled voltage value proportional to the input voltage of the voltage converter arrangement. The voltage converter arrangement further comprises a regulating amplifier (variable gain amplifier) configured to receive the first scaled voltage value and the second scaled voltage value and to provide drive signals for the first input regulating element and the second input regulating element or a common drive signal for the first input regulating element and the second input regulating element so as to reduce or minimize a difference between the first scaled voltage value and the second scaled voltage value.

In this manner, regulation can be implemented in a manner that is easily implementable, in terms of circuitry, so as to regulate the input current and input voltage of the voltage converter arrangement to a achieve predetermined ratio.

In an advantageous embodiment, the voltage converter arrangement is configured to set a voltage divider ratio of the voltage divider in dependence on a power delivered to the load by the voltage converter arrangement in order to adapt a target ratio between the input voltage of the voltage converter arrangement (e.g. between the first input voltage node and the second input voltage node) and the input current of the voltage converter arrangement to the power delivered to the load (so that, for example, the result is that the input power of the voltage converter arrangement is adapted to the output power of the voltage converter arrangement that is delivered to the load). This ensures that the voltage converter arrangement can be operated efficiently since in this manner, it is achieved that power dissipation is kept low. In particular, it is not necessary to consume a significant portion of the power through regulating elements (e.g. input regulating elements) or to convert it into heat. Thus, by adapting the target ratio between the input voltage of the voltage converter arrangement and the input current of the voltage converter arrangement to the load, losses in the input regulating elements can be reduced to a level that may be used as a minimum level.

In an advantageous embodiment, the voltage converter arrangement is configured to adjust a voltage divider ratio of the voltage divider in response to a feedback signal from an output of the voltage converter arrangement that is used for setting a duty cycle of a switching signal of the clocked voltage converter. The feedback signal can, for example, be formed on the basis of a difference between an actual output voltage of the voltage converter arrangement and a target output voltage of the voltage converter arrangement. This allows the voltage divider ratio to be set or regulated in a very efficient manner, the feedback signal being an important indicator in terms of whether more or less power should be supplied to the output of the voltage converter arrangement.

In an advantageous embodiment, the voltage converter arrangement has a third input regulating element, the third input regulating element being connected between the first input voltage node and the first output voltage node (for example in parallel with the second input regulating element; a current flow may be opposite). For example, the first output voltage node has a potential different from the reference potential. The third input regulating element is configured to allow, at least temporarily, a current flow between the first input voltage node and the first output voltage node which is opposite to a current flow through the second input regulating element. Incidentally, the regulating circuit is configured to regulate a current flow through the first input regulating element and/or through the second input regulating element or to control a current flow through the third input regulating element as a function of a relation between an input voltage of the voltage converter arrangement and an output voltage of the voltage converter arrangement, in order to work, as a regulating target, towards achieving a fixedly predetermined or variably adjustable ratio between an input voltage of the voltage converter arrangement (e.g. between the first input voltage node and the second input voltage node) and an input current of the voltage converter arrangement. Thus, depending on the relationship between the input voltage of the voltage converter arrangement and the output voltage of the voltage converter arrangement, that combination of input regulating elements (e.g. first input regulating element and second input regulating element) and/or that input regulating element (e.g. third input regulating element) which promises the best efficiency or the lowest possible losses can be used to achieve the desired ratio between the input voltage of the voltage converter arrangement and the input current of the voltage converter arrangement.

For example, the first input regulating element and/or the second input regulating element may well be used to achieve the desired ratio between the input voltage and the input current when the input voltage is less than the output voltage (which is the case, with a sinusoidal input voltage, at least during part of a period duration). When, on the other hand, the input voltage is higher than the output voltage, regulation may be more advantageously performed by the third input regulating element. A corresponding changeover of which input regulating element(s) should be active during a period duration (a changeover of the active input regulating elements can readily take place once or several times within a period duration) thus enables optimization of efficiency or a reduction of losses.

In an advantageous embodiment, the voltage converter arrangement comprises a first amplifier circuit configured to scale a voltage that drops across a current measuring resistor and is proportional to the input current of the voltage converter arrangement so as to produce a first scaled voltage value proportional to the input current of the voltage converter arrangement. The voltage converter arrangement further comprises a fixed or variable voltage divider configured to produce a second scaled voltage value proportional to the input voltage of the voltage converter arrangement. The voltage converter arrangement further comprises a regulating amplifier configured to receive the first scaled voltage value and the second scaled voltage value and to generate drive signals for the first input regulating element and the second input regulating element or a common drive signal for the first input regulating element and the second input regulating element so as to reduce or minimize a difference between the first scaled voltage value and the second scaled voltage value. The voltage converter arrangement is further configured to set, for example, a scaling ratio for the voltage dropping across the current measuring resistor and/or a scaling ratio of the voltage divider as a function of a power supplied to the load by the voltage converter arrangement so as to adapt a target ratio between the input voltage of the voltage converter arrangement (e.g. between the first input voltage node and the second input voltage node) and the input current of the voltage converter arrangement to the power supplied to the load (so that as a result, the input power of the voltage converter arrangement is adapted to the output power of the voltage converter arrangement that is supplied to the load).

Such a circuit arrangement can be implemented with comparatively little effort and makes it possible to keep losses due to input regulating elements as small as possible.

In an advantageous embodiment, the voltage converter arrangement is configured to achieve the regulating target, which is defined as the target ratio between the input voltage of the voltage converter arrangement and the input current of the voltage converter arrangement (for example by influencing the voltage divider ratio of the voltage divider in dependence on a power supplied by the voltage converter arrangement to the load and/or in dependence on a current flowing through the first input regulating element and/or in dependence on a current flowing through the second input regulating element and/or in dependence on a current flowing through the third input regulating element and/or in dependence on a total current flowing through the input regulating elements). By setting the regulating target accordingly, the power dissipation of the voltage converter arrangement can be kept small, while regulation works toward reducing mains-borne interference.

In an advantageous embodiment, a regulating speed (or regulating frequency) of a linear regulator formed while using the first input regulating element is faster (for example at least by a factor of 5 or at least by a factor of 10 or at least by a factor of 20) than a setting speed or regulating speed when the reference ratio of the input current and the input voltage is adapted as the regulating target. This prevents the regulating target from fluctuating too quickly, which might result in instabilities and/or input-side interference.

In an advantageous embodiment, the voltage converter circuit is designed so that input signals of the regulating circuit are within a range of at most +/−15 V or of at most +/−5 V around a reference potential of the regulating circuit. This ensures that the regulating circuit can be implemented with easily available operational amplifiers.

In an advantageous embodiment, the first input voltage node and the second input voltage node are coupled to a rectifier circuit so that an input voltage of the voltage converter arrangement is formed by a unidirectional AC voltage. This ensures that the polarity of the input voltage remains unchanged, which keeps the implementation effort low. Optionally, smoothing capacitors may be omitted, which typically improves the reliability of the circuit arrangement.

In an advantageous embodiment, at least one switching transistor used in the clocked voltage converter is a gallium nitride transistor or a silicon carbide transistor. Alternatively or additionally, at least one diode used in the clocked voltage converter is a gallium nitride diode or a silicon carbide diode. One has found that the use of gallium nitride components or silicon carbide components typically results in high power density and low losses.

An embodiment according to the invention provides a method of operating a voltage converter arrangement comprising a clocked voltage converter and a first input regulating element connected between a first input voltage node and a second input voltage node, the second input voltage node having a reference potential. The method comprises counteracting fluctuations in an input current of the voltage converter (or voltage converter arrangement) by at least temporarily activating a current flow through the input regulating element.

The method is based on the same considerations as those underlying the device described above. The method can be further supplemented by all the features, functionalities and details described herein with respect to the corresponding device (in particular the voltage converter arrangement), individually or in combination.

BRIEF DESCRIPTION OF THE DRAWINGS

Embodiments of the present invention will be detailed subsequently referring to the appended drawings, in which:

FIG. 7 shows a graphic representation of ripple current compensation for a pulse-width modulated converter (PWM converter) by linear regulators LR3 and LR4 (case 4 of table 3 and table 4);

FIG. 8 shows a schematic representation of ripple current compensation for the PWM converter by linear regulator LR3 (case 1 of table 3 and table 4);

FIG. 13c shows a simplified circuit diagram of an inventive implementation (or embodiment) of a linear-support boost converter according to FIG. 13a, combined with two linear regulators, and an implementation of an inventive regulating function of the linear-support step-up converter for ripple current suppression at the input and voltage-controlled power factor correction with variable voltage reference across the function Kv(s);

FIG. 13d shows a simplified circuit diagram of an inventive implementation (or embodiment) of a linear-support boost converter according to FIG. 13a, combined with two linear regulators, and an implementation of an inventive regulating function of the linear-support step-up converter for ripple current suppression at the input and voltage-controlled power factor correction with variable voltage reference across the function of two inverting amplifiers with a time delay (low-pass filters Ry2, Ry3, Cy3 and Ry5, Ry6, Cy6);

FIG. 15a shows a simplified circuit diagram of an inventive implementation (or embodiment) of a SEPIC converter, combined with three linear regulators;

FIG. 15b shows an inventive implementation (or embodiment) of a linear-support SEPIC converter according to FIG. 15a, combined with three linear regulators, and an implementation of an inventive regulating function of the linear-support step-up/step-down converter for ripple current suppression at the input and voltage-controlled power factor correction with variable voltage reference across the function Kv(s);

FIG. 15c shows a simplified circuit diagram of an inventive implementation of a linear-support SEPIC converter according to FIG. 15a, combined with three linear regulators, and an implementation of an inventive regulating function of the linear-support step-up/step-down converter for ripple current suppression at the input and voltage-controlled power factor correction with variable voltage reference across the function Kv(s) and correction function of the voltage reference Vuref by sensing the currents $I_{reg1}$, $I_{reg3}$, $I_{reg4}$ in the linear regulators;

FIG. 17 shows a tabular representation of an activation function of the linear regulators, for example for the implementations of FIG. 10 (table 2);

FIG. 18 shows a tabular representation of an activation function of the linear regulators, for example for the implementations of FIGS. 12 and 13 (table 3);

FIG. 19 shows a tabular representation of an activation function of the linear regulators, for example for the implementations of FIGS. 14 and 15 (table 4).

DETAILED DESCRIPTION OF THE INVENTION

1. Voltage Converter Arrangement in Accordance with FIG. 5

Figure 1:
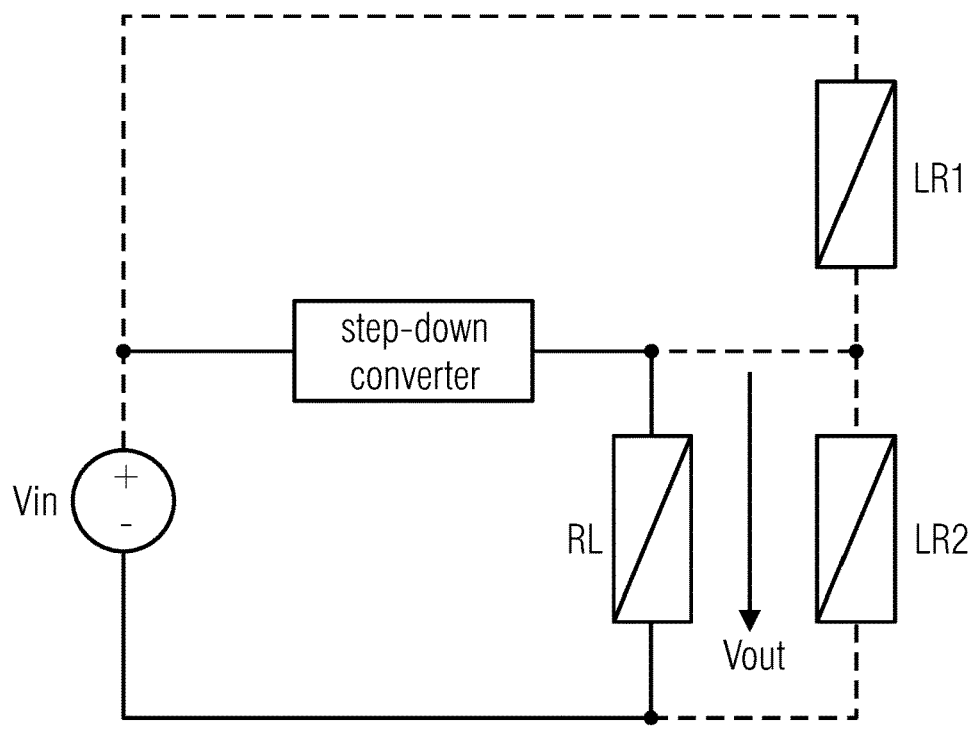
FIG. 1 shows a block diagram of a linear-support buck converter, in accordance with a conventional solution.
Figure 2:
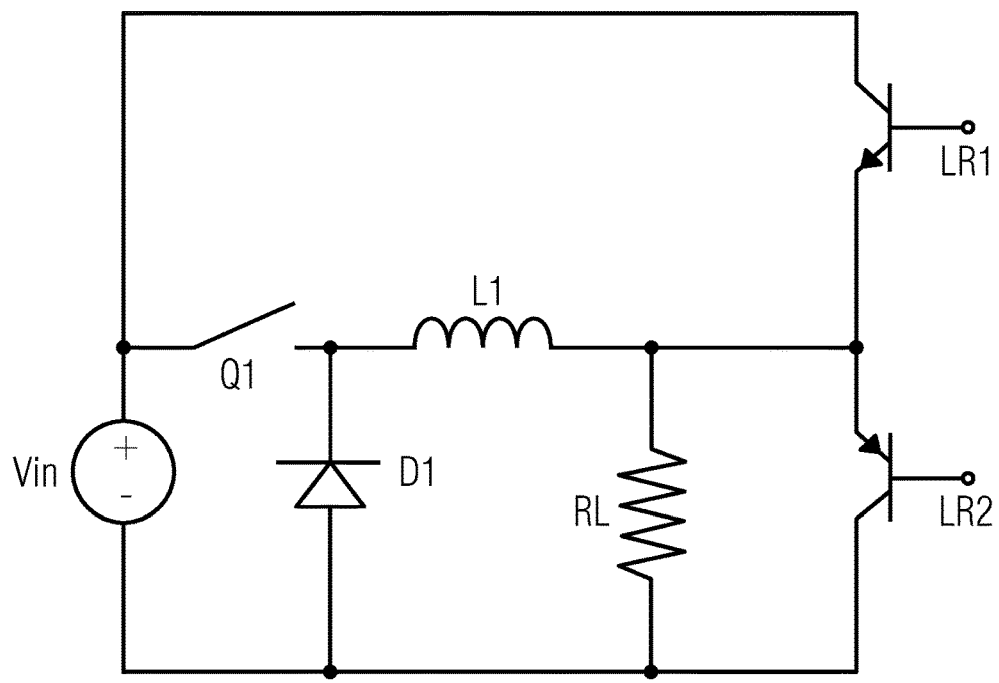
FIG. 2 shows a block diagram of a buck converter design combined with two linear regulators, in accordance with a conventional solution.
Figure 3:
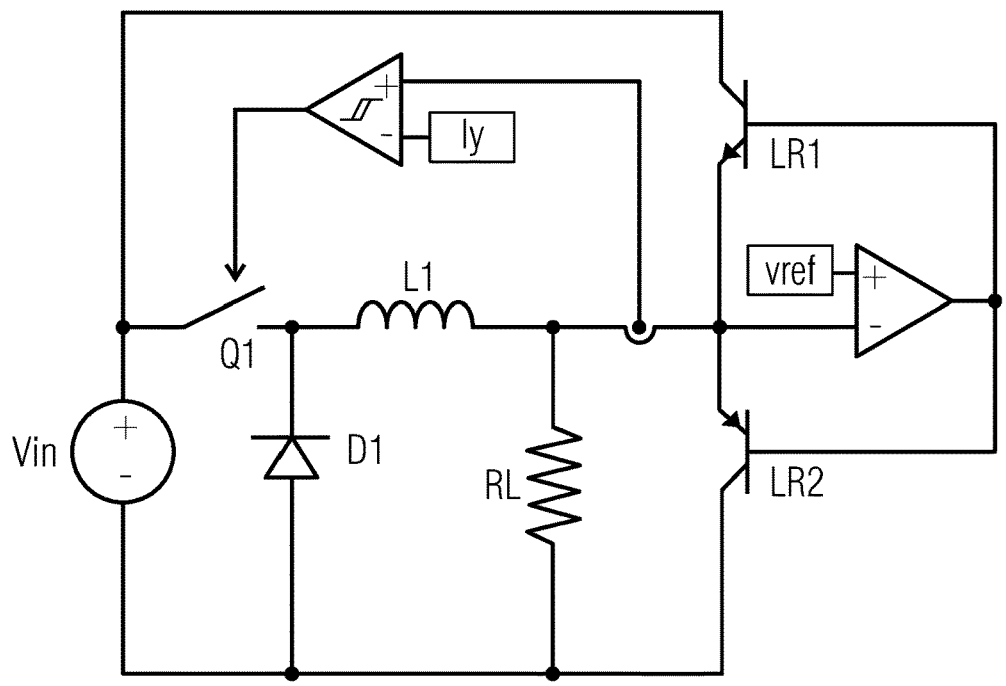
FIG. 3 shows a block diagram of a regulating function of a buck converter, combined with two linear regulators, in accordance with a conventional solution.
Figure 4:
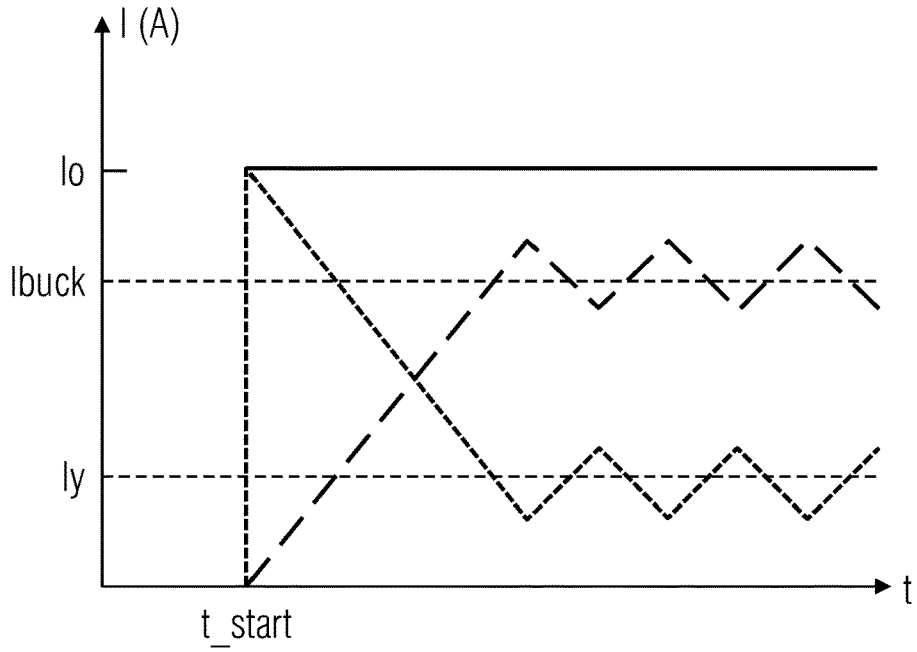
FIG. 4 shows a graphic representation of curve shapes of a regulating function of a converter, combined with linear regulators, in accordance with a conventional solution.
Figure 5:
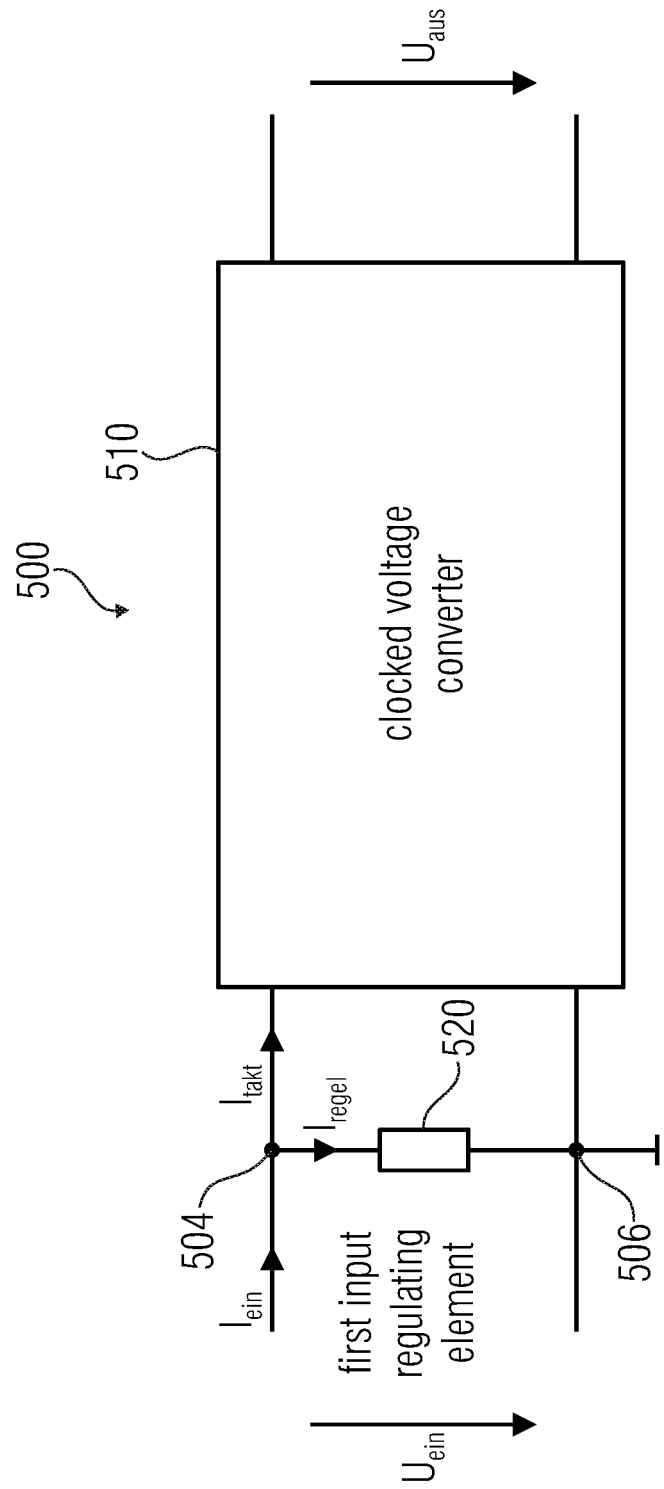
FIG. 5 shows a block diagram of a voltage converter arrangement, in accordance with an embodiment of the present invention.

FIG. 5 shows a block diagram of a voltage converter arrangement 500, in accordance with an embodiment of the present invention.

The voltage converter arrangement 500 is configured to receive an input voltage $U_{ein}$ and to provide an output voltage $U_{aus}$ based thereon.

The voltage converter arrangement comprises a clocked voltage converter 510 which is capable of generating, or configured to generate, the output voltage $U_{aus}$ on the basis of the input voltage $U_{ein}$.

The voltage converter arrangement 500 further comprises a first input regulating element 520 connected between a first input voltage node 504 and a second input voltage node 506. The second input voltage node 506 comprises, for example, a reference potential and can be regarded as a reference potential node.

The first input regulating element 520 is configured to allow a current flow in order to counteract fluctuations in an input current $I_{ein}$ of an input current of the voltage converter arrangement 500, which is, for example, the sum of a current $I_{regel}$ ($I_{regulation}$) flowing through the regulating element 520 and of an input current $I_{takt}$ ($I_{clock}$) of the clocked voltage converter 510. For example, fluctuations in the input current $I_{takt}$ of the clocked voltage converter 510 are thus at least partially compensated for.

With regard to the mode of operation, it should be noted that, for example, the first input regulating element 520 is connected in parallel with an input of the clocked voltage converter 510. Thus, the input current $I_{ein}$ of the voltage converter arrangement 500 is equal to the sum of the input current $I_{takt}$ of the clocked voltage converter 510 and of the current $I_{regel}$ flowing through the first input regulating element 520. It is further assumed that the input current $I_{takt}$ of the clocked voltage converter 510 is subject to fluctuations due to the clocked operation of the clocked voltage converter 510, which are at least approximately periodic, for example (at least over a short period of time, i.e. for example over several switching periods of the clocked voltage converter 510). The first input regulating element 520 can thus, for example, at least partially compensate for the fluctuations in the input current $I_{takt}$ of the clocked voltage converter 510, so that (short-term) fluctuations in the input current $I_{ein}$ of the voltage converter arrangement (i.e., for example, fluctuations corresponding to the clocking of the clocked voltage converter 510) can be reduced or, ideally, even be completely or almost completely compensated for. In other words, the first input regulating element 520 is typically fast enough to compensate for the (e.g. ripple-like) fluctuations in the current $I_{takt}$ that are caused by the clocked switching of the clocked voltage converter 510.

By means of the corresponding arrangement it can be achieved, for example, that an increased current flows through the first input regulating element 520 when the input current $I_{takt}$ of the clocked voltage converter 510 falls short of a maximum value or an average value, so that, for example, the sum of the currents $I_{takt}$ and $I_{regel}$ is approximately constant or follows a desired course (for example proportional to an input voltage of the voltage converter arrangement) (at least over a short period of time, for example over a switching period of the clocked voltage converter).

Optionally, however, further input regulating elements can be used in addition, as described below.

In summary, it can thus be stated that the voltage converter arrangement 500 makes it possible to at least partially, but ideally completely or almost completely, compensate for fluctuations in the current $I_{takt}$, that are caused by the clocked switching of the clocked voltage converter 510, by a current flow $I_{regel}$ through the first input regulating element 520. Although the first input regulating element 520 generates a certain amount of power dissipation, complex input filters that involve additional installation space and often limit service life can be saved or at least significantly reduced here. In this respect, the (first) input regulating element 520 helps to provide a voltage converter arrangement that provides an improved compromise between efficiency, implementation effort and interference suppression.

Further optional details will be explained below. In other words, the voltage converter arrangement 500 shown in FIG. 5 can be optionally supplemented with all the features, functionalities and details described herein, both individually and in combination.

2. Further Embodiments

In the following, some further embodiments will be described.

Figure 10:
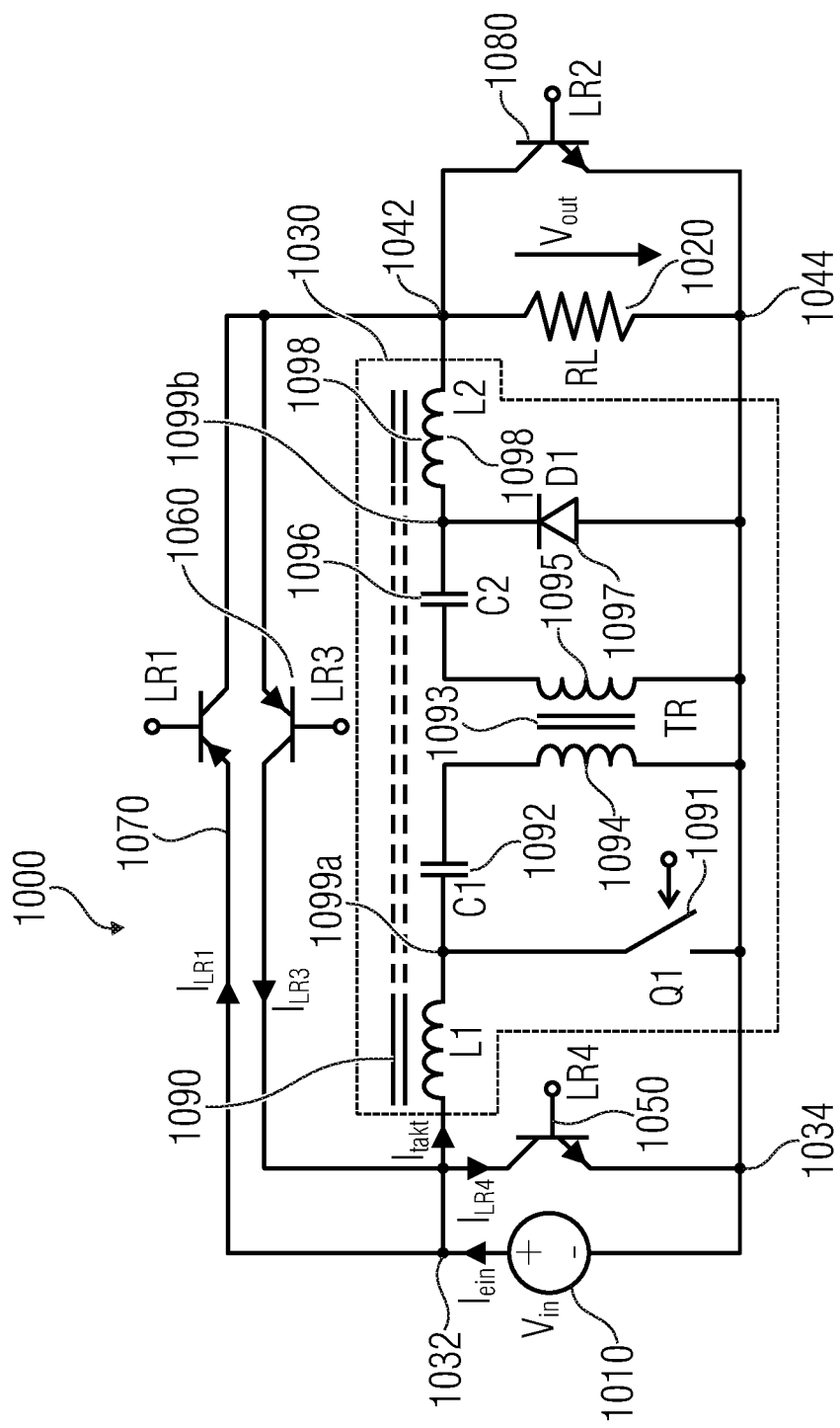
FIG. 10 shows a simplified circuit diagram of an inventive implementation of a transformer-coupled Cuk converter, combined with four linear regulators.
Figure 11A:
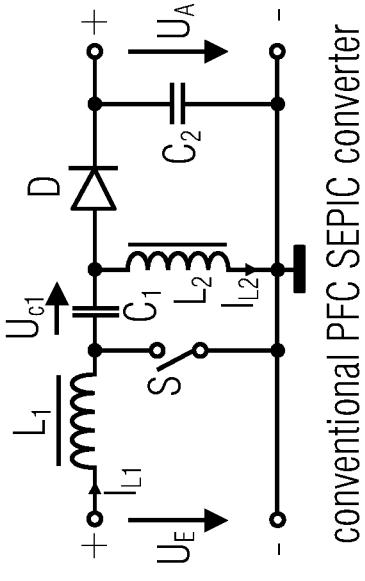
FIG. 11a shows a simplified circuit diagram of a conventional PFC boost converter (PFC=power factor correction; boost converter="step-up converter")
Figure 11B:
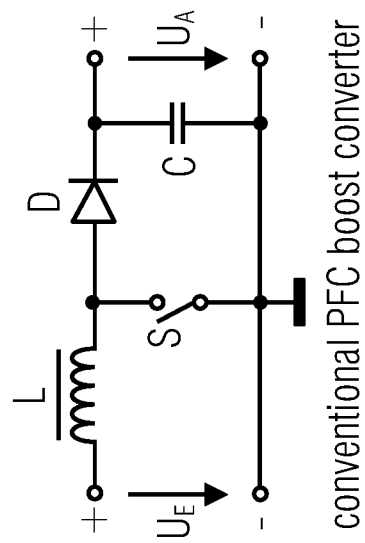
FIG. 11b shows a simplified circuit diagram of a conventional PFC SEPIC converter.
Figure 11C:
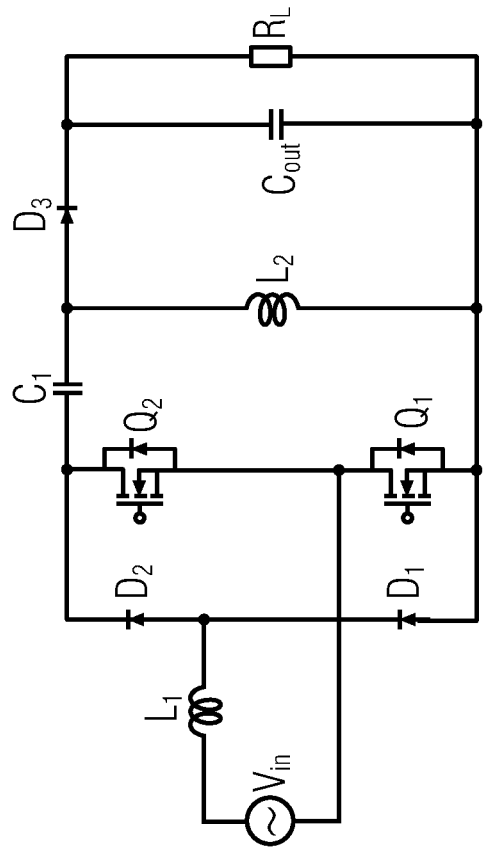
FIG. 11c shows a simplified circuit diagram of a conventional bridgeless PFC boost converter.
Figure 11D:
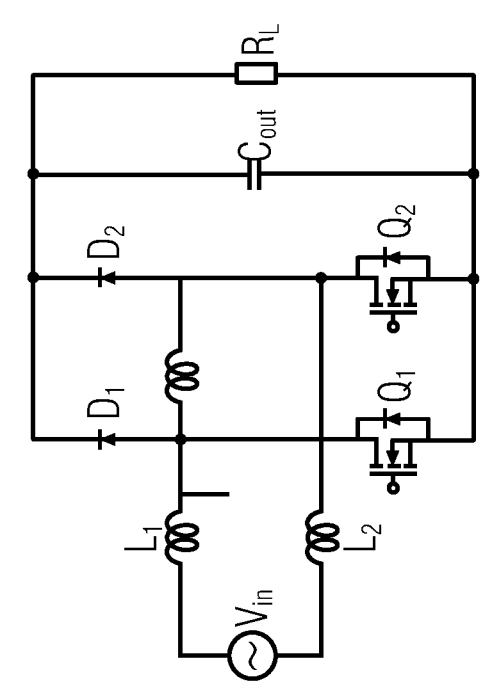
FIG. 11d shows a simplified circuit diagram of a conventional bridgeless PFC SEPIC converter.

FIG. 10 shows an inventive implementation of a transformer-coupled CuK converter.

Figure 12:
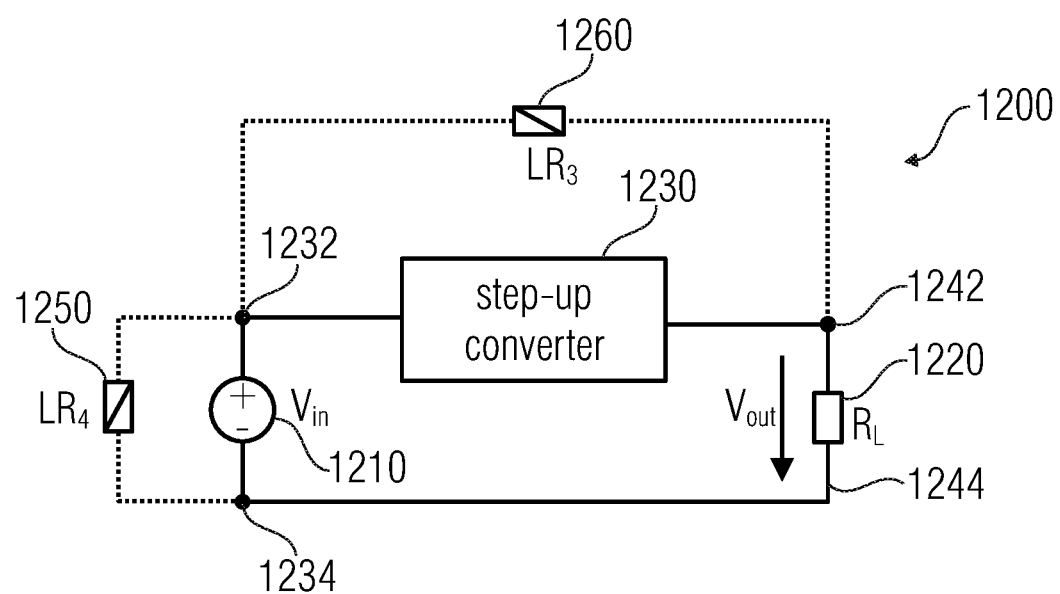
FIG. 12 shows a block diagram of an inventive implementation (or embodiment) of a linear-support step-down converter, combined with two linear regulators.

FIG. 12 shows an inventive implementation of a step-up converter, which in FIG. 13 is implemented as a boost converter.

Figure 14:
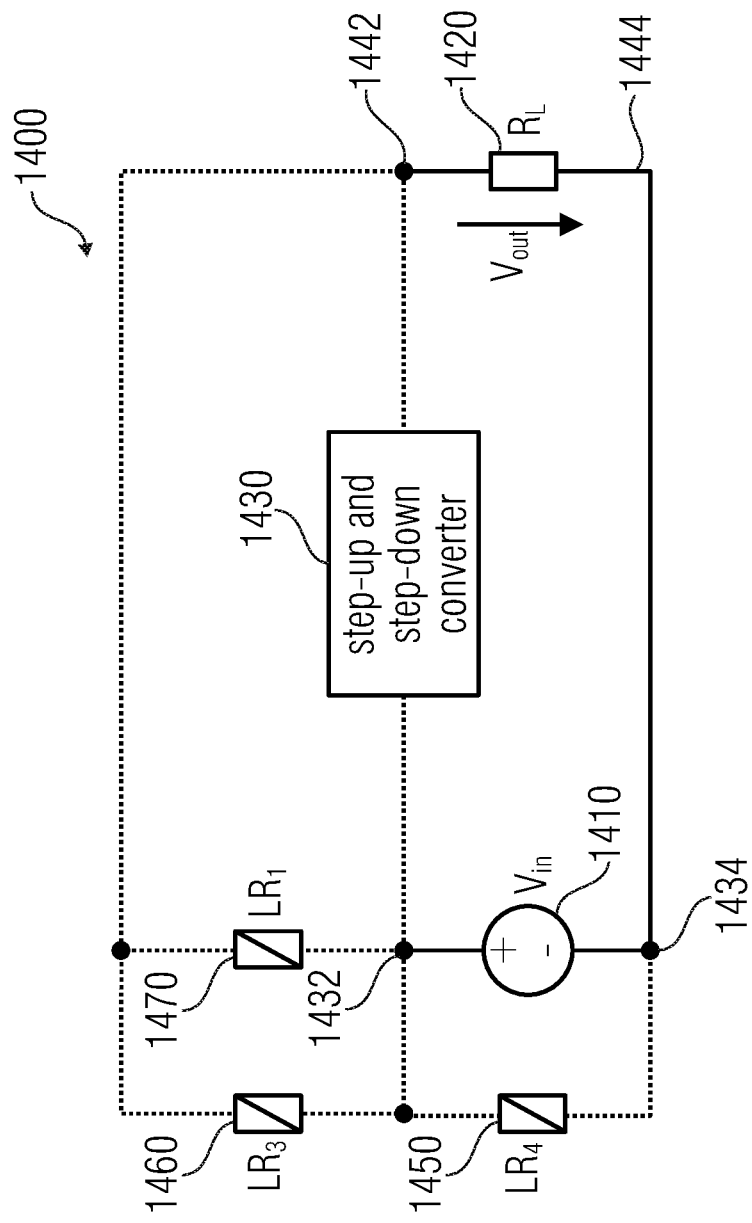
FIG. 14 shows a block diagram of an inventive implementation (or embodiment) of a linear-support step-up/step-down converter, combined with three linear regulators.

FIG. 14 shows an inventive implementation of a step-up/step-down converter, which in FIG. 15 is implemented as a SEPIC converter.

Figure 9:
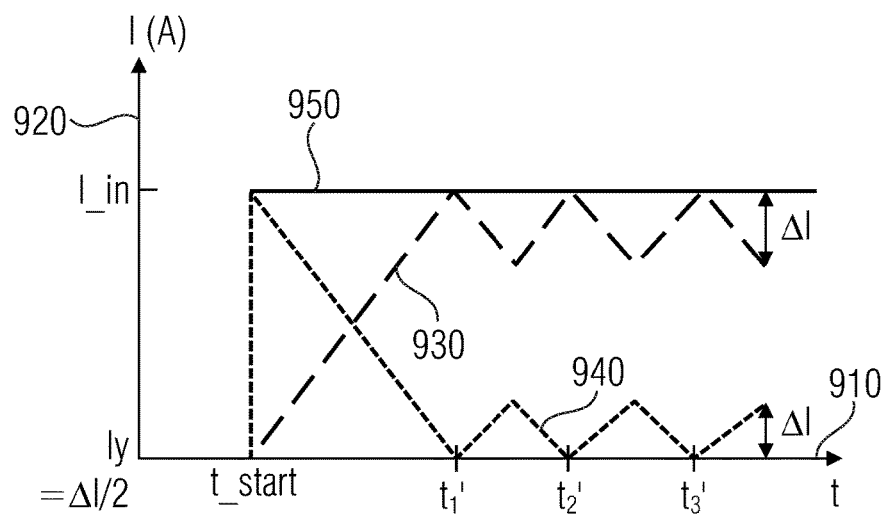
FIG. 9 shows a schematic representation of ripple current compensation for the PWM converter by linear regulators LR4 and/or LR1 (cases 2, 3 and 5 of table 3 and table 4)

FIGS. 7, 8 and 9 show how the current ripple ΔI of the input current I_in can be compensated for. The functionalities shown in FIGS. 7, 8 and 9 and described on the basis of these figures can optionally be implemented in total or in part in all of the embodiments described herein.

Voltage Converter Arrangement of FIG. 10

An embodiment as shown in FIG. 10 is a transformer-coupled Cuk converter as shown in FIG. 10. It has the disadvantage of a higher circuit complexity due to an additional transformer which keeps the polarity of the output voltage at the same ground potential as the input voltage in the same direction. On the other hand, this implementation has the additional advantage that the input current and the output current can be linearly compensated for at the same time.

In the following, the voltage converter arrangement 1000 of FIG. 10 will be explained in more detail.

The voltage converter arrangement 1000 is configured to receive an input voltage Vin from an input voltage source 1010 and to deliver an output voltage Vout to a load 1020, which is symbolized here by a load resistor RL.

The voltage converter arrangement comprises an insulating (e.g. transformer-coupled) Cuk converter 1030, which forms the clocked voltage converter. One input of the insulating Cuk converter 1030 is coupled to a first input voltage node 1032 and to a second input voltage node 1034. An output of the insulating Cuk converter 1030 is coupled to a first output voltage node 1042 and to a second output voltage node 1044. It should be noted that the voltage source 1010 is also coupled to the first input voltage node 1032 and to the second input voltage node 1034 and that the load 1020 is connected between the first output voltage node 1042 and the second input voltage node 1044.

A collector terminal of a regulating transistor 1050 acting as a first input regulating element is coupled to the first input voltage node, and an emitter terminal of the regulating transistor 1050 is coupled to the second input voltage terminal. Thus, a collector-emitter path of the first regulating transistor 1050 is connected in parallel with the input of the insulating Cuk converter 1030. With the polarity of the input voltage that is shown, the first regulating transistor 1050 (LR4) is an NPN transistor, for example.

There is also an (optional) second regulating transistor 1060 which acts as a second input regulating element. This is a PNP transistor whose emitter terminal is coupled to the first output voltage node 1042 and whose collector terminal is coupled to the first input voltage node 1032. The emitter-collector path of the second regulating transistor 1060 is thus connected between the first output voltage node 1042 and the first input voltage node 1032, so that, for example, a current can flow from the first output voltage node 1042 toward the first input voltage node 1032.

The voltage converter arrangement further comprises a third regulating transistor 1070, which again is a PNP transistor, for example. An emitter terminal of the third regulating transistor 1070 is connected, e.g., to the first input voltage node 1032, and a collector terminal of the third regulating transistor 1070 is connected, e.g., to the first output voltage node 1042, so that the emitter-collector path of the third regulating transistor 1070 is connected between the first input voltage node 1032 and the first output voltage node 1042. The third regulating transistor 1070 can thus, for example, divert a current from the first input voltage node 1032 to the first output voltage node 1042. The third regulating transistor 1070 is also to be regarded as being optional.

Furthermore, the voltage converter arrangement 1000 includes a further, fourth regulating transistor 1080, which is an NPN transistor, for example. For example, a collector terminal of the fourth regulating transistor 1080 is coupled to the first output voltage node 1042, and an emitter terminal of the fourth regulating transistor 1080 is coupled to, e.g., the second output voltage node 1044. A collector-emitter path of the fourth regulating transistor is thus connected in parallel with the load 1020, for example.

As regards the internal structure of the Cuk converter 1030, it should be noted that it comprises an input-side inductance 1090, a switch 1091, an input-side capacitance 1092, a transformer 1093 with an input-side winding 1094 and an output-side winding 1095, an output-side capacitance 1096, an output-side diode 1097 and an output-side inductance 1098. For example, the input-side inductance 1090 is connected between the first input voltage node 1032 and a first node 1099a. The switch 1091 is connected between the first (input-side) node 1099a and the second input voltage node 1034. The input-side winding 1094 of the transformer 1093 is connected in series with the input-side capacitance 1092 between the first input-side node 1099a and the second input voltage node 1034. The output-side winding 1095 of the transformer 1093 is connected in series with the output-side capacitor 1096 between a second, output-side node 1099b and the second output voltage node 1044. An anode of the diode 1097 is coupled to the second output voltage node 1044, and a cathode of the diode 1097 is coupled to output-side node 1099b. The output-side inductance 1098 is coupled between the second, output-side node 1099b and the first output voltage node 1042. For example, the input-side inductance 1090 and the output-side inductance 1098 are applied to a common core and exhibit corresponding magnetic coupling.

Input-side and output-side buffer capacitances of the transformer-coupled Cuk converter 1030 are omitted here for reasons of simplification, but might of course be used optionally.

It should also be noted that the second input voltage node and the second output voltage node are connected, for example, at low impedance and may also form a common circuit node.

In the following, the functionality of the voltage converter arrangement will be addressed in somewhat more detail.

The exact functionality of the Cuk converter 1030 is not of particular relevance here. Rather, it is assumed that the Cuk converter operates in a clocked manner in order to provide, on the basis of the input voltage provided by the input voltage source 1010, an output voltage that may be smaller or larger than the input voltage. It is assumed that both the input voltage and the output voltage are referenced to a common reference potential (which is applied, for example, to the second input voltage node 1034 and to the second output voltage node 1044). It is further assumed here that the input current of the Cuk converter 1030, also referred to as $I_{takt}$, fluctuates over time, for example in accordance with the switching cycle of the switch 1091. It is further assumed here that the current $I_{ein}$ drawn from the voltage source 1010 should have a predetermined curve and should have a substantially smooth curve over a relatively short period of time (for example over a plurality of switching periods of the Cuk converter 1030). Overall, the input current $I_{ein}$ can therefore readily vary (for example, it can have a curve that approximates a sine curve or a unidirectional sine curve, but this curve should remain as unaffected or undisturbed as possible by the clocked current flow $I_{takt}$.

This is achieved in that a current flow $I_{LR4}$ through the fourth regulating transistor 1050 and, optionally, also current flows $I_{LR3}$ through the second regulating transistor 1060 and $I_{LR1}$ through the third regulating transistor 1070 at least partially or even substantially or completely compensate for these fluctuations in the current $I_{takt}$. For example, suitable driving of the first regulating transistor 1050 ensures that a current $I_{LR4}$ flows and that the current $I_{ein}$ is thus larger by $I_{LR4}$ than the current $I_{takt}$, which is useful, for example, if $I_{takt}$ is smaller than a desired input current $I_{ein}$.

By suitable driving of the second regulating transistor 1060, for example, one can achieve that a current $I_{LR3}$ flows, which in turn results in the current $I_{ein}$ being smaller by $I_{LR3}$ than $I_{takt}$. This can be helpful, for example, if $I_{takt}$ is larger than a (currently) desired value of $I_{ein}$. However, the current $I_{LR3}$ can flow only if the output voltage $V_{out}$ is higher than the input voltage $V_{in}$.

Furthermore, one can achieve, by suitable driving of the third regulating transistor 1070, that a current $I_{LR1}$ flows, which results in the current $I_{ein}$ being larger by $I_{LR1}$ than the current $I_{takt}$. This is helpful, for example, if $I_{takt}$ is smaller than a desired input current $I_{ein}$, but the current $I_{LR1}$ can flow only if the output voltage $V_{out}$ is smaller than the input voltage $V_{in}$.

Thus, for example, by suitable driving of the first regulating transistor 1050 and, optionally, also the second regulating transistor 1060 and/or the third regulating transistor 1070, the input current $I_{ein}$ can be regulated to a desired target value or to a desired curve (e.g. approximately sinusoidal), even if the current $I_{takt}$ is subject to significant (short-term or ripple-like) fluctuations (e.g. in the clock or with the periodicity of the switching frequency of switch 1092). For example, the regulating transistors 1050, 1060, 1070 and their driving can be configured such that regulation is significantly faster than the clock frequency of the clocked voltage converter 1030, so that the currents $I_{LR4}$, $I_{LR3}$ and $I_{LR1}$ can follow the fluctuations in the current $I_{takt}$ within a switching period of the clocked voltage converter 1030. In this manner it is possible to achieve that the input current $I_{ein}$ has a desired curve with small deviations (which are smaller than the periodic or ripple-like fluctuations in the input current $I_{takt}$).

The implementation in FIG. 10 also allows optional compensation for the current ripple of the output voltage by the linear regulators LR2 against the ground potential or by the regulator LR1 from the input voltage, if the latter is larger than the output voltage. If the output voltage is larger than the input voltage, the current ripple (for example the output current ripple of the clocked voltage converter) can optionally be compensated for by LR2 or LR3.

The current ripple of the input voltage is compensated for either against the ground potential by LR4 or optionally by LR3 if the output voltage is larger than the input voltage, or optionally by LR1 if the output voltage is less than the input voltage.

Thus, this implementation can also optionally compensate for only the current ripple of the input voltage or (only) the current ripple of the output voltage, or the current ripple of the input and output voltages simultaneously.

If, on the other hand, only the input current ripple at L1 should be compensated for, but not the output current ripple at L2, the conditions in cases 6 to 10 are (optionally) to be differentiated (see table 2).

If (optionally) the current ripples at both inductances L1 and L2 are to be compensated for, cases 11 to 17 arise (see table 2). In cases 13, 14, 16 and 17 it can be seen that there are various ways of achieving the lowest-loss state of the linear regulators. Said state depends on the quantity of the ripple current, which may be different at the input at L1 and at the output at L2, and which, in connection with the respective voltage drop across the linear regulators involved, leads to different losses. This depends on the design parameters of the transformer-coupled Cuk converter.

The embodiment in FIG. 10 can be used, for example, for applications where either a ripple-free current is to be drawn from a source such as a battery, or where the input buffer capacitor is to be saved as well as the output buffer capacitor. This is especially useful if the input buffer capacitor cannot (or cannot be easily) avoided because the input voltage would also fluctuate due to current fluctuations at the input.

A predominant approach of the invention aims exclusively at a compensation for the current ripple at the input of the converter in relation to a source. Thus, for example, circuits for power factor correction (PFC) are supplemented by a linear assistance regulator.

Functionality According to FIGS. 7, 8 and 9

In the following, the mode of operation of the voltage converter 1000 will be briefly explained once again with reference to FIGS. 7, 8 and 9. It should be noted that some or all of the functionalities explained in FIGS. 7, 8 and 9 can be used with the voltage converter of FIG. 10. Incidentally, the functionalities according to FIGS. 7, 8 and 9 can also be used in the other embodiments.

FIG. 7 shows a graphic representation of a ripple current compensation for the PWM converter. An abscissa 710 describes a time, and an ordinate 720 describes the current.

A curve 730 describes an input current of the clocked voltage converter, for example a current $I_{takt}$. A curve 740 describes, for example, a current flowing through LR3 and LR4, i.e. through the first regulating transistor 1050, which functions as the first input regulating element, and through the regulating transistor 1060, which functions as the second input regulating element. It is assumed here, for example, that the output voltage $V_{out}$ is roughly twice the input voltage $V_{in}$.

A target value of the input current is designated by $I_{in}$, for example.

As can be seen in FIG. 7, the converter is switched on at a time t_start, for example. The input current $I_{takt}$ of the clocked voltage converter, shown by curve 730, then initially increases until a maximum value is reached which is larger than $I_{in}$ (for example at reference numeral 732). The input current $I_{takt}$ then decreases again, for example to a value that is smaller than the desired input current $I_{in}$ (for example at reference numeral 734). The input current $I_{takt}$ then fluctuates around the desired input current $I_{in}$, for example with an essentially triangular curve. Within a switching period of the clocked voltage converter 1030 (i.e. of the transformer-coupled Cuk converter), the current is temporarily smaller than the desired input current $I_{in}$ and temporarily larger than the desired input current $I_{in}$. The period duration of the switching period corresponds, for example, to the time lag between two successive minima or two successive maxima of the current $I_{takt}$.

Curve 740 shows how the linear regulators (with the regulating transistors LR3 and LR4) at least partially compensate for the fluctuations in the input current $I_{takt}$ (in the ideal case shown here, they even compensate for them in an ideal manner). In this respect, it should be noted that a current flows through the first regulating transistor 1050 as long as the current $I_{takt}$ is smaller than the desired current $I_{in}$. For example, between the time t_start and a further time $t_1$, a current flows through the first regulating transistor LR4, so that the input current $I_{ein}$ is larger than the current $I_{takt}$ (for example, corresponds to the sum of the currents $I_{LR4}+I_{takt}$). If, on the other hand, the current $I_{takt}$ is larger than the desired input current $I_{in}$, which is the case, for example, between the times $t_1$ and $t_2$, the second regulating transistor 1060 will supply a current from the first output voltage node 1042 to the first input voltage node 1032 (while the current $I_{LR4}$ will then typically be zero), thereby achieving that the current $I_{takt}$ is provided partly by the input current $I_{ein}$ and partly by $I_{LR3}$. As a result, $I_{ein}$ then corresponds to the desired input current $I_{in}$, so that the deviation of $I_{takt}$ from the desired input current $I_{in}$ is compensated for by the current $I_{LR3}$. Between the times $t_2$ and $t_3$, the current $I_{takt}$ is again smaller than the desired input current $I_{in}$, so that, again, a current flows through the first regulating transistor 1050 ($I_{LR4}$). The total input current of the voltage converter arrangement 1000, i.e. the current $I_{ein}$, thus again corresponds to the desired input current $I_{in}$.

The processes are then repeated, with the current $I_{takt}$ oscillating around the desired input current $I_{in}$, wherein, as a rule, within a switching period of the clocked voltage converter 1030, a current flowing through the first regulating transistor 1050 is temporarily directed towards the second input voltage node 1034 and wherein, within the same switching period, a current flowing through the second regulating transistor 1060 is temporarily directed from the first output voltage node 1042 towards the first input voltage node 1032. It can thus be seen that, by means of the cooperation of the first regulating transistor 1050 and the second regulating transistor 1060, fluctuations in the current $I_{takt}$ can be compensated for at the operating point in a very efficient manner.

In the following, ripple current compensation for the PWM converter at another operating point will be explained on the basis of FIG. 8, specifically with regard to the event that the output voltage $V_{out}$ is larger than the input voltage $V_{in}$, where, however, the difference between the output voltage $V_{out}$ and the input voltage $V_{in}$ (i.e. the emitter-collector voltage of the second regulating transistor 1060) is smaller than the input voltage $V_{in}$ (which corresponds to the collector-emitter voltage of the first regulating transistor 1050). In other words, in the operating state that is now being described, the voltage across the emitter-collector path of the second regulating transistor 1060 is smaller (for example at least 10% smaller or at least 20% smaller) than the collector-emitter voltage of the first regulating transistor 1050.

In this case it is to be assumed that a current flow through the first regulating transistor 1050 leads to a higher power dissipation than a current flow through the second regulating transistor 1060. For this reason, a driving circuit in the operating state mentioned drives the regulating transistors 1050, 1060, 1070 such that only the second regulating transistor 1060 carries a current, while the first regulating transistor 1050 remains non-conducting. The third regulating transistor 1070 cannot carry a current in the operating state mentioned anyway because the output voltage $V_{out}$ is larger than the input voltage V. In other words, only the second regulating transistor 1060 (LR3) is activated in the operating state described above in order to minimize losses.

An abscissa 810 describes the time, and an ordinate 820 again describes the current. A curve 830 describes the input current of the clocked voltage converter, i.e. $I_{takt}$, and a curve 840 describes the current flowing through the second regulating transistor 1060, i.e. $I_{LR3}$.

It can be seen that at the time $t_1'$, a current $I_{takt}$ exceeds the desired input current $I_{in}$. From this time on, the second regulating transistor 1060 supplies a current $I_{LR3}$, which ensures that $I_{ein}$ remains at the desired value $I_{in}$. The current $I_{takt}$ then remains higher than the desired input current $I_{in}$ up to a time $t_2'$ and reaches the desired current $I_{in}$ again at the time $t_2'$, for example. Between the times $t_1'$ and $t_2'$, i.e. during an entire switching period of the clocked voltage converter 1030, the second regulating transistor 1060 provides a current flow which ensures that the input current $I_{ein}$ does not exceed the desired value $I_{in}$, even though the current $I_{takt}$ is larger than the desired input current $I_{in}$.

Following time $t_2'$, the current $I_{takt}$ increases again, i.e. becomes larger than $I_{in}$ again, and returns to the value $I_{in}$ at the time $t_3'$. During several switching periods of the clocked voltage converter 1030, a current $I_{LR3}$ is thus supplied by the second regulating transistor 1060, which ensures that the input current $I_{ein}$ remains constant or almost constant, i.e. in particular does not follow the fluctuations in the current Item, or follows them to a significantly reduced extent only.

By driving the voltage converter arrangement (or the clocked voltage converter 1030 and the regulating transistors 1050, 1060, 1070) such that the current $I_{takt}$ (in the operating state) is permanently (or at least during 90% of a switching period) larger than the desired input current $I_{in}$, or than the input current $I_{ein}$, one achieves that compensation for the fluctuations in $I_{takt}$ can be performed by the second regulating transistor 1060, which results in lower losses than, for example, compensation by the first regulating transistor 1050.

In the following, a further operating state will be explained by means of FIG. 9. In particular, a ripple current compensation for the PWM converter by the linear regulators LR4 or LR1 will be described which can be carried out, for example, in cases 2, 3 and 5 according to table 3 and according to table 4.

An abscissa 910 describes the time, and an ordinate 920 describes the current. A curve 930 describes the input current of the clocked voltage converter, i.e. the current $I_{takt}$, and a curve 940 describes the sum of the currents flowing through the first regulating transistor 1050 ($I_{LR4}$) and through the third regulating transistor 1070 ($I_{LR1}$).

The corresponding concept can be used, for example, if the input voltage is approximately equal to the output voltage since in this case, typically only the first regulating transistor 1050 can generate a reliable current flow, while the collector-emitter voltages of the second regulating transistor 1060 and of the third regulating transistor 1070 are too small. The corresponding concept can also be applied if the input voltage is smaller than the voltage difference between the first output voltage node 1042 and the first input voltage node 1032 since in this case, a current flow through the first regulating transistor 1050 results in less power dissipation than a current flow through the second regulating transistor 1060 or through the third regulating transistor 1070.

In the operating state described, one typically achieves by suitable driving that the input current $I_{takt}$ of the clocked voltage converter 1030 does not exceed the desired input current $I_{in}$, a maximum value of $I_{takt}$ advantageously being equal to the desired input current $I_{in}$. As can be seen, for example, the current $I_{takt}$ reaches the desired input current $I_{in}$ at a time $t_1''$ and then drops again. The input current $I_{takt}$ of the clocked voltage converter 1030 then reaches the desired input current $I_{in}$ again at a time $t_2''$. Between the times $t_1''$ and $t_2''$, for example, depending on the relation between the input voltage $V_{in}$ and the output voltage Vout, a current flows through the first linear regulator 1050 or through the third linear regulator 1070. This ensures that the input current $I_{ein}$ corresponds to the desired input current $I_{in}$. Since $I_{takt}$ does not exceed the desired input current $I_{in}$, the current $I_{LR4}$ flowing through the first regulating transistor 1050 or the current $I_{LR1}$, flowing through the third regulating transistor 1070 can be used to ensure that the sum of $I_{takt}$ and $I_{LR4}$ or of $I_{takt}$ and $I_{LR1}$ in each case corresponds (at least to a good approximation) to the desired input current $I_{in}$. Thus, the input current $I_{ein}$ remains essentially constant and does not follow the fluctuations in $I_{takt}$ or follows them only in a significantly attenuated form.

All in all it should be noted that the voltage converter 1000 according to FIG. 10 does not necessarily have to operate in all operating states described in FIGS. 7, 8 and 9. Rather, it is sufficient, for example, if the voltage converter 1000 can operate in one or more of the mentioned operating states.

In summary, FIGS. 7, 8 and 9 advantageously show inventive curves of the input current of the step-up and buck converters (blue curves, or curves 730, 830, 930), of the linear regulators or of a linear regulator (red curves, or curves 740, 840, 940) and of the input direct current $I_{in}$ (or $I_{ein}$) (black curves, or curves 750, 850, 950). The curve shape which is respectively advantageous, according to the invention, is assigned to cases 1 to 4 of table 4.

In summary, it can thus be stated that control of the voltage converter arrangement 1000 can be configured, for example, to differentiate the operating states according to table 3 or according to table 4. This differentiation can be made, for example, on the basis of the relation between the input voltage and the output voltage. Accordingly, control of the voltage converter arrangement 1000 can decide which of the regulating transistors 1050, 1060, 1070 (or generally: which of the linear regulators) are used in the respective operating state to compensate for fluctuations in the current $I_{takt}$. Accordingly, the controller can provide appropriate drive signals for the regulating transistors 1050, 1060, 1070.

In this regard, it should be noted that not all of the regulating transistors 1050, 1060, 1070 may be present, but that the presence of one or two of the mentioned regulating transistors is sufficient.

Furthermore, it should be noted that the regulating transistors 1050, 1060, 1070 here (and throughout this description) represent different types of linear regulators and may also be replaced by other linear regulators. In particular, it is not necessary that the linear regulators described here are formed by corresponding bipolar transistors. Instead, field-effect transistors could be used instead of bipolar transistors. Typically, the source connection of a field-effect transistor corresponds to the emitter connection of a bipolar transistor. In addition, the sink terminal or drain terminal of a field-effect transistor typically correspond to the collector terminal of a bipolar transistor. The control terminal or gate terminal of a field-effect transistor typically correspond to the base terminal of a bipolar transistor.

Furthermore, it should be noted that the NPN transistors shown here might also be replaced by PNP transistors, for example, and that the PNP transistors shown here might also be replaced by NPN transistors, in which case driving would of course have to be adapted accordingly, as is common practice among persons skilled in the art.

NPN bipolar transistors, for example, might be replaced by N-channel field-effect transistors, and PNP bipolar transistors by P-channel field-effect transistors.

In addition, circuits complementary to the circuitries shown may also be used.

Voltage Converter According to FIG. 12

FIG. 12 shows a block diagram of a linear-support step-up converter combined with two linear regulators, according to an inventive implementation (or embodiment).

The voltage converter or voltage converter arrangement 1200 according to FIG. 12 is configured to provide an output voltage $V_{out}$ for a load 1220 on the basis of an input voltage $V_{in}$ supplied by an input voltage source 1210.

The voltage converter 1200 comprises, in particular, a step-up converter 1230, wherein an input terminal of the step-up converter 1230 is coupled to a first input voltage node 1232 and typically also to a second input voltage node 1234. An output of the step-up converter 1230 is typically coupled to a first output voltage node 1242 and also to a second output voltage node 1244. The load 1220 is connected between the first output voltage node 1242 and the second output voltage node 1244. The input voltage source 1210 is also connected to the first input voltage node 1232 and the second output voltage node 1234. The input voltage source 1210 and the load 1220 are not typically part of the voltage converter 1200.

The voltage converter 1200 also includes a first input regulating element 1250 (LR4) and a second input regulating element 1260 (LR3).

In other words, FIG. 12 shows an inventive boost converter (according to an embodiment) combined with two linear regulators LR3 and LR4.

In this respect, it should be noted that the mode of operation of the voltage converter 1200 may correspond, for example, to the mode of operation of the voltage converter 500 or the mode of operation of the voltage converter 1000. For example, the first input regulating element 1250 or the first linear regulator 1250 may correspond to the first input regulating element or the first linear regulator or the first regulating transistor 1050. Furthermore, the second input regulating element 1260 or the second linear regulator 1260 may correspond to the second input regulating element 1060 or the second linear regulator 1060 or the second regulating transistor 1060. The step-up converter 1230 may correspond to the transformer-coupled Cuk converter 1030.

In this respect, the voltage converter 1200 may, for example, have some or all of the functionality of the voltage converter 1000, as explained above in FIGS. 7, 8 and 9 and also in FIG. 10.

However, further optional details will also be explained by means of FIG. 13—the features, functionalities and details explained in FIG. 13 may be optionally transferred, either individually or in combination, to the voltage converter 1200 according to FIG. 12.

Voltage Converter According to FIGS. 13a to 13d

Figure 13A:
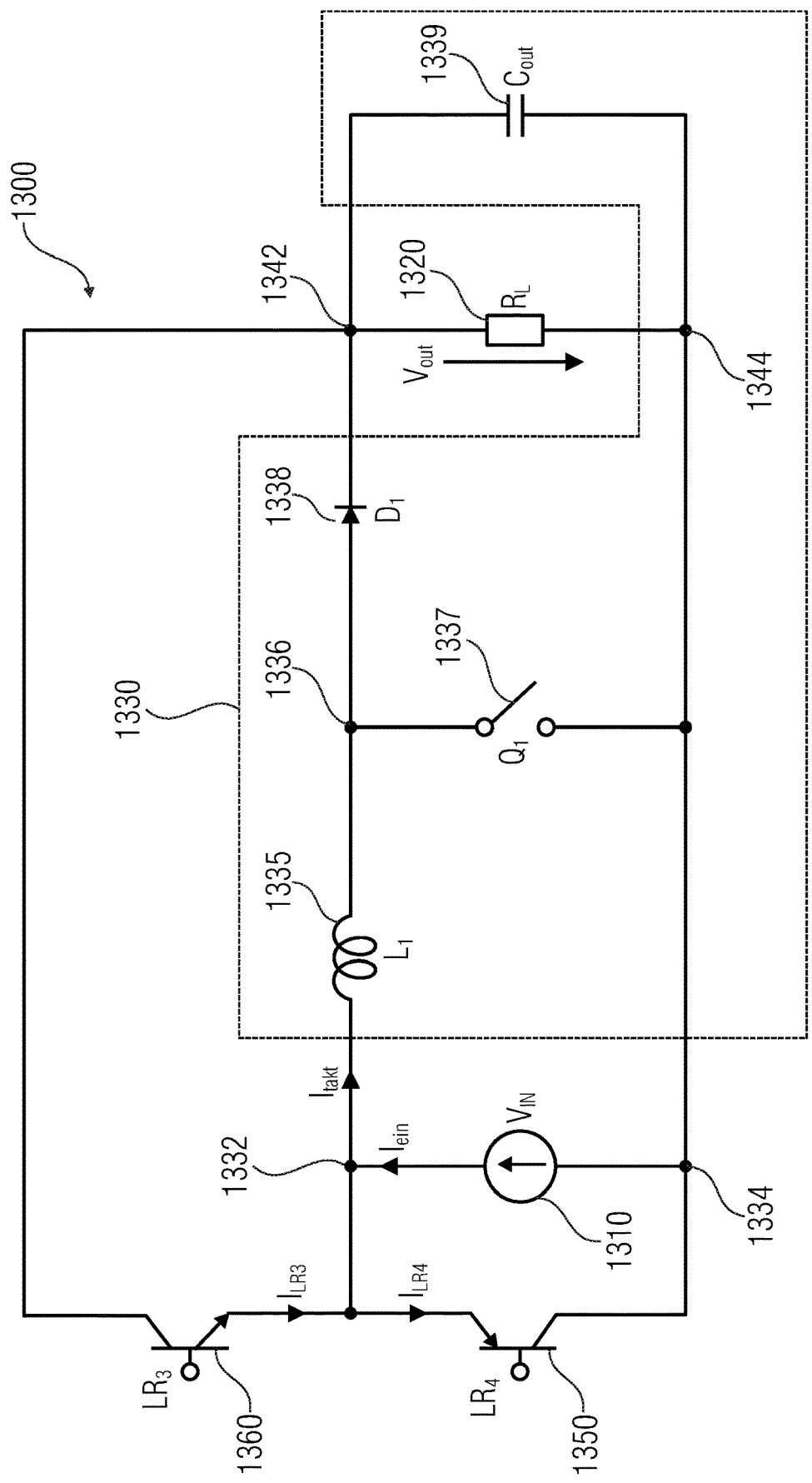
FIG. 13a shows a simplified circuit diagram of an inventive implementation (or embodiment) of a linear-support boost converter, combined with two linear regulators.

FIG. 13a shows a simplified circuit diagram of a linear-support boost converter combined with two linear regulators (or input regulating elements or regulating transistors).

For example, the voltage converter or voltage converter arrangement 1300 is configured to provide an output voltage $V_{out}$ for a load 1320 on the basis of an input voltage $V_{in}$ from a voltage source 1310 (the input voltage source 1310 and the load 1320 are typically not part of the voltage converter 1300). For example, the voltage converter comprises a boost converter 1330 whose input is coupled to a first input voltage node 1332 and to a second input voltage node 1334. For example, an output of the boost converter is coupled to a first output voltage node 1342 and to a second output voltage node 1344.

The voltage converter further comprises a first regulating transistor 1350, which is a PNP transistor, for example. For example, a collector-emitter path of the first regulating transistor 1350 is connected in parallel with the input of the step-up converter, or boost converter, 1330, an emitter terminal being coupled, for example, to the first input voltage node 1332, and a collector terminal being coupled, for example, to the second input voltage node 1334. In addition, the voltage converter 1300 has a second regulating transistor 1360, which is an NPN transistor, for example. A collector-emitter path of the second regulating transistor 1360 is coupled, for example, between the first output voltage node 1342 and the first input voltage node 1332, a collector being coupled to the first output voltage node 1342, and an emitter being coupled to the first input voltage node 1332. The regulating transistor 1360 thus allows a current flow from the first output voltage node 1342 to the first input voltage node 1332, and the first regulating transistor 1350 allows a current flow from the first input voltage node 1332 to the second input voltage node 1334. In this respect, it should be noted that the first regulating transistor 1350 and the second regulating transistor 1360 are merely examples of possible input regulating elements and possible linear regulators, respectively; other types of transistors or other types of regulating elements can also be employed.

The step-up converter comprises, for example, an inductance 1335 connected between the first input voltage node 1332 and an internal node 1336. A switch is coupled between the internal node 1336 and the second input voltage node 1334 or the second output voltage node 1344. A diode 1338 is coupled between the internal node 1336 and the first output voltage node, the anode being coupled, e.g., to the internal node 1336, and the cathode being coupled to the first output voltage node. Furthermore, an (optional) output capacitance 1339 is coupled between the first output voltage node 1342 and the second output voltage node 1344.

With regard to the functionality of voltage converter 1300, it should be noted that said functionality is similar to that of the voltage converter 1000, the transformer-coupled Cuk converter 1030 being replaced by the step-up, or boost, converter 1330. The input voltage source 1310 corresponds to the input voltage source 1010, the load 1320 corresponds to the load 1020, the first input regulating element 1350 corresponds to the first input regulating element 1050, and the second input regulating element 1360 corresponds to the second input regulating element 1060. Driving of the input regulating elements can be carried out, e.g., in a similar manner for the voltage converter 1300 as for the voltage converter 1000, or in a similar or identical manner as for the other voltage converter arrangements described herein.

Figure 13B:
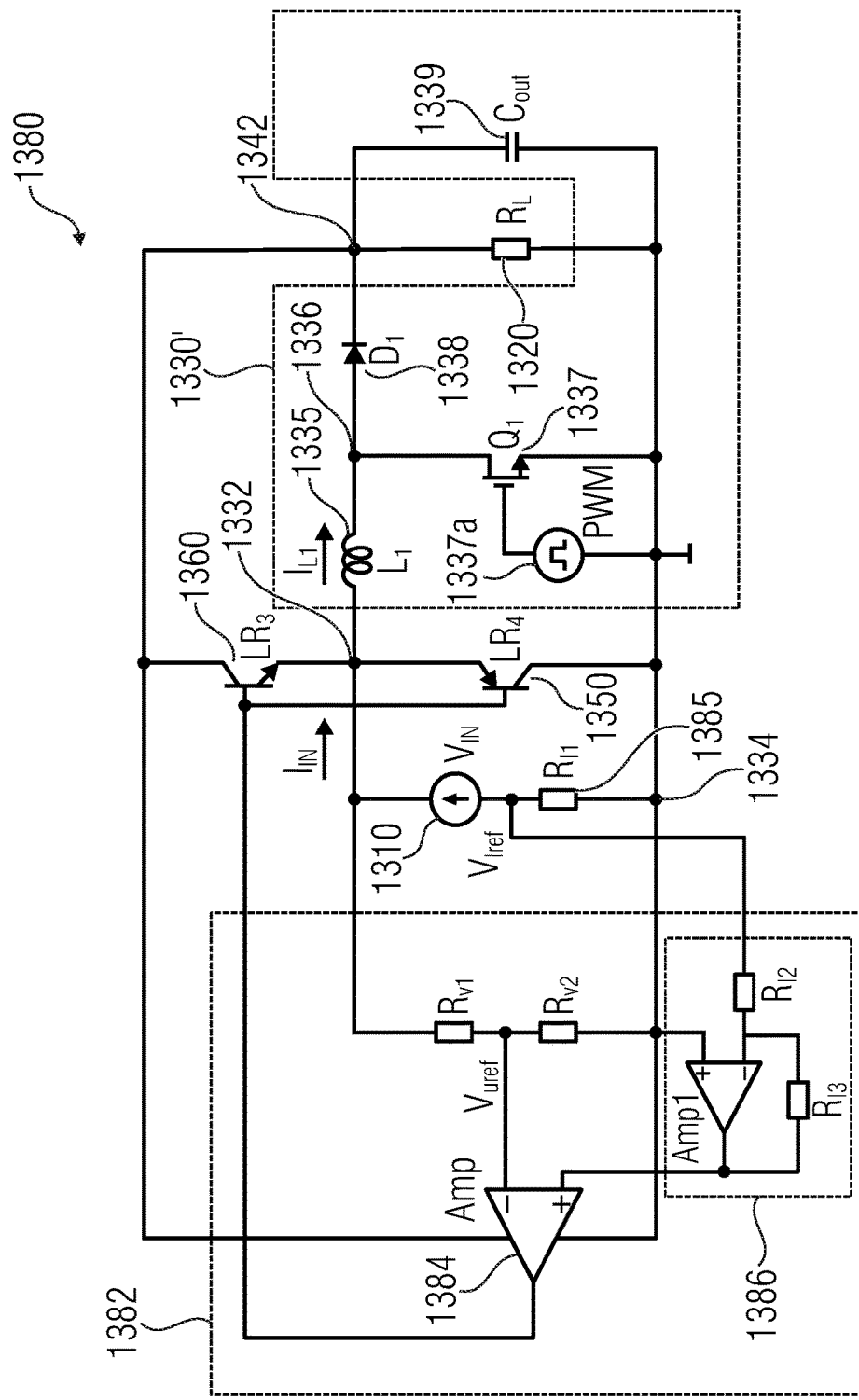
FIG. 13b shows a simplified circuit diagram of an inventive implementation (or embodiment) of the linear-support boost converter according to FIG. 13a, combined with two linear regulators, and an implementation of an inventive regulating function of the linear-support step-up converter for ripple current suppression at the input.

Voltage Converter According to FIG. 13*b*

In the following, a linear-support boost converter according to FIG. 13*a*, combined with two linear regulators, and an implementation of an inventive regulating function of the linear-support step-up converter for ripple current suppression at the input will be described by means of FIG. 13*b*.

The voltage converter or voltage converter arrangement 1380 according to FIG. 13*b* is based on the voltage converter 1300 according to FIG. 13, so that identical or mutually corresponding elements are designated with identical reference numerals and will not be explained again here.

It should be noted that FIG. 13*b* shows further details (which are optional and may be used individually and in combination) with regard to driving of the switch 1337 and with regard to driving of the input regulating elements 1350, 1360.

As can be seen from FIG. 13*b*, the voltage converter 1380 includes a pulse-width modulated drive 1337*a*, which provides a drive signal for a field-effect transistor Q1, which acts as a switch 1337. For example, the pulse-width modulated signal generator 1337*a* provides a signal that is applied to a gate terminal of the field-effect transistor Q1 to turn the field-effect transistor, which acts as a switch, on and off.

The voltage converter 1380 further comprises a linear regulating circuit 1382 which, on the one hand, receives information about the input voltage of the boost converter and, on the other hand, receives information about the input current supplied by the input voltage source and which on the basis thereof provides a common drive signal for the first regulating transistor 1350 and the second regulating transistor 1360. For example, a differential amplifier 1384 receives at its inverting input a voltage $V_{uref}$ obtained by a resistive voltage divider with resistors $R_{V1}$ and $R_{V2}$ on the basis of the input voltage of the boost, or step-up, converter 1330. In other words, the voltage divider, comprising for example the resistors $R_{V1}$ and $R_{V2}$, is connected between the first input voltage node 1332 and the second input voltage node 1334, and a tap of the resistive voltage divider is connected to the inverting input (−) of the differential amplifier 1384. Further, a current measuring resistor 1385 is connected in series with the input voltage source 1310 between the first input voltage node 1332 and the second input voltage node 1334 so as to determine the current supplied by the input voltage source 1310. A voltage drop across the current measuring resistor 1385 is scaled by an (inverting) amplifier 1386, and a corresponding scaled current signal (representing the input current in the form of a voltage) is fed to the non-inverting input (+) of the differential amplifier 1384. An output signal of the differential amplifier 1384 is supplied to both a base terminal of the second regulating transistor 1360, which is an NPN transistor, and to the base terminal of the first regulating transistor 1350, which is a PNP transistor.

The locked loop, which comprises the regulating transistors 1350, 1360, the resistive voltage divider $R_{V1}$, $R_{V2}$, the inverting amplifier 1386 and the differential amplifier 1384, sets driving of the regulating transistors 1350, 1360 such that the current $I_{IN}$ supplied by the voltage source 1310 is at least approximately proportional to the input voltage between the first input voltage node 1332 and the second input voltage node 1334 (the voltage between the input voltage nodes 1332,1334 being a good approximation of the voltage $V_{IN}$ since the voltage drop across the current measuring resistor should advantageously be negligibly small). The proportionality constant is determined by the resistive voltage divider (comprising resistors $R_{V1}$ and $R_{V2}$), the current measuring resistor 1385 and a gain of the inverting amplifier 1386.

As far as the regulation mechanism is concerned, it should be noted that the second regulating transistor 1360 becomes conductive when the current supplied by the input voltage source 1310 becomes "too large" in relation to the input voltage. In this case, a current is supplied from the output of the voltage converter arrangement to the input via the second regulating transistor 1360. However, if the current supplied by the input voltage source 1310 (or drawn from the input voltage source 1310 by the entire voltage converter arrangement) is "too small" (relative to the input voltage), the first regulating transistor 1350 will become conductive and will thus increase the current drawn by the voltage converter arrangement. This at least partially compensates for an input current ripple of the step-up, or boost, converter 1330.

In addition, it should be noted that the corresponding regulating function may, of course, be implemented differently in terms of circuit engineering. The voltage divider comprising resistors $R_{V1}$, $R_{V2}$ may be replaced by any other analog or digital circuitry that provides a corresponding signal for the regulating amplifier. In the simplest case, the first input voltage node may also be directly connected to the input of the regulating amplifier. The current measurement performed by the current measuring resistor 1385 and the inverting amplifier 1386 may be replaced by another current measuring mechanism, of course, which provides a corresponding current signal to the regulating amplifier 1384.

Optionally, separate drive signals may be generated, of course, for the regulating transistors 1350, 1360, the use of a common drive signal being particularly efficient.

Incidentally, it should be noted that the voltage converter arrangement 1380 according to FIG. 13*b* may be supplemented by those features, functionalities and details which are described herein with regard to the other voltage converter arrangements. The corresponding features, functionalities and details may be used individually or in combination in the voltage converter arrangement 1380 as well.

Voltage Converter Arrangement According to FIG. 13*c*

FIG. 13*c* shows a circuit diagram of a voltage converter arrangement 1390, which is a linear-support step-up, or boost, converter or boost converter according to FIG. 13*a*, combined with two linear regulators, and an implementation of an inventive regulating function of the linear-support step-up converter for ripple current suppression at the input and voltage-controlled power factor correction with a variable voltage reference via function Kv(s).

In this respect it should be noted that the voltage converter arrangement 1390 adopts numerous features, functionalities, details and elements of the voltage converter arrangements shown in FIGS. 13*a* and 13*b*. Corresponding features, functionalities, details and components are designated here by the same reference numerals, so that the description with regard to FIGS. 13*a* and 13*b* is still valid here.

However, with the voltage converter arrangement 1390 according to FIG. 13*c*, some details have been changed or are shown with a larger degree of detail, as will be explained in the following.

In this regard, it should be noted that the boost converter 1330" has a regulation for a pulse-width modulation of the switch or switching transistor 1337. A voltage signal 1391*a*, which is proportional to an output voltage $V_{out}$ of the boost converter or voltage converter arrangement (or which may also be equal to the output voltage), is tapped, for example, by a resistive voltage divider comprising resistors $R_{T1}$ and $R_{T2}$ and is fed to a regulating circuit 1391*b*. In the regulating circuit, the voltage signal 1391*a* is compared with a reference voltage $V_{Ref}$, for example, by a regulating amplifier, and a regulating signal 1391*d* is provided on the basis thereof, for example by using a regulation 1391*c*. Regulation 1391*c* can implement, for example, a proportional regulation or an integral regulation or a proportional-integral regulation or other regulating functionality. The regulating signal 1391*d* is used, for example, for setting an on-off ratio of a pulse-width modulation with which the switch or switching transistor 1337 is driven. The pulse-width modulation is generated, for example, in that a comparator 1391*e* compares the regulating signal 1391*d* with a signal from a sawtooth generator 1391*f* to obtain a drive signal for the switch 1337. Thus, the on-off ratio of the drive signal of the switch 1337 is determined by the regulating signal 1391*d*, the switching frequency of the switch 1337 being determined by the frequency of the sawtooth signal obtained by the sawtooth generator 1391*f*.

All in all, it can thus be stated that the step-up converter, or boost converter, 1330" is regulated by setting or regulating the ratio of on-time and off-time as a function of the output voltage of the step-up converter.

Furthermore, the regulating signal 1391*d* is also used for setting a target ratio between the input voltage of the step-up converter and the input current of the voltage converter arrangement. In particular, the fixed voltage divider formed by the resistors $R_{V1}$ and $R_{V2}$, as described for the voltage converter arrangement 1380, is replaced here by a variable voltage divider 1392*a*. The adjustable voltage divider 1392*a* provides a divided voltage signal 1392*b* on the basis of the voltage between the first input voltage node 1332 and the second input voltage node 1334 (between which the input voltage of the voltage converter arrangement 1390 or the input voltage of the boost converter 1330" is applied). The adjustable voltage divider 1392*a* comprises a series connection of a first resistor 1392*c* and a second resistor 1392*d* which are connected in series between the first input voltage node 1332 and the second input voltage node 1334. A series connection of a third resistor 1392*e* and a collector-emitter path of an adjustable transistor 1392*f* is connected in parallel with the first resistor 1392*c*. For example, a first terminal of the resistor 1392*e* is coupled to the first input voltage node 1332, and a second terminal of the resistor 1392*e* is coupled to a collector terminal of the adjustable transistor 1392*f*. For example, an emitter terminal of the adjustable transistor 1392*f* is coupled to a center node 1392*g* of the adjustable voltage divider 1392*a*, to which a second terminal of the first resistor 1392*c* and a first terminal of the second resistor 1392*d* are also coupled. Incidentally, the divided voltage signal 1392*b* is tapped at the center node 1392*g* and is fed to the differential amplifier, for example, at its non-inverting input (+). The adjustable voltage divider 1392*a* is adjusted, for example, as a function of the regulating signal 1391*d* and also as a function of currents flowing through the first regulating transistor 1350 and the second regulating transistor 1360.

For example, a drive signal of the adjustable transistor 1392*f* of the adjustable voltage divider 1392*a* is provided by a setting function 1393*a*. The setting function 1393*a* receives the regulating signal 1391*d*, for example. Furthermore, setting function 1393*a* can receive information 1393*b* about a current flow through the first regulating transistor 1350 and the second regulating transistor 1360. For example, the information 1393*b* indicates whether or not the current flowing through the first regulating transistor 1350 and/or the current flowing through the second regulating transistor 1360 has exceeded a preset threshold value. Thus, for example, the regulating function 1393*a* can be adapted as a function of the quantities of the currents flowing through the first regulating transistor 1350 and the second regulating transistor 1360, as described below. Overall, a target ratio between the input voltage and the input current of the voltage converter arrangement (i.e. the current supplied by the voltage source 1310) can thus be set while the load on the voltage converter arrangement 1390, which is also described by the regulating signal 1391*d*, is taken into account.

It should also be noted that in the embodiment shown in FIG. 13*c*, the output signal of the regulating amplifier 1384 is not directly applied to the base terminals of regulating transistors 1350, 1360. Rather, the output signal of the regulating amplifier 1384 is applied to a gate terminal of a field-effect transistor 1394*a* whose source terminal is coupled, for example, to the second input voltage node 1334. For example, a drain of the transistor 1394*a* is coupled to the first output voltage node via the resistor 1394*b*. Base terminals of the regulating transistors 1350, 1360 are coupled, for example, to the node at the drain terminal of the transistor 1394*a*. This enables the voltage applied to the base terminals of the regulating transistors to increase almost to the level of the voltage applied to the first output voltage node 1342 without the supply voltage of the regulating amplifier 1384 having to assume equally high values. In this respect, the regulating transistors 1350, 1360 can be efficiently driven.

Incidentally, it should be noted that the voltage converter arrangement 1390 according to FIG. 13*c* may optionally be supplemented by any features, details and functionalities described herein with regard to the other voltage converter arrangements. Corresponding details, features and functionalities can be used individually or in combination in connection with the voltage converter arrangement 1390.

Voltage Converter Arrangement According to FIG. 13*d*

FIG. 13*d* shows a circuit diagram of a voltage converter arrangement 1395 according to an inventive implementation or an embodiment. FIG. 13 shows, in particular, a linear-support boost converter according to FIG. 13*a*, combined with two linear regulators, and an implementation of an inventive regulating function of the linear-support step-up converter for ripple current suppression at the input and voltage-controlled power factor correction with variable voltage reference via the function of two inverting amplifiers with a time delay (low-pass filters Ry2, Ry3, Cy3 and Ry5, Ry6, Cy6).

It should be noted that the voltage converter arrangement 1395 corresponds in many parts to the voltage converter arrangements 1300, 1380, 1390 according to FIGS. 13*a*, 13*b* and 13*c*. For this reason, elements that are identical or identical in action are designated by the same reference numerals here, and reference is made to the explanations given with regard to FIGS. 13*a*, 13*b* and 13*c*.

It should be noted, however, that the regulating signal 1391*g*, which is fed to the comparator 1391*e*, is slowed down, e.g., as compared to the regulating signal 1391*d*. It should also be noted that driving of the regulating transistors 1350, 1360 is performed independently of the regulation of the output voltage.

Instead of the variable voltage divider 1392*a*, the voltage converter arrangement 1395 comprises a variable voltage divider 1397*a*, which is driven in a modified manner.

A parallel connection of a first branch and a second branch is connected between the first input voltage node 1332 and a center node 1397*b* of the adjustable voltage divider 1397*a*. The first branch comprises a first adjustable transistor 1397*c* and a first resistor 1397*d*, an emitter terminal of the transistor 1397*c* being coupled to the first input voltage node 1332, a collector terminal of the transistor 1397*c* being coupled to a first terminal of the resistor 1397*d*, and a second terminal of the resistor 1397*d* being coupled to the center node 1397*b*. The second branch comprises a second adjustable transistor 1397*e* and a second resistor 1397*f*. An emitter terminal of the second adjustable transistor 1397*e* is coupled to the first input voltage node, a collector terminal of the second adjustable transistor 1397*e* is coupled to a first terminal of the second resistor 1397*f*, and a second terminal of the second resistor 1397*f* is coupled to the center node. Further, a third resistor 1397*g* is coupled between the center node and the second input voltage node 1342. The center node 1397*b* is coupled to a non-inverting input (+) of the regulating amplifier 1384. Incidentally, the first adjustable transistor 1397*c* and the second adjustable transistor 1397*e* are PNP transistors, for example.

A base drive signal for the first adjustable transistor is provided, for example, by an operational amplifier-based active low-pass filter, a first, non-inverting, input of the corresponding operational amplifier being coupled to the first input voltage node 1332 and a second, inverting, input of the operational amplifier being coupled via a resistor to a current measuring node 1398*a*. For example, an output of the corresponding operational amplifier is coupled to the base terminal of the first adjustable transistor 1397. The current measuring node 1398 is coupled, for example, to the first input voltage node 1332 via a current measuring resistor 1398*b*. Furthermore, the current measuring node 1398*a* is coupled to an emitter terminal of the second regulating transistor 1360. A voltage drop across the current measuring resistor 1398*b* is therefore proportional to a current flowing through the second regulating transistor 1360. Thus, the overall effect is that an amount of the base-emitter voltage of the first adjustable transistor 1397*c* increases—in a time-delayed manner—as the current flow through the second regulating transistor 1360 increases. Overall, as the current flow through the second regulating transistor 1360 increases, an (effective) resistance thus decreases in the path of the adjustable voltage divider that is formed by the first adjustable transistor 1397*c* and the associated resistor 1397*d*.

It should also be noted that a base terminal of the second adjustable transistor 1397*e* is coupled to a collector terminal of an auxiliary transistor 1399*c*. An emitter terminal of the auxiliary transistor 1399*c* is incidentally coupled to the first input voltage node 1332. A base terminal of the auxiliary transistor 1399*c* is coupled to an output of an operational amplifier, which is part of an active low-pass filter. The active low-pass filter receives an input voltage that is proportional to a current flowing through the first regulating transistor 1350. For this purpose, a current measuring resistor 1398*c* is connected between the first input voltage node and an emitter terminal of the first regulating transistor 1350. Thus, a voltage drop across the current measuring resistor 1398*c* is proportional to the current flow through the first regulating transistor 1350. Accordingly, the input voltage of the operational amplifier-based low-pass filter is proportional to the current flow through the first regulating transistor 1350, and a quantity of the base-emitter voltage of the auxiliary transistor 1399*c* follows the quantity of the current flow through the first regulating transistor 1350 in a delayed manner. As the current flow through the first regulating transistor 1350 increases, a current flow through the emitter-collector path of the auxiliary transistor 1399*c* also increases, which in turn causes a current flow through the emitter-collector path of the second adjustable transistor 1397*e* to decrease.

Thus, if the current flow through the second regulating transistor 1360 increases on average, a ratio between the voltage at the non-inverting input (+) of the regulating amplifier 1384 and the input voltage is increased. In other words, as the current flow through the second regulating transistor 1360 increases, the ratio between the voltage at the non-inverting input (+) of the regulating amplifier 1384 and the input voltage increases. As the current flow through the first regulating transistor 1350 increases, the ratio between the voltage at the non-inverting input (+) of the regulating amplifier 1384 and the input voltage decreases.

Thus, all in all, the voltage divider ratio of the adjustable voltage divider 1397*a* is adjusted as a function of the current flows through the first regulating transistor 1350 and the second regulating transistor 1360, the adjustment here taking place with a time delay, so that, for example, averaging essentially takes place over several switching periods of the clocked voltage converter 1330". This is achieved, for example, by the active (operational amplifier-based) low-pass filters which supply the drive signals for the adjustable transistors 1397*c*, 1397*e* of the adjustable voltage divider 1397*a*.

Further details will be described later.

Voltage Converter Arrangement According to FIG. 14

FIG. 14 shows a block diagram of a voltage converter 1400, in accordance with an embodiment of the present invention.

The voltage converter arrangement 1400 is configured to receive an input voltage from an input voltage source 1410 and to provide an output voltage for a load 1420 on the basis thereof. The voltage converter arrangement 1400 comprises a step-up and step-down converter 1430. The voltage converter arrangement 1400 comprises a first input voltage node 1432 and a second input voltage node 1434 as well as a first output voltage node 1442 and a second output voltage node 1444 (which may, for example, coincide with the second input voltage node 1434). For example, an input of the step-up and step-down converter 1430 is coupled to the first input voltage node, and an output of the step-up and step-down converter 1430 is coupled to the first output voltage node. Typically, the step-up and step-down converter is also coupled to the first input voltage node 1434 and the second output voltage node 1444.

A first input regulating element 1450 is connected between the first input voltage node 1432 and the second input voltage node 1434 to allow a current flow. A second input regulating element 1460 is connected between the first input voltage node 1432 and the first output voltage node 1442. For example, a third input regulating element 1470 is connected, in parallel with the second input regulating element, between the first input voltage node 1432 and the first output voltage node 1442. For example, the second input regulating element 1460 allows a current flow from the first output voltage node 1442 to the first input voltage node 1432, whereas the third input regulating element 1470 allows a current flow from the first input voltage node 1432 to the first output voltage node 1442.

The functionality of the voltage converter arrangement 1400 is similar to the functionality of the voltage converter arrangement 1200 as shown in FIG. 12, the step-up converter 1230 being replaced by the step-up and step-down converter 1430. Thus, for example, the first input regulating element 1450 corresponds to the first input regulating element 1250, and for example the second input regulating element 1460 corresponds to the second input regulating element 1260. The third input regulating element 1470 is added and may, for example, take over a current flow instead of the first input regulating element 1450 if power dissipation in the third input regulating element 1470 is smaller than in the first input regulating element 1450.

With regard to the remaining mode of operation, reference is made to the above explanations, for example, regarding the voltage converter arrangements according to FIGS. 12 and 13 as well as to the following explanations regarding the voltage converter arrangements according to FIG. 15.

Voltage Converter Arrangement According to FIG. 15a

FIG. 15a shows a simplified circuit diagram of a SEPIC converter combined with three linear regulators.

The voltage converter arrangement 1500 is configured to provide an output voltage for a load 1520 on the basis of an input voltage supplied by an input voltage source 1510. The voltage converter arrangement 1500 comprises a SEPIC converter 1530 whose input is coupled to a first input voltage node 1532 and whose output is coupled to a first output voltage node 1542.

The voltage converter arrangement 1500 further comprises a first regulating transistor 1550, which is a PNP transistor, an emitter terminal being coupled to the first input voltage node 1532, and a collector terminal being coupled to the second input voltage node 1534. The voltage converter arrangement 1500 further comprises a second regulating transistor 1560, which is an NPN transistor, a collector terminal being coupled to the first output voltage node 1542, and an emitter terminal being coupled to the first input voltage node 1532. The voltage converter arrangement 1500 further comprises a third regulating transistor 1570, which is a PNP transistor, an emitter terminal being coupled to the first input voltage node 1532, and a collector terminal being coupled to the first output voltage node 1542. The second regulating transistor 1560 and the third regulating transistor 1570 are thus connected, in an antiparallel manner, between the first input voltage node 1532 and the first output voltage node 1542 so that they can carry currents in different directions.

The SEPIC converter 1530 comprises a first inductance 1534 connected between the first input voltage node 1532 and a first internal node 1536. The SEPIC converter 1530 further comprises a switch 1536a connected between the first internal node 1536 and the second input voltage node 1534. The SEPIC converter further comprises a first capacitance 1536b connected between the first internal node 1536 and a second internal node 1537. The SEPIC converter further comprises a second inductance 1537a connected between the second internal node 1537 and the second input voltage node 1534, and a diode 1538 connected between the second internal node 1537 and the first output voltage node 1542. The SEPIC converter further comprises an (optional) output capacitance 1539 connected between the first output voltage node and the second output voltage node (i.e. in parallel with the load 1520).

As far as the mode of operation of the SEPIC converter is concerned, it should be noted that fluctuations in the input current of the SEPIC converter 1530 that are caused by the clocking of the SEPIC converter 1530 are at least partially compensated for by the input regulating elements 1550, 1560, 1570; depending on an operating state (for example, depending on a relation between the input voltage applied between the input voltage nodes 1532, 1534 and an output voltage applied between the output voltage nodes 1542, 1544), a controller decides which of the regulating transistors 1550, 1560, 1570 are activated for regulation.

An optimal operating range for a linear-support SEPIC converter in case of a variable selectable output voltage follows an approximate function of the form $$\Delta V_{out}=V_{in}-V_{in\_min} \quad (2)$$

Details will be explained in the following, reference also being made to the implementations of the other voltage converters, which may optionally also be used here.

Voltage Converter Arrangement According to FIG. 15b

FIG. 15b shows a block diagram of a linear-support SEPIC converter according to FIG. 15a, combined with three linear regulators, and an implementation of an inventive regulating function of the linear-support step-up/step-down converter for ripple current suppression at the input and voltage-controlled power factor correction with variable voltage reference via function Kv(s).

The voltage converter arrangement 1580 is configured to receive an input voltage from an input voltage source 1510 and provide an output voltage for a load 1520.

The voltage converter arrangement 1580 includes a SEPIC converter 1530', which is essentially the same as the SEPIC converter 1530. The switch 1536a here is formed by a field-effect transistor. A regulation is carried out here essentially as with the voltage converter arrangement 1390 according to FIG. 13c, the signals 1591a, 1591b, 1591c,

1591*d*, 1591*e*, 1591*f* essentially corresponding to the signals or components 1391*a*, 1391*b*, 1391*c*, 1391*d*, 1391*e*, 1391*f* with regard to their functions and action, so that no further description will be given here; rather, reference shall be made to the above explanations.

As is the case with the voltage converter arrangement 1500 according to FIG. 15*a*, the voltage converter arrangement 1580 also has a first regulating transistor 1550, a second regulating transistor 1560 and a third regulating transistor 1570, which are connected in the same manner as described for the voltage converter arrangement 1500.

There is also a current measuring resistor 1585, which corresponds to the current measuring resistor 1385 and causes a voltage drop corresponding to the current supplied by the voltage source 1510. There is also a regulating amplifier 1584, which corresponds to the regulating amplifier 1384 in terms of its mode of operation. In addition, there is an operational amplifier-based amplifier circuit 1586, which corresponds, for example, to the amplifier circuit 1386 and which, for example, supplies to the non-inverting (+) input of the amplifier 1584 a voltage signal proportional to the current supplied by the voltage source 1510. There is also an adjustable voltage divider 1592, which corresponds to the adjustable voltage divider 1392 in terms of its function. The adjustable voltage divider supplies a voltage signal to the inverting (−) input of the regulating amplifier 1584 which corresponds, with an adjustable division ratio, to the input voltage of the voltage converter arrangement (for example, to the voltage supplied by the voltage source 1510 minus the—often negligible—voltage dropping across the current measuring resistor 1585). The corresponding voltage signal, which has been reduced by division, is designated by 1592.

An output signal of the regulating amplifier 1584 is fed, via a switch 1594, either (jointly) to the base terminals of the first regulating transistor 1550 and the second regulating transistor 1560 or to the base terminal of the third regulating transistor 1570. Thus, the controller may decide whether regulation is to be performed by the first regulating transistor 1550 and the second regulating transistor 1560, or (alternatively) by the third regulating transistor 1570.

It should also be noted that the drive signal for the adjustable voltage divider is provided, for example, by a mapping function 1593 on the basis of the regulating signal 1591*d* (which corresponds to the regulating signal 1391*d*).

In this respect, it should be noted that further details regarding the functionality of the voltage converter arrangement 1380 will be described below. Furthermore, the features, functionalities and details described with regard to the other voltage converter arrangements may optionally be used, individually or in combination, in the voltage converter arrangement according to FIG. 15*b*.

Voltage Converter Arrangement According to FIG. 15*c*

FIG. 15*c* shows a circuit diagram of a voltage converter arrangement 1590, according to an embodiment of the present invention.

In particular, FIG. 15*c* shows a linear-support SEPIC converter according to FIG. 15*a*, combined with three linear regulators, and an implementation of an inventive regulating function of the linear-support step-up/step-down converter for ripple current suppression at the input and a voltage-controlled power factor correction with variable voltage reference via function Kv(s) as well as a correction function of the voltage reference $V_{uref}$ by sensing the currents $I_{reg1}$, $I_{reg3}$ and $I_{reg4}$ in the linear regulators.

It should be noted that the voltage converter arrangement 1590 according to FIG. 15*c* is very similar to the voltage converter arrangement 1580 according to FIG. 15*b* and to the voltage converter arrangement 1500 according to FIG. 15*a*, so that elements and signals which are identical or identical in action will not be described again here. Instead, reference is made to the above explanations.

In particular, it should be noted that generation of the drive signal for the adjustable voltage divider 1592*a* is carried out slightly differently with the voltage converter 1590 than with the voltage converter 1580. In addition, provision of the drive signal for the base terminals of the regulating transistors 1550, 1560, 1570 is carried out slightly differently than with the voltage converter arrangement 1580.

In the voltage converter arrangement 1590, the drive signal for the adjustable voltage converter 1592*a* is generated by a mapping function 1596*a*, which receives, as an input signal or as input information, not only the regulating signal 1591*d*, but also information about the currents flowing through the regulating transistors 1550, 1560, 1570. For example, the regulating function 1596*a* receives information about whether the currents flowing through the regulating transistors 1550, 1560, 1570 exceed or fall below specified upper and/or lower threshold values. Alternatively or additionally, the regulating function 1596*a* also receives information about minimum and/or maximum values of the currents flowing through the regulating transistors 1550, 1560, 1570. Details regarding the corresponding setting function or regulating function or mapping function 1596*a* will be described below.

With regard to generating the drive signal for the base terminals of the regulating transistors, it should be noted that a field-effect transistor 1595*a* (for example, an n-channel field-effect transistor) and a resistor 1595*b* are used for this purpose. For example, a gate terminal of the field-effect transistor 1595*a* is connected to the output of the regulating amplifier 1584. A source terminal of the field-effect transistor 1595*a* is coupled to the second input voltage node 1534. A drain terminal of the transistor 1595*a* is coupled to the first output voltage terminal 1542 via the resistor 1595*b*. Thus, for example, the signal applied to the input of switch 1594 may adopt potentials that lie between the potential of the first output voltage node 1542 and the potential of the second input voltage node 1534 or the potential of the second output voltage node 1544.

Further details regarding the voltage converter arrangement 1590 will be explained below. Furthermore, the features, functionalities and details described with regard to the other voltage converter arrangements may optionally be used, individually or in combination, in the voltage converter arrangement according to FIG. 15*c*.

Figure 15D:
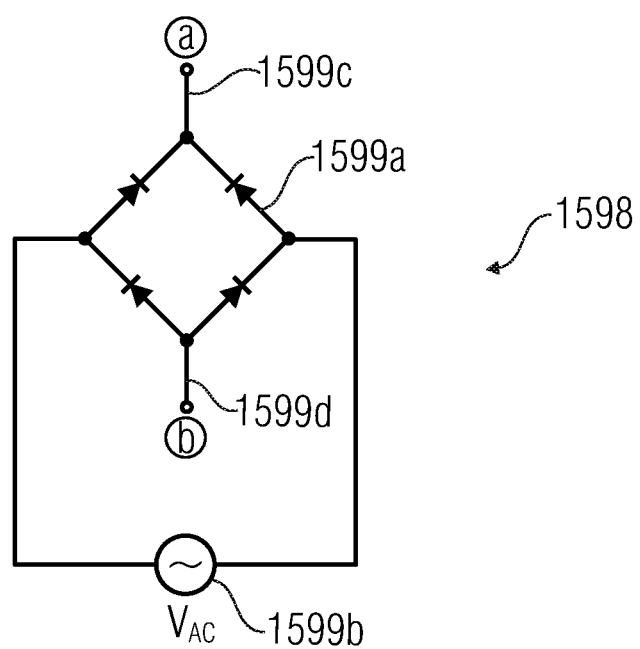
FIG. 15d shows a circuit diagram of an inventive implementation of an input voltage source Vin by a unidirectional alternating voltage with a full-bridge rectifier.

Input Voltage Source According to FIG. 15*d*

FIG. 15*d* shows a circuit diagram of an input voltage source 1598. The input voltage source 1598 includes, for example, a bridge rectifier 1599*a* with four rectifier diodes. Input terminals of the bridge rectifier are connected, for example, to an AC voltage source 1599*b*. For example, a first output terminal 1599*c* and a second output terminal 1599*d* can be used to provide the input voltage $V_{in}$ for the voltage converter arrangements described herein. Thus, the input voltage of the voltage converter arrangement represents, for example, a pulsating DC voltage as provided by the bridge rectifier at the output terminals 1599*c*, 1599*d*.

It should be noted, however, that the input voltage of the voltage converter arrangement may also be provided in other ways, of course.

In other words, FIG. 15d shows an inventive implementation of an input voltage source $V_{in}$ by a unidirectional AC voltage with a full-bridge rectifier.

Further Aspects and Details

In the following, further aspects and details will be described which may optionally be used with the voltage converter arrangements described herein. It should be noted that the aspects and details may typically be used individually or in combination.

FIG. 13 shows an inventive implementation of a linear-support boost converter (according to another embodiment). This means that the input current, which follows a sinusoidal shape by known regulating methods, is taken from the mains as a sinusoidal shape without any high-frequency deviations.

Table 3 shows the function of the active regulators LR3 and LR 4. For example, the linear regulator LR3 is active when the input voltage is larger than the difference between the output and the input voltage. If the input voltage is smaller than the difference between the output and the input voltage, or if the input voltage approximates the output voltage, e.g. the linear regulator LR4 will be activated. If the input voltage is about half the output voltage (e.g. +/−10 percent), both linear regulators LR3 and LR4 will be activated so that the current ripple of the boost choke L1 in FIG. 13 will be taken over by the linear regulator LR3, if the choke current is smaller than the target value, e.g. of an input-side sinus shape of the current. If, on the other hand, the choke current is larger than the target value, for example of an input-side sinus shape of the current, the current ripple is taken over by LR4, so that, for example, power dissipation in the linear regulators is minimized in each case as the product of the voltage difference over the respective linear regulator and the smallest possible effective current.

FIG. 13b shows a implementation of the invention which, for example, establishes (e.g. adjusts) an exact proportionality of the input current to the applied input voltage. In principle, the circuit can be used for power factor correction at sinusoidal half-waves of the voltage Vin at the input. However, only such power may be transmitted which follows the function $$P_{in} = \frac{V_{in\_RMS}^2}{\frac{R_{I3}}{R_{I2}} R_{I1} \left( \frac{R_{V1}}{R_{V2}} + 2 \right)} \quad (3)$$

with sinusoidal half-waves. The input current is fixedly set in proportion to the input voltage, for example, in that the ripple resulting from the pulsating input current of the boost converter is compensated for by the linear regulators LR3 and LR4 in each case. The current has the following function due to the circuit in FIG. 13b:

$$I_{in} = \frac{V_{in\_RMS}}{\frac{R_{I3}}{R_{I2}} R_{I1} \left( \frac{R_{V1}}{R_{V2}} + 2 \right)} \quad (3a)$$

If the boost converter takes up a input current IL1 that is larger than the value (or target value) set by (3a), i.e. consumes more power than is specified by the ratio of (3a), the linear regulator LR3, for example, will be activated (e.g. by the regulating amplifier 1384) and will compensate for a DC component in addition to the ripple current in that the current flows from the positive potential of the output voltage (e.g. from the first output voltage node 1342) to the positive node of the input voltage (e.g. to the first input voltage node), thereby withdrawing further energy from the load. As a result, the output is loaded more that with the load RL, and the output voltage is reduced until the power at the load is approximately equal to the power consumed according to (3). Thus the transfer function of the boost converter in continuous operation becomes smaller than the function described by the equation Vout/Vin=1/(1−D).

If, on the other hand, the output load consumes less power than specified by (3), the excess power is consumed, for example, in the linear regulator LR4 by diverting the current against ground. In this case, the transfer function of the boost converter follows the equation Vout/Vin=1/(1−D) for continuous operation.

The boost converter should operate in continuous mode (CCM) in order to keep the losses in the two linear regulators low. For example, the input current ripple can only be fully compensated for up to an output power which is less than or equal to the power according to equation (3). For lower power at the load RL, the loss component in the linear regulators LR3 and LR4 will increase to such an extent that the power described in (3) will be supplied at the input. This circuit can be used, for example, for tasks where a sinusoidal voltage or a voltage with a power factor of 100% may be used at any random input voltage curves, which may be the case in measurement technology, for example. In order to minimize power dissipation of the circuit, the load RL may be a low-loss rear-feed circuit to a mains or an energy storage device. The frequency and turn-on time of the PWM can be kept approximately constant so that the input power is equal to the output power, minus the losses in the components of the circuit.

To change the transmitted power according to (3), for example, one may change either the divider ratio R13/R12 or the divider ratio RV1/RV2, which is given by further possibilities not shown in FIG. 13b and described in FIGS. 13c and 13d, for example.

FIG. 13c shows an inventive implementation of a boost converter with linear assistance for power factor correction. The boost converter is operated, for example, in continuous operation with a sufficiently large inductance L1. Via a voltage divider RT1 and RT2, the output voltage Vout is compared, for example, with a reference voltage Vref and used, via the regulator Reg1 and the downstream setting of the regulating parameters "control" or "regulation" via the limiter for generating a PWM signal by comparing the regulator output with a sawtooth function Vsawtooth. The PWM signal controls, e.g., the Mosfet Q1 to regulate the output voltage to an approximately constant value. In the event that the advantageously unidirectional voltage Vin in the mains gap drops to zero, the regulator will operate at a maximum switch-on time, e.g. for a short time, without energy being transmitted, the output buffer capacitor Cout approximately maintaining the voltage despite power output to the load. The voltage divider RV1 and RV2 senses, e.g., the quantity of the input voltage for the smallest possible input power that can be transmitted in continuous operation without the current in the choke L1 dropping to zero. If the power is lower, the boost converter will be operated in the burst mode, for example, and the linear regulators LR3 and LR4 will be deactivated during the off time of the burst mode (optional deactivation circuit is not shown in FIG. 13c). The minimum power drawn from the source Vin in continuous operation is fixedly set, e.g. according to (3), by the resistive dividers RV1 and RV2 and by R12 and R13. The amplifier Ampl, for example, inverts the direction of the voltage across the shunt or shunt resistor R11 of negative voltage with respect to ground and amplifies this voltage with the ratio R13/R12 so that the power dissipation across the shunt R11 can be kept low. This circuit can advantageously also be accommodated in an integrated circuit; the resistors R12 and R13 can be arranged externally or can be digitally programmed by an internal circuit. In order to operate the amplifier Amp at low operating voltage, it can, for example, be provided with an output transistor $Q_A$ (n-channel mosfet) via a pull-up resistor between the output voltage of the amplifier Amp and the output voltage of the boost converter, the amplifier Amp then controlling the gate of the output transistor and, thus, the polarity of the inputs of Amp should or may be reversed as shown.

If the reference value of the voltage from the voltage divider RV2/(RV1+RV2) is too small to supply the power, that may be used, to the output, the divider ratio will be increased, for example, by adding a third resistor RV3 via a transistor LRv, the value of which adjusts the maximum power at the load by increasing the maximum current from the source $V_{in}$, at which the linear regulators compensate for the current ripple only.

This is achieved, for example, by means of the control function Kv(s), which, with a small switch-on time of Q1 and, thus, a low comparison value at the output of the regulator "control" or "regulation", transfers a small voltage to the base of LRv, so that LRv is switched off. The function of Kv(s), for example, should be selected such that the average DC current of the current curve corresponding to the current output power of the boost converter is given by the equation $$P_{in} = \frac{V_{in\_RMS}^2}{\frac{R_{13}}{R_{12}} R_{l1} \left( \frac{R_{Vervs}}{R_{V2}} + 2 \right)} = \eta \, P_{out} = \eta \frac{V_{out}^2}{R_L} \quad (4)$$

the resistance Rvers resulting from the parallel connection of the resistor RV1 and the equivalent resistance value from RV3 and the adjusting transistor LRv. In order to prevent the power set by (4) from being too large, and, thus, to prevent the excess power from being consumed in the linear regulator LR4 in that the latter takes over the mean differential current between the quantity set at the input and the current that may be used at the load, a reference current only slightly larger is set via the divider RVers/RV2, for example via the function Kv(s).

Furthermore, this setting is more suitable for low input voltages, for example, since there is only a small voltage drop across LR4, and, thus, only little power dissipation occurs at LR4. For a higher input voltage, however, a reference current that is a little too small would have to be set, so that the input current ripple is compensated for, for example via LR3, only from the output voltage, and thus the power dissipation via LR3 is lower than that of RL4 due to the lower voltage drop across RL3.

Normally, the function Kv(s) is a proportionality factor in a first approximation, for example, and in a better approximation, Kv(s) is a non-linear function which results from the implementation of the boost converter, on the one hand and, from the currently applied quantity of the unidirectional AC voltage at the input, on the other hand.

To form the function Kv(s), for example, in addition to fixedly set non-linearity, an optional current measurement may be performed in the two linear regulators LR3 and LR4, which measures the currents Ireg3 and Ireg4 as shown in the figure, and which, when a respective maximum value is exceeded, effects a correction of the function Kv(s) with respect to its proportionality factor, for example by switching off LRv more when the current in LR4 exceeds a maximum value, and by switching on LRv more when the current in LR3 exceeds a maximum value.

Since load changes or fast changes of the input voltage may cause oscillations of exceeding a maximum current value in LR3 and LR4 in that the two currents are alternately exceeded at high frequency, a delay of the change of state of LRv is to be achieved via Kv(s), so that stability is achieved in dynamic transitions and that compensation for the switching ripple of the input current can be effected with a very high frequency bandwidth of the linear regulators LR3 and LR4, while Kv(s) implements a low-pass filter which cannot follow the switching frequency. Advantageously, the cut-off frequency of the filter should be selected between two and ten times the value of the switching frequency, so as not to jeopardize compensation for the switching ripple by sampling of Ireg3 and Ireg4 by changing the reference Vuref too fast, on the one hand, but to react promptly to dynamic changes in the load in order to avoid additional losses in the linear regulators beyond ripple compensation, on the other hand.

FIG. 13d shows a further inventive implementation of current ripple compensation at the input in that the function Kv(s) is omitted and that, instead, only a change in the reference value of Vuref—said change being provided with low-pass filters—is achieved via the auxiliary linear regulators LRv3 and LRv4. In this case, the regulator "control" or "regulation" should or may operate with a lower cut-off frequency than is maximally achieved by the lowpass filters since otherwise the proportionality between the input voltage and the output voltage is not achieved.

If the application permits, the non-inverting input of the comparator Comp1 may (optionally) be operated with a constant reference, so that the locked loop (regulator circuit) via Reg1 is dispensed with. Thus, a fluctuation in the output voltage at the frequency of the input voltage is accepted.

FIG. 14 shows an inventive implementation of a step-up and step-down converter combined with three linear regulators. The output voltage may take on any value, which may be even smaller than that of the input voltage.

FIG. 15a shows an inventive implementation of a SEPIC converter combined with three linear regulators.

The linear regulators shown in FIGS. 14 and 15a, for example, are activated in accordance with the functions described in table 4. In order to cause the smallest electrical losses by the linear regulators in each case, for example, those linear regulators which exhibit the smallest voltage drop according to table 4 will be activated. Specifically, for the step-up conversion in case 4 according to table 4, the current ripple of the input choke L1 is compensated for by the two linear regulators LR3 and LR4 since the voltage drop across both linear regulators is approximately the same and since only about half the ripple current effective value (root mean square value) occurs in both linear regulators.

Compensation for the current ripple of the input source Vin is shown in FIG. 15b for a typical case of applying power factor correction of a unidirectional sinusoidal input voltage.

The function of the circuit shown in FIG. 15b is, for example, analogous to that of the circuit described in FIG. 13c for the case that the output voltage is larger than the input voltage. For the case that the output voltage becomes lower than the input voltage, the switch SL is switched, for example, from position 3+4 to position 1, so that only the linear regulator LR1 is active. Also in this case, current measurement in LR1 may ensure that the current does not exceed a certain maximum value in that the adjusting transistor LRv is switched off more. Furthermore, if the output voltage is lower than the input voltage, for example, LR1 will switch off in case of a strong increase in load, so that the switching ripple cannot be compensated for immediately. Therefore, it may be useful at the same time that when the current in LR1 falls below a minimum current, the value of the control function Kv(s) is changed such that the control transistor LRv is switched on more (i.e., for example, conducts more current). This is not necessary, for example, in the case of an output voltage larger than the input voltage in position 3+4 of switch SL, since one of the linear regulators LR3 or LR4 is active in each case, depending on whether too much or too little current may be used at the load, compared to the current reference currently set.

FIG. 15c represents another inventive implementation of a SEPIC converter, in which the currents in the linear regulators LR1, LR3 and LR4 are sensed and, via the function Kv(s), cause adaptation of the voltage reference Vuref to the power currently consumed at the output in order to minimize the losses in the linear regulators.

The rectifier circuit, shown in FIG. 15d, of an input-side AC voltage may be seen as a further inventive implementation of the input voltage source Vin in FIGS. 13 and 15.

Figure 16:
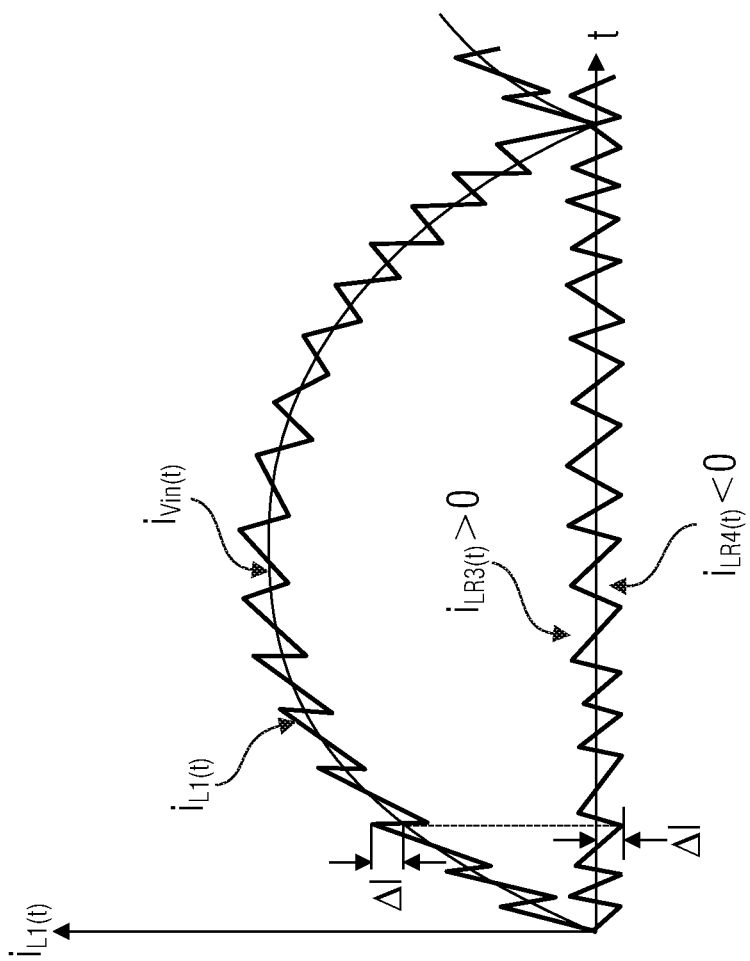
FIG. 16 shows a schematic representation of a compensation for the current ripple of the input current $I_{Vin(t)}$ for a unidirectional sinusoidal input voltage Vin by the currents in linear regulators LR3 and LR4 in accordance with 4 in table 4 (example)

As shown in FIG. 16, the linear regulator LR3 (for example in the voltage converter arrangements described herein) will compensate for the positive current ripple ΔI from the output voltage to the input voltage with respect to the choke L1. In contrast, the negative current ripple −ΔI is compensated for by the linear regulator LR4, for example, from the input voltage of source Vin to the ground potential of source Vin. Ideally, the output voltage would be about twice the input voltage. In typical applications, however, the output voltage is constant and is 25% higher to about double the maximum value of the input voltage Vin.

Since the input voltage (for example) is approximately proportional to the sinusoidal curve of the current curve shown in FIG. 16, whereas the output voltage is approximately constant, it is only near the maximum of the sinusoidal function that compensation for the current ripple that is shown in FIG. 13 would lead to an optimal reduction of losses in the linear regulators if a boost converter were implemented in accordance with the invention as shown in FIG. 13. Near the zero crossing of the unidirectional sinusoidal voltage, for example, compensation for the current ripple would, according to the invention, only take place by means of LR4, so that the entire current ripple=−2ΔI of LR4 becomes negative (or is taken over by LR4).

In case of a implementation with a SEPIC converter as shown in FIG. 15, the output voltage can be selected, in accordance with the invention, to be (e.g.) approximately (e.g. with a tolerance of +/−10%) half the peak value of the unidirectional sinusoidal input voltage. In this case, for example according to table 4, case 5 will occur near the peak value, so that the linear regulator LR1 is activated and the current ripple=−2 ΔI is derived by LR1 to the output RL. In the vicinity of the zero crossing, for example, only LR4 is activated again in case 3 according to table 4 so as to achieve the lowest losses of the linear regulators. If the output voltage is approximately equal to the input voltage, case 2 will occur, for example. If the output voltage is higher than the input voltage and about twice as high as the input voltage, case 4 as shown in FIG. 16 will occur, for example.

Thus (in some embodiments, for example) an ideal direct current is drawn from a source, which ideal direct current in the case of a unidirectional sinusoidal voltage Vin leads to the fact that this arrangement, without further mains filters, can only be carried out with a rectifier at the input of an alternating current network. In order to suppress parasitic harmonic oscillations of the current in the mains zero crossing, which may be caused by the input rectifier, a predetermined function of the capacitive recharging of the rectifiers of the mains input may optionally be simulated additionally in the mains zero crossing by the linear regulator LR3 in order to achieve complete suppression of current ripples of high-frequency interference in the mains zero crossing as well.

In summary, it can thus be stated that with the voltage converter arrangements described herein, the currents flowing through the input regulating elements (also referred to herein as linear regulators) can optionally be regulated so as to achieve, e.g., a fixedly or variably specified ratio between an input voltage and an input current. Various implementations of regulation are possible, as shown in FIGS. 13b, 13c, 13d, 15b, 15c.

Furthermore, by controlling the voltage converter arrangement in a manner not shown in the figures, information about a relation between the input voltage $V_{in}$ and the output voltage $V_{out}$ can be obtained. For example, the controller can distinguish between different cases on the basis of the relation between the input voltage and the output voltage, specifically, for example, the cases shown in tables 2 and/or 3 and/or 4. However, it is of course also possible for the controller to not distinguish between all the cases shown in tables 2 and/or 3 and/or 4, but to not distinguish, e.g., only between those cases that actually occur in the concrete application of the voltage converter arrangement. Based on which one of the relations between the input voltage and the output voltage that are shown in the tables mentioned is actually present, the controller can then decide which of the input regulating elements or linear regulators should be activated, i.e., for example, which of the linear regulators should be used to compensate for the ripple of the clocked voltage converter.

Table 2 shows, e.g., cases 1 to 5, which are used for ripple current compensation at the load only. Table 2 also shows cases 6 to 11, which are used for ripple current compensation on the input side only (i.e. at the input voltage source). Cases 11 to 17 can also be used if ripple current compensation is to take place both at the input (i.e. on the input voltage source side) and at the output (at the load).

It should therefore be noted that it may be sufficient if the controller of the voltage converter arrangement can switch between cases 1 to 5, for example, or if the controller of the voltage converter arrangement can switch between cases 6 to 10, for example, or if the controller of the voltage converter arrangement can switch between cases 11 to 17, for example.

It should also be noted that cases 6 to 10, as shown in table 2, may correspond to cases 1 to 5, for example, as shown in table 4.

In addition, cases 1 to 4 as shown in table 3 may correspond to cases 6 to 9 of table 2 or cases 1 to 4 of table 4. In the case of the step-up converter, for example, case 5 of table 4 or case 10 of table 2 typically do not occur during normal operation because the output voltage of a step-up converter is higher than the input voltage.

In addition, it should be noted that, for example, for cases 7 and 9 according to table 2 or for cases 2 and 4 according to table 3 or for cases 2 and 4 according to table 4, a deviation of +/−10% or +/−20% or +/−1V or +/−2V or +/−5V, respectively, can be tolerated, so that, for example, case 2 according to tables 3 and 4 can be selected by controlling the voltage converter arrangement, if the input voltage deviates from the output voltage by no more than +/−10% (or any other predetermined tolerance value), and so that, for example, case 4 according to tables 3 and 4 can be selected by the controller of the voltage converter arrangement if the input voltage deviates from half the output voltage by no more than +/−10% or +/−20% (or any other predetermined tolerance value).

It should also be noted that the regulating functions described herein may optionally be achieved by other hardware arrangements, of course, while, e.g., the fundamental mechanism that the linear regulators are driven to establish a fixed or adjustable ratio between the input voltage and the input current should be maintained. Details regarding the variable voltage division as well as current measurement may optionally be varied here. The question of how or to what extent the currents are taken into account by the input regulating elements or by the linear regulators LR1, LR3, LR4 may also be varied as a function of the circumstances.

3. Effects and Advantages

In the following, some advantages and effects of embodiments in accordance with the present invention will be explained. However, it should be noted that embodiments in accordance with the present invention do not necessarily have to have the advantages or effects described herein, and that some embodiments, for example, only partially implement the corresponding advantages and effects.

The advantages of embodiments of the present invention are in particular that the advantages of a linear-support switching power supply with step-down converted voltage from the input to the load (linear-support buck converter, or step-down converter) are combined with a step-up conversion of the voltage towards the load. The advantages of the linear-support step-down converter include
- high efficiency, as only the switching ripple rather than the entire load current is compensated for by the linear regulator
- extremely high regulating dynamics, as the linear regulator is able to compensate for any dynamic load change and input voltage change
- saving of input buffer capacitors, which are usually temperature-sensitive, space-consuming and limit service life The advantages of a linear-support step-up converter, such as the boost converter, are for example
- high efficiency, as only the switching ripple rather than the entire input current is compensated for
- very high regulating dynamics since the linear regulators can follow also high-frequency switching of the boost converter rather than only, for example, a low-frequency sinusoidal input current curve for power factor correction
- saving of input filter capacitors upstream or downstream from an input rectifier in case of a sinusoidal input voltage, and especially saving of mains filter chokes in case of an alternating current or direct current network Said advantages are extended by the invention of a linear-support SEPIC converter, for example in that
- step-up conversion as well as step-down conversion of the voltage is achieved or enabled
- galvanic separation due to a comparatively small coupling capacitance prevents the inrush current when the input voltage is applied
- an improvement in the efficiency compared to a linear-support boost converter is achieved in certain fields of operation in that the output voltage is selected to be approximately half the maximum value of the input voltage for typical applications of power factor correction at the mains input of a sinusoidal voltage, or follow the function $\Delta V_{out}=V_{in}-V_{in\_min}$.

4. Alternative Solutions

As will be explained below, it is difficult to find alternative solutions which do not have any significant disadvantages (and which would, for example, allow bypassing of the invention).

The invention can only be bypassed by increasing the effort compared to the inventive circuit implementation. For example, linear assistance, i.e. the linear regulators, or regulating elements, may be provided from auxiliary sources rather than, as is the case with the invention, from the converter arrangement itself, which means an increased effort. This is generally not economical.

5. Important Aspects of Embodiments

In the following, some important aspects will be explained which can optionally be implemented in embodiments of the invention.

An embodiment according to the invention may be easily recognized by testing or measuring a corresponding voltage converter with respect to the following electrical features:

The output DC voltage is advantageously higher than the input DC voltage of the converter, and at the same time, a ripple-free DC current may advantageously be measured at an output load, said output load being directly connected to an inductance of the converter, which can be easily verified optically and electrically. Or the input DC voltage may be larger or less than or equal to the output voltage, and a ripple-free DC current may be measured at the input, the input source being directly connected to an inductance of the converter. At the same time, the expenditure in terms of circuitry should be similar to that of a PWM converter approximately equal in performance and should not be significantly larger than that of the latter. The highest potential of the output voltage (positive pole) should not be connected to ground or be below the lowest potential of the input voltage (negative pole). The highest potential of the input voltage (positive pole) should also not be connected to ground or be below the lowest potential of the output voltage (negative pole).

6. Technical Field of Application

Application of the invention is seen, for example, in the following typical fields:
1. switching power supplies for solar micro-inverters
2. fully integrated power supplies on chips
3. switching power supplies for explosion protection without electrolytic capacitors
4. highly stable supply voltages for medical and laboratory applications
5. power factor correction for sinusoidal and other input voltage time curves
6. precision current sinks for any input current curves
1. For so-called micro-inverters of solar systems, the invention is used to avoid or extremely reduce the size of the buffer capacitors. The characteristic of the zeta converter is used for increasing the voltage of a solar panel in order to operate an inverter with a mains voltage output. Consequently, the solar converter may be implemented in a smaller volume by dispensing with volume-intensive buffer capacitors. At the same time, this increases the service life of the micro-inverter since electrolytic capacitors usually are the first to fail.

2. Fully integrated power supplies on chips may nowadays be operated at switching frequencies of more than 100 MHz by using integrated inductances on driver chips with Si-CMOS or GaN on Si-NMOS technologies, which allow switching edges of >10 V/ns. By eliminating output capacitors, the installation size may be extremely reduced if several power supplies may be used in one device to provide different voltages, for example for controllers and sensors. Such power supplies take into account the ongoing reduction in the size of communication devices.

3. Explosion-proof switching power supplies may be encapsulated in a very complex manner and are reliable up to a certain temperature only. In case of fire, especially electrolytic capacitors can fail or even explode at high temperatures. The low additional cost of a linear-supported converter, and low additional losses in the linear regulators can be tolerated since they allow increased reliability and a significantly higher temperature without the power supply failing. Especially for applications relevant in terms of safety (safety system for fire etc.), the invention offers the possibility of supply from small or heavily decreasing supply voltages, which a linear-support step-down converter cannot provide, and which cannot be achieved with sufficiently high efficiency by another step-up converter (boost converter, SEPIC converter, conventional Cuk converter) with linear support.

4. Power supplies for medical applications often have to be very stable to meet the high reliability requirements. At the same time, a high degree of miniaturization may be used in order to operate battery-powered devices in minute dimensions and also to keep the heating caused by losses as low as possible (high efficiency). In addition, saving of capacitors as well as the safe step-up conversion of a voltage even with decreasing battery voltage is are worth mentioning.

5. Power factor correction up to a power of several hundred watt very often involves the use of additional mains filters, which may make up a large part of the device with proportions of up to approx. 30%. The present invention completely eliminates the need for such mains filters, since linear regulators can also compensate for high-frequency harmonics without significantly increasing the size of the inductive components of the PFC stage (chokes), thus saving volume and cost.

6. In measurement technology, precision current sinks are usually implemented with high power dissipation via amplifier class A, B or AB, which are thus limited in performance and generate high power dissipation. This disadvantage is overcome by the present invention in that the current curve of the load current taken from a source to be tested is removed at low loss by a switching regulator, and in that the simultaneously occurring ripple current is compensated for by linear regulators.

In summary, it can thus be stated that the voltage converter arrangements described herein can be used advantageously in all of the above-mentioned applications (as well as in further applications, of course).

7. Further Aspects

Further embodiments according to the invention will be defined by the attached patent claims.

It should be noted that the embodiments according to the claims can be supplemented with all of the features, functionalities and details described herein (provided that this does not lead to any contradictions).

Features, functionalities and details of the claims may also be combined with the embodiments described herein so as to obtain additional embodiments.

It should be noted that features and functionalities shown in individual or all of the embodiments may also be used in other embodiments, unless there are serious technical reasons for not doing so.

Furthermore, it should be noted that partial functionalities of the embodiments described herein may also be used, provided there are no serious technical reasons for not doing so.

8. Further Details and Remarks

FIGS. 13 and 15 contain additional components, such as the proportional ratio between input voltage and input current, compensation for the proportionality factor, adapted to the output power, according to equation (4) by a time-delayed low-pass filter, as well as the regulating speed of the regulator "control" or "regulation", which is further delayed in relation to the low-pass filter, with regard to the occurring input frequency of the voltage Vin or VinAC so as to ensure the PFC in that the current of the input source roughly follows the sinusoidal curve of the input voltage.

Some important (but not essential) aspects of embodiments according to FIGS. 13 and 15 will be listed below:
- the circuit technology of the inverting amplifiers; and/or
- control of the linear regulators at the potential level of the positive input node with low voltage of +/−5 to 10 volts around this node; and/or
- correction of the voltage reference (or current reference, which is not shown in the figures) by means of current measurement in the linear regulators; and/or
- the regulating speed of the linear regulators as the highest possible regulating speed as compared to the delayed regulating speed of the adaptation of the voltage reference Vuref (or current reference Viref) for setting the power-dependent input current and for minimizing the losses in the linear regulators by means of exclusive ripple compensation without DC component; and/or
- the regulating speed of the switching regulator for power factor correction as being even lower than the regulating speed for adapting the reference value for setting the power-dependent input current so as to maximize the power factor; and/or
- implementing the input source Vin by a unidirectional alternating voltage.

Other important (but not essential) aspects are as follows:
- implementation of the driving of LR3 and LR4 with the amplifiers Amp and Ampl for the proportionality of current and voltage
- representation of the source Vin as a bridge rectifier from the mains input,
- regulation of the reference of the proportionality factor between voltage and current by changing the voltage divider (or the current amplifier) by means of inverting amplifiers which amplify, with a low—pass filter, only frequencies below the switching frequency of the switching regulator in order to adapt the power from the input source to the power of the output from the switching regulator (RL).

According to a further aspect, one or more of the switching transistors of the switching regulators (for example of the clocked voltage converters) (or even all of the switching transistors of the switching regulators) may be gallium nitride (GaN) transistors or silicon carbide (SiC) transistors.

According to another aspect, one or more diodes or rectifier diodes of the switching regulators (for example of the clocked voltage converters) (or even all of the diodes or rectifier diodes of the switching regulators) may be gallium nitride (GaN) diodes or silicon carbide (SiC) diodes.

9. Procedure According to FIG. 6

Figure 6:
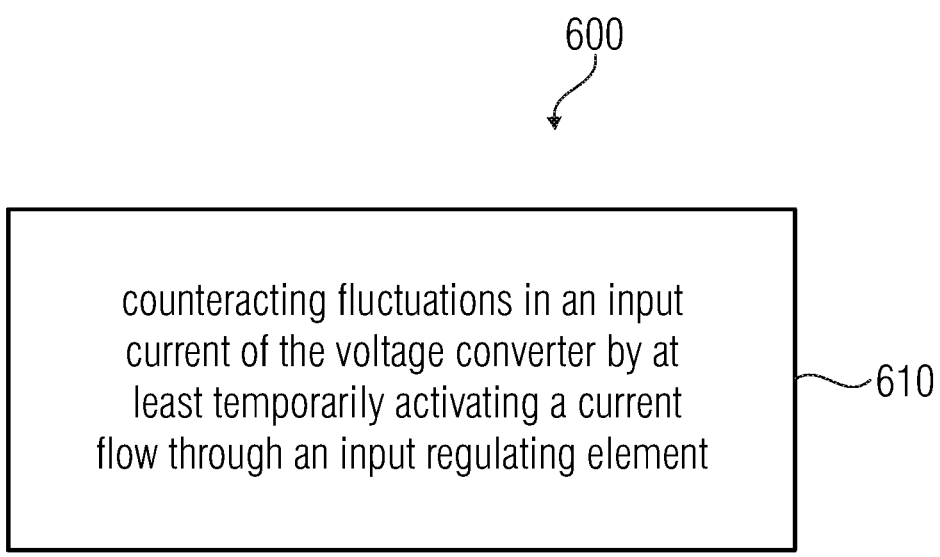
FIG. 6 shows a flow chart of a method of operating a voltage converter arrangement, in accordance with an embodiment of the present invention.

FIG. 6 shows a flow chart of a method 600 in accordance with an embodiment of the present invention.

FIG. 6 shows a method of operating a voltage converter arrangement comprising a clocked voltage converter and a first input regulating element connected between a first input voltage node and a second input voltage node, the second input voltage node having a reference potential. The method comprises counteracting 610 fluctuations in an input current of the voltage converter (or voltage converter arrangement) by at least temporarily activating a current flow through the input regulating element.

The method 600 according to FIG. 6 may optionally be supplemented by all of the features, functionalities and details described herein. In particular, the method 600 may also be supplemented by features and details described herein with regard to the voltage converter arrangements. The method 600 may also be used in connection with the corresponding voltage converter arrangements described herein.

10. Conclusions

In summary, it can thus be stated that embodiments according to the invention suppress a current ripple at the input (for example of a voltage converter arrangement) by compensating, by a linear regulator, for the current ripple from a source which is for example (but not necessarily) larger than the instantaneous input voltage of a sinusoidal curve. No technical solutions have been known so far in this respect.

Embodiments of the present invention thus make it possible to exploit advantages of a switching regulator and a linear regulator simultaneously and to avoid their respective disadvantages. Desired advantages (which can be achieved with embodiments in accordance with the present invention) are thus a high degree of efficiency, avoidance of large smoothing capacitances, avoidance of mains filters, high regulating dynamics, ripple-free direct current and ripple-free direct voltage at the output load or at the input source or arbitrarily selectable input voltage compared to the output voltage.

It should be noted that in embodiments of the invention, optionally one or more of the advantages mentioned can be achieved. Embodiments in accordance with the present invention thus eliminate, in addition to all or at least some of the disadvantages which are eliminated by conventional technology or by conventional solutions with respect to the technical problem described, for example at first the disadvantage that the current ripple at the input of the switching regulator is compensated for by a linear regulator. In other words, embodiments in accordance with the present invention eliminate, besides all or at least some of the disadvantages which are eliminated by conventional technology with respect to the described technical problem, essential disadvantages by compensating, by means of a linear regulator, for the current ripple at the input of the switching regulator (for example of the clocked voltage converter). In addition, the embodiments eliminate the restriction that the input voltage will be larger than the output voltage of the converter.

In summary, it can therefore be stated that embodiments in accordance with the present invention provide a substantially improved compromise between efficiency, implementation effort and interference suppression as compared to conventional voltage converters.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

1] H. Martinez-Garcia: Capacitorless DC-DC Regulator as a Candidate Topology for Photovoltaic Solar Facilities, International Conference on Renewable Energies and Power Quality (ICREPQ14), La Coruna, Spain, 25-27 Mar. 2015

2] H. Martinez-Garcia, Antoni Grau-Saldes: Linear-Assisted DC/DC Converters with Variable Frequency: On their Complex Control Strategies, (COMPENG 2014) Proceedings 2014 Complexity in Engineering, 978-1-4799-4079-0/14/$31.00, IEEE 3] H. Martinez-Garcia, Alireza Saberkari: Four-Quadrant Linear-Assisted DC/DC Voltage Regulator, Mixed Signal Letter, Analog Integr Circ Sig Process (2016), 88: pp 151-160, DOI 10.1007/s10470-016-0747-8, Springer-Verlag 4] Application Note AN3180: A 200 W ripple-free input current PFC pre-regulator with the L65635, ST Microelectronics 2010, Doc ID 17273 Rev 1

5] Jeff Falin: Designing DC/DC converters on the basis of ZETA topology, Application Note "High-Performance Analog Products" www.ti.com/aaj 2Q 2010, Analog Applications Journal, Texas Instruments 2010

6] S. Subasree, A. Balamani: "Energy Efficient Zeta Converter with Coupled Inductor for PV Applications", International Journal for Research and Development in Engineering (IJRDE) www.ijrde.com ISSN: 2279-0500 Special Issue: pp-076-082, Methods Enriching Power and Energy Development (MEPED) 2014

7] ON Semiconductor, Application Note AND8481/D: A High-Efficiency, 300 W Bridgeless PFC Stage 8] NXP Semiconductors: Totem-Pole Bridgeless PFC Design Using MC56F82748, Design Reference Manual, Document Number: DRM174, Rev. 0, 11/2016

9] Jae-Won Yang and Hyun-Lark Do, Bridgeless SEPIC Converter With a Ripple-Free Input Current, IEEE TRANSACTIONS ON POWER ELECTRONICS, VOL. 28, NO. 7, JULY 2013

10] Yungtaek Jang and Milan M. Jovanović, Bridgeless Buck PFC Rectifier, 978-1-4244-4783-1/10/$25.00 ©2010 IEEE

The invention claimed is:
1. A voltage converter arrangement, comprising:
a clocked voltage converter capable of generating an output voltage on the basis of an input voltage; and a first input regulating element connected between a first input voltage node and a second input voltage node, the second input voltage node comprising a reference potential,
wherein the first input regulating element is configured to allow a current flow in order to counteract fluctuations in an input current of the voltage converter arrangement;
wherein the first input regulating element is a first regulating transistor and forms a first linear regulator;
the voltage converter arrangement being configured to allow a current flow via a second input regulating element in order to counteract fluctuations in the input current of the voltage converter arrangement;
wherein the voltage converter arrangement comprises the second input regulating element, and wherein the second input regulating element is connected between the first input voltage node and a first output voltage node, the first output voltage node comprising a potential different from the reference potential, and
wherein the second input regulating element is configured to at least temporarily allow a current flow between the first output voltage node and the first input voltage node;
wherein the second input regulating element is configured to allow a current flow between the first input voltage node and the first output voltage node so as to counteract variations in the input current of the voltage converter arrangement;
wherein the second input regulating element is a second regulating transistor and forms a second linear regulator.

2. Voltage converter arrangement as claimed in claim 1, the voltage converter arrangement being configured to compensate for voltage fluctuations between the first input voltage node and the second input voltage node.

3. Voltage converter arrangement as claimed in claim 1, wherein the clocked voltage converter is a non-inverting voltage converter.

4. Voltage converter arrangement as claimed in claim 1, wherein the voltage converter arrangement is configured to provide the output voltage on the basis of the input current, wherein an amount of the output voltage is larger than an amount of the input voltage.

5. Voltage converter arrangement as claimed in claim 1, the voltage converter arrangement being adapted such that apart from current fluctuations which are at most 10% of a current amplitude of the input current of the clocked voltage converter, an input current of the clocked voltage converter runs proportional, within a time range, to an input voltage, wherein a frequency of the input voltage is smaller than a switching frequency of the clocked voltage converter,
wherein the voltage converter arrangement is configured to adapt a current flow through the first input regulating element such that the current flow through the first input regulating element at least temporarily counteracts the current fluctuations in the input current of the clocked voltage converter.

6. Voltage converter arrangement as claimed in claim 1, the voltage converter arrangement comprising a third input regulating element, the third input regulating element being connected between the first input voltage node and a first output voltage node, the first output voltage node comprising a potential different from the reference potential, and
wherein the third input regulating element is configured to at least temporarily allow a current flow between the first input voltage node and the first output voltage node which is opposite to a current flow through the second input regulating element;
wherein the voltage converter arrangement comprises the second input regulating element, and wherein the second input regulating element is connected between the first input voltage node and the first output voltage node,
wherein the voltage converter arrangement is configured to allow a current flow via the second input regulating element when the input voltage of the voltage converter arrangement is larger than a difference between the output voltage of the voltage converter arrangement and the input voltage,
wherein the voltage converter arrangement is configured to allow a current flow via the first input regulating element when the input voltage deviates from the output voltage by at most 10% or by at most a predetermined deviation,
wherein the voltage converter arrangement is configured to allow a current flow via the first input regulating element when the input voltage is smaller than the difference between the output voltage and the input voltage,
wherein the voltage converter arrangement is configured to allow a current flow via the second input regulating element and the first input regulating element when the input voltage deviates by at most 10% or by at most a predetermined deviation from half the output voltage,
wherein the voltage converter arrangement is configured to allow current to flow via the third input regulating element when the input voltage is larger than the output voltage.

7. Voltage converter arrangement as claimed in claim 1, wherein the clocked voltage converter is a boost converter and/or a SEPIC converter and/or a Cuk converter and/or a transformer-coupled Cuk converter.

8. Voltage converter arrangement as claimed in claim 1, wherein the second input regulating element and/or a third input regulating element and/or the first input regulating element are implemented by using a bipolar transistor.

9. Voltage converter arrangement as claimed in claim 1,
wherein the clocked voltage converter is configured to be to have a pulsating input current in an operating state in which an amount of the input voltage corresponds to an amount of a potential difference between the first input voltage node and the first output voltage node, and in which the amount of the input voltage is smaller than an amount of the output voltage,
wherein the first input regulating element and the second input regulating element are configured, in that operating state in which the amount of the input voltage corresponds to the amount of the potential difference between the first input voltage node and the first output voltage node, and in which the amount of the input voltage is smaller than the amount of the output voltage, to at least partially compensate for fluctuations in the input current of the clocked voltage converter, in that the first input regulating element generates a temporally pulsating current flow between the first input voltage node and the reference potential node, and in that the second input regulating element enables a temporally pulsating current flow between the first output voltage node and the first input voltage node, wherein the pulsating current flow through the second input regulating element and the pulsating current flow through the first input regulating element alternate in time.

10. Voltage converter arrangement as claimed in claim 1, wherein the clocked voltage converter is configured to have a pulsating input current in an operating state in which an amount of the input voltage is larger than an amount of the potential difference between the first input voltage node and the first output voltage node, and in which the amount of the input voltage is smaller than an amount of the output voltage, wherein the second input regulating element is configured, in that operating state in which the amount of the input voltage is larger than the amount of the potential difference between the first input voltage node and the first output voltage node, and in which the amount of the input voltage is smaller than the amount of the output voltage, to at least partially compensate for fluctuations in the input current of the clocked voltage converter in that the second input regulating element enables a time-pulsating current flow between the first output voltage node and the first input voltage node.

11. Voltage converter arrangement as claimed in claim 1, wherein the clocked voltage converter is configured to have a pulsating input current in an operating state in which an amount of the input voltage corresponds to an amount of the output voltage, wherein the first input regulating element is configured, in that operating state in which the amount of the input voltage corresponds to an amount of the output voltage, to at least partially compensate for fluctuations in the input current of the clocked voltage converter in that the first input regulating element generates a temporally pulsating current flow between the first input voltage node and the reference potential node.

12. Voltage converter arrangement as claimed in claim 1, wherein the clocked voltage converter is configured to have a pulsating input current in an operating state in which an amount of the input voltage is smaller than an amount of the potential difference between the first input voltage node and the first output voltage node, and in which the amount of the input voltage is smaller than an amount of the output voltage, wherein the first input regulating element is configured, in that operating state in which the amount of the input voltage is smaller than the amount of the potential difference between the first input voltage node and the first output voltage node, and in which the amount of the input voltage is smaller than the amount of the output voltage, to at least partially compensate for fluctuations in the input current of the clocked voltage converter in that the first input regulating element enables a temporally pulsating current flow between the first input voltage node and the reference potential node.

13. Voltage converter arrangement as claimed in claim 1, the voltage converter arrangement comprising a third input regulating element, the third input regulating element being connected between the first input voltage node and a first output voltage node, wherein the clocked voltage converter is configured to have a pulsating input current in an operating state in which an amount of the input voltage is larger than an amount of the output voltage, wherein the third input regulating element is configured, in that operating state in which the amount of the input voltage is larger than the amount of the output voltage, to at least partially compensate for fluctuations in the input current of the clocked voltage converter in that the third input regulating element enables a temporally pulsating current flow between the first input voltage node and the first output voltage node.

14. Voltage converter arrangement as claimed in claim 1, wherein the voltage converter arrangement is configured to receive an input current such that a time curve of the input current is approximately proportional to an input voltage at least within a time range, wherein a frequency of the input voltage is smaller than a switching frequency of the clocked voltage converter, and wherein the voltage converter arrangement is configured such that a pulsating characteristic of an input current of the voltage converter arrangement in a first time range, which is adjacent to a zero value of a sinusoidal half-wave and which extends over a plurality of periods of the input current of the clocked voltage converter, is larger in amount than the input current of the clocked voltage converter.

15. Voltage converter arrangement as claimed in claim 14, wherein the voltage converter arrangement is configured such that within a second time range during which the input voltage of the voltage converter arrangement is smaller than the output voltage of the voltage converter arrangement, and which is closer in time to a maximum of the sinusoidal half-wave than is the first time range, a pulsating characteristic of an input current of the clocked voltage converter is larger in amount than the input current of the voltage converter arrangement;

and/or wherein the voltage converter arrangement is configured such that within a third time range during which the input voltage of the voltage converter arrangement is smaller than the output voltage of the voltage converter arrangement, and which is closer in time to a maximum of the sinusoidal half-wave than the first time range, a pulsating characteristic of an input current of the clocked voltage converter within a period of the pulsating pattern is temporarily smaller in amount than the input current of the voltage converter arrangement and is temporarily larger in amount than the input current of the voltage converter arrangement;

and/or wherein the voltage converter arrangement is configured such that within a fourth time range during which the input voltage of the voltage converter arrangement is larger than the output voltage of the voltage converter arrangement, and which is closer in time to a maximum of the sinusoidal half-wave than the first time range, a pulsating characteristic of an input current of the clocked voltage converter is smaller in amount than the input current of the voltage converter arrangement.

16. Voltage converter arrangement as claimed in claim 1, wherein the voltage converter arrangement is configured to compensate for fluctuations in an input current of the clocked voltage converter by means of a time-varying current flow through the first input regulating element when an amount of the input voltage is smaller than an amount of a difference between the input voltage and the output voltage and when the amount of the input voltage is smaller than the amount of the output voltage;

and/or wherein the voltage converter arrangement is configured to at least partially compensate for fluctuations in an input current of the clocked voltage converter by means of a time-varying current flow through a second input regulating element when an amount of the input voltage is larger than an amount of a difference between the input voltage and the output voltage and when the amount of the input voltage is smaller than the amount of the output voltage, wherein the second input regulating element is connected between the first input voltage node and a first output voltage node, the first output voltage node comprising a potential different from the reference potential;

and/or the voltage converter arrangement being configured to at least partially compensate for fluctuations in an input current of the clocked voltage converter by means of a time-varying, alternating current flow through the first input regulating element and through a second input regulating element, when an amount of the input voltage is about 50 percent of an amount of the output voltage and when the amount of the input voltage is less than the amount of the output voltage, or when an amount of the input voltage is between 40 percent and 60 percent of an amount of the output voltage and when the amount of the input voltage is less than the amount of the output voltage, wherein the second input regulating element is connected between the first input voltage node and a first output voltage node, the first output voltage node comprising a potential different from the reference potential;

and/or wherein the voltage converter arrangement is configured to at least partially compensate for fluctuations in an input current of the clocked voltage converter by means of a time-varying current flow through a third input regulating element when an amount of the input voltage is larger than an amount of the output voltage, wherein the third input regulating element is connected between the first input voltage node and a first output voltage node, the first output voltage node comprising a potential different from the reference potential.

17. Voltage converter arrangement as claimed in claim 1, wherein a regulating frequency of a linear regulator formed by using the first input regulating element is larger than a clock frequency of the clocked voltage converter, and/or wherein a second regulating frequency of a linear regulator formed while using a second input regulating element is larger than a clock frequency of the clocked voltage converter, and/or wherein a third regulating frequency of a linear regulator formed while using the third input regulating element is larger than a clock frequency of the clocked voltage converter.

18. Voltage converter arrangement as claimed in claim 1, the voltage converter arrangement comprising a second input regulating element, the second input regulating element being connected between the first input voltage node and a first output voltage node, the first output voltage node comprising a potential different from the reference potential, and wherein the second input regulating element is configured to at least temporarily allow a current flow between the first output voltage node and the first input voltage node;

the voltage converter arrangement comprising a regulating circuit configured to regulate a current flow through the first input regulating element and the second input regulating element so as to act as a regulating target to achieve a fixedly predetermined or variably adjustable ratio between an input voltage of the voltage converter arrangement and an input current of the voltage converter arrangement;

the voltage converter arrangement comprising a first amplifier circuit configured to scale a voltage which drops at a current measuring resistor and is proportional to the input current of the voltage converter arrangement so as to achieve a first scaled voltage value proportional to the input current of the voltage converter arrangement, and the voltage converter arrangement comprising a variable voltage divider configured to generate a second scaled voltage value proportional to the input voltage of the voltage converter arrangement, and the voltage converter arrangement comprising a regulating amplifier configured to receive the first scaled voltage value and the second scaled voltage value and to provide drive signals for the first input regulating element and the second input regulating element or a common drive signal for the first input regulating element and the second input regulating element to reduce or minimize a difference between the first scaled voltage value and the second scaled voltage value;

the voltage converter arrangement being configured to set a voltage divider ratio of the voltage divider as a function of a power supplied to the load by the voltage converter arrangement to adjust a target ratio between the input voltage of the voltage converter arrangement and the input current of the voltage converter arrangement to match the power supplied to the load; and/or the voltage converter arrangement being configured to set a voltage divider ratio of the voltage divider as a function of a feedback signal from an output of the voltage converter arrangement that is used to set a duty cycle of a switching signal of the clocked voltage converter.

19. Voltage converter arrangement as claimed in claim 18, the voltage converter arrangement comprising a third input regulating element, the third input regulating element being connected between the first input voltage node and a first output voltage node, the first output voltage node comprising a potential different from the reference potential, and wherein the third input regulating element is configured to at least temporarily allow a current flow between the first input voltage node and the first output voltage node that opposes a current flow through the second input regulating element; and wherein the regulating circuit is configured to regulate a current flow through the first input regulating element and the second input regulating element, or to regulate a current flow through the third input regulating element in dependence on a relation between an input voltage of the voltage converter arrangement and an output voltage of the voltage converter arrangement in order to act as a regulating target to achieve a fixedly predetermined or variably adjustable ratio between an input voltage of the voltage converter arrangement and an input current of the voltage converter arrangement.

20. Voltage converter arrangement as claimed in claim 18, the voltage converter arrangement comprising a first amplifier circuit which is configured to scale a voltage which drops at a current measuring resistor and is proportional to the input current of the voltage converter arrangement so as to achieve a first scaled voltage value proportional to the input current of the voltage converter arrangement, and the voltage converter arrangement comprising a fixed or variable voltage divider configured to produce a second scaled voltage value proportional to the input voltage of the voltage converter arrangement, and the voltage converter arrangement comprising a regulating amplifier configured to receive the first scaled voltage value and the second scaled voltage value and to provide drive signals for the first input regulating element and the second input regulating element or a common drive signal for the first input regulating element and the second input regulating element to reduce or minimize a difference between the first scaled voltage value and the second scaled voltage value;

the voltage converter arrangement being configured to set a scaling ratio for the voltage which drops at the current measuring resistor and/or a scaling ratio of the voltage divider as a function of a power supplied to the load by the voltage converter arrangement to adapt a target ratio between the input voltage of the voltage converter arrangement and the input current of the voltage converter arrangement to match the power supplied to the load.

21. Voltage converter arrangement as claimed in claim 18, the voltage converter arrangement being configured to set the regulating target, which is defined as a target ratio between the input voltage of the voltage converter arrangement and the input current of the voltage converter arrangement in dependence on a power supplied to a load by the voltage converter arrangement and/or in dependence on a current through the first input regulating element and/or in dependence on a current through the second input regulating element.

22. Voltage converter arrangement as claimed in claim 18, wherein a regulating speed of a linear regulator formed while using the first input regulating element is faster than a setting speed or regulating speed when the reference ratio of input current and input voltage is configured as a regulating target.

23. Voltage converter arrangement as claimed in claim 18, the voltage converter arrangement being configured such that input signals of the regulating circuit are within a range of a maximum of +/15 volts or a maximum of +/−10 volts or a maximum of +/−5 volts around a reference potential of the regulating circuit.

24. Voltage converter arrangement as claimed in claim 1, wherein the first input voltage node and the second input voltage node are coupled to a rectifier circuit so that an input voltage of the voltage converter arrangement is constituted by a unidirectional AC voltage.

25. Voltage converter arrangement as claimed in claim 1,
wherein at least one switching transistor used in the clocked voltage converter is a gallium nitride transistor or a silicon carbide transistor; and/or
wherein at least one diode used in the clocked voltage converter is a gallium nitride diode or a silicon carbide diode.

26. Method of operating a voltage converter arrangement, comprising
a clocked voltage converter, and
a first input regulating element connected between a first input voltage node and a second input voltage node, the second input voltage node comprising a reference potential, and
a second input regulating element connected between the first input voltage node and a first output voltage node, the first output voltage node comprising a potential different from the reference potential;

wherein the method comprises
counteracting fluctuations in an input current of the voltage converter by at least temporarily activating a current flow through the first input regulating element, and by at least temporarily activating a current flow through the second input regulating element,
wherein the first input regulating element is a regulating transistor and forms a first linear regulator;
wherein the second input regulating element is a regulating transistor and forms a second linear regulator.

27. Voltage converter arrangement, comprising:
a clocked voltage converter capable of generating an output voltage on the basis of an input voltage; and
a first input regulating element connected between a first input voltage node and a second input voltage node, the second input voltage node comprising a reference potential,
a second input regulating element, wherein the second input regulating element is connected between the first input voltage node and a first output voltage node, the first output voltage node comprising a potential different from the reference potential,
wherein the first input regulating element is configured to allow a current flow in order to counteract fluctuations in an input current of the voltage converter arrangement;
the voltage converter arrangement being configured to allow a current flow via the second input regulating element in order to counteract fluctuations in the input current of the voltage converter arrangement;
wherein the first input regulating element is a first regulating transistor and forms a linear regulator;
wherein the second input regulating element is a second regulating transistor and forms a second linear regulator;
the voltage converter arrangement being configured to control or regulate a current flowing through the first input regulating element such that a sum of a current flowing through the first input regulating element and an input current of the clocked voltage converter is at least approximately constant.

28. Voltage converter arrangement, comprising:
a clocked voltage converter capable of generating an output voltage on the basis of an input voltage; and
a first input regulating element connected between a first input voltage node and a second input voltage node, the second input voltage node comprising a reference potential,
wherein the first input regulating element is configured to allow a current flow in order to counteract fluctuations in an input current of the voltage converter arrangement;
wherein the first input regulating element is a first regulating transistor and forms a linear regulator;
the voltage converter arrangement being configured to allow to allow a current flow via a second input regulating element in order to counteract fluctuations in the input current of the voltage converter arrangement and to supplement the action of the first input regulating element;
the voltage converter arrangement comprising the second input regulating element, and the second input regulating element being connected between the first input voltage node and a first output voltage node, the first output voltage node comprising a potential different from the reference potential, and wherein the second input regulating element is configured to at least temporarily allow a current flow between the first output voltage node and the first input voltage node;

wherein the second input regulating element is configured to allow a current flow between the first input voltage node and the first output voltage node so as to counteract variations in the input current of the voltage converter arrangement;

wherein the second input regulating element is a second regulating transistor and forms a second linear regulator.

29. A voltage converter arrangement, comprising:
a clocked voltage converter capable of generating an output voltage on the basis of an input voltage; and
a first input regulating element connected between a first input voltage node and a second input voltage node, the second input voltage node comprising a reference potential,
wherein the first input regulating element is configured to allow a current flow in order to counteract fluctuations in an input current of the voltage converter arrangement;
wherein the first input regulating element is a first regulating transistor and forms a first linear regulator;
the voltage converter arrangement being configured to allow a current flow via a second input regulating element in order to counteract fluctuations in the input current of the voltage converter arrangement;

wherein the voltage converter arrangement comprises the second input regulating element, and wherein the second input regulating element is connected between the first input voltage node and a first output voltage node, the first output voltage node comprising a potential different from the reference potential, and wherein the second input regulating element is configured to at least temporarily allow a current flow between the first output voltage node and the first input voltage node;

wherein the second input regulating element is configured to allow a current flow between the first input voltage node and the first output voltage node so as to counteract variations in the input current of the voltage converter arrangement;

wherein the second input regulating element is a second regulating transistor and forms a second linear regulator;

wherein the voltage converter arrangement comprises a regulating circuit configured to regulate a current flow through the first input regulating element and the second input regulating element so as to bring an input current of the voltage converter arrangement towards a target value and to at least partially compensate for fluctuations in the input current of the clocked voltage converter.

* * * * *

UNITED STATES PATENT AND TRADEMARK OFFICE
CERTIFICATE OF CORRECTION

| | |
|---|---|
| PATENT NO. | : 11,588,395 B2 |
| APPLICATION NO. | : 16/905756 |
| DATED | : February 21, 2023 |
| INVENTOR(S) | : Matthias Radecker and Ricardo Nunes Marchesan |

It is certified that error appears in the above-identified patent and that said Letters Patent is hereby corrected as shown below:

In the Claims

In Claim 28, Column 60, Lines 58/59:
Delete "configured to allow to allow a current"
And insert -- configured to allow a current --

Signed and Sealed this
Seventh Day of January, 2025

Derrick Brent
*Acting Director of the United States Patent and Trademark Office*